(12) United States Patent
Ozick et al.

(10) Patent No.: US 9,144,360 B2
(45) Date of Patent: Sep. 29, 2015

(54) AUTONOMOUS COVERAGE ROBOT NAVIGATION SYSTEM

(75) Inventors: Daniel N. Ozick, Newton, MA (US); Andrea M. Okerholm, Lexington, MA (US); Jeffrey W. Mammen, Westford, MA (US); Michael J. Halloran, Waltham, MA (US); Paul E. Sandin, Brookline, NH (US); Chikyung Won, Tewksbury, MA (US)

(73) Assignee: iRobot Corporation, Bedford, MA (US)

( * ) Notice: Subject to any disclaimer, the term of this patent is extended or adjusted under 35 U.S.C. 154(b) by 1000 days.

(21) Appl. No.: 11/633,869

(22) Filed: Dec. 4, 2006

(65) Prior Publication Data

US 2007/0244610 A1 Oct. 18, 2007

Related U.S. Application Data

(60) Provisional application No. 60/741,442, filed on Dec. 2, 2005.

(51) Int. Cl.
*G05B 19/04* (2006.01)
*G05B 19/18* (2006.01)
(Continued)

(52) U.S. Cl.
CPC . *A47L 11/40* (2013.01); *A47L 5/30* (2013.01); *A47L 9/009* (2013.01); *A47L 9/0466* (2013.01);
(Continued)

(58) Field of Classification Search
CPC .......... A47L 5/30; A47L 11/40; A47L 11/24; A47L 11/4011; A47L 11/4013; A47L 11/4041; A47L 11/4061; A47L 11/4072; A47L 9/009; A47L 9/2805; A47L 9/2852; A47L 9/2857; A47L 9/2873; A47L 9/2889; A47L 9/2894; A47L 2201/022; A47L 2201/02; A47L 9/0466; A47L 2201/00; G05D 1/0255; G05D 1/0274; G05D 2201/0203; G05D 2201/0215; G05D 1/0225; G05D 1/0227; G05D 1/0234; G05D 1/0242; G05D 1/0272; G05D 1/028; G05D 1/0238; G05D 1/2019; B25J 9/0003; H04L 1/16; Y02T 10/7258; Y02B 60/50; H02J 7/0044; H02J 7/045
USPC .......................... 700/245, 253; 701/1, 23, 200
See application file for complete search history.

(56) References Cited

U.S. PATENT DOCUMENTS 1,755,054 A 4/1930 Darst
1,780,221 A 11/1930 Buchmann
(Continued)

FOREIGN PATENT DOCUMENTS

DE 2128842 C3 12/1980
DE 3317376 C2 12/1987
(Continued)

OTHER PUBLICATIONS

European Search Report dated Nov. 19, 2009 in connection with corresponding EP Application No. 09169766.4.
(Continued)

*Primary Examiner* — Bao Long T Nguyen
(74) *Attorney, Agent, or Firm* — Fish & Richardson P.C.

(57) ABSTRACT

An autonomous mobile robot system for bounded areas including a navigation beacon and an autonomous coverage robot. The navigation beacon has a gateway beacon emitter arranged to transmit a gateway marking emission with the navigation beacon disposed within a gateway between the first bounded area and an adjacent second bounded area. The autonomous coverage robot includes a beacon emission sensor responsive to the beacon emission, and a drive system configured to maneuver the robot about the first bounded area in a cleaning mode in which the robot is redirected in response to detecting the gateway marking emission. The drive system is also configured to maneuver the robot through the gateway into the second bounded area in a migration mode.

28 Claims, 35 Drawing Sheets

(51) Int. Cl.

| | | |
|---|---|---|
| *A47L 11/40* | (2006.01) | |
| *A47L 5/30* | (2006.01) | |
| *A47L 9/04* | (2006.01) | |
| *G05D 1/02* | (2006.01) | |
| *B25J 9/00* | (2006.01) | |
| *H04L 1/16* | (2006.01) | |
| *A47L 11/24* | (2006.01) | |
| *A47L 9/00* | (2006.01) | |
| *A47L 9/12* | (2006.01) | |
| *A47L 9/28* | (2006.01) | |
| *A47L 9/30* | (2006.01) | |
| *B60L 11/18* | (2006.01) | |
| *B60L 15/20* | (2006.01) | |

(52) U.S. Cl.
CPC .............. *A47L 9/12* (2013.01); *A47L 9/2857* (2013.01); *A47L 9/2894* (2013.01); *A47L 9/30* (2013.01); *A47L 11/24* (2013.01); *A47L 11/4011* (2013.01); *A47L 11/4013* (2013.01); *A47L 11/4041* (2013.01); *A47L 11/4061* (2013.01); *A47L 11/4072* (2013.01); *B25J 9/0003* (2013.01); *B60L 11/1805* (2013.01); *B60L 11/1816* (2013.01); *B60L 15/2036* (2013.01); *G05D 1/028* (2013.01); *G05D 1/0225* (2013.01); *G05D 1/0227* (2013.01); *G05D 1/0234* (2013.01); *G05D 1/0242* (2013.01); *G05D 1/0272* (2013.01); *A47L 2201/00* (2013.01); *B60L 2200/40* (2013.01); *B60L 2250/10* (2013.01); *B60L 2250/16* (2013.01); *B60L 2260/32* (2013.01); *G05D 1/0255* (2013.01); *G05D 1/0274* (2013.01); *G05D 2201/0203* (2013.01); *G05D 2201/0215* (2013.01); *H04L 1/16* (2013.01); *Y02B 60/50* (2013.01); *Y02T 10/7258* (2013.01); *Y10S 901/01* (2013.01); *Y10S 901/50* (2013.01)

(56) References Cited

U.S. PATENT DOCUMENTS

| | | |
|---|---|---|
| 1,970,302 A | 8/1934 | Gerhardt |
| 2,136,324 A | 11/1938 | John |
| 2,302,111 A | 11/1942 | Dow et al. |
| 2,353,621 A | 7/1944 | Sav et al. |
| 2,770,825 A | 11/1956 | Pullen |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,674,316 A | 7/1972 | De Brey |
| 3,678,882 A | 7/1972 | Kinsella |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli et al. |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,710,020 A | 12/1987 | Maddox et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George, II et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |

(56) References Cited

U.S. PATENT DOCUMENTS

| | | |
|---|---|---|
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Waqkaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,105,502 A | 4/1992 | Takashima |
| 5,105,550 A | 4/1992 | Shenoha |
| 5,109,566 A | 5/1992 | Kobayashi et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A * | 11/1992 | Mattaboni .................. 356/141.2 |
| 5,170,352 A | 12/1992 | McTamaney et al. |
| 5,173,881 A | 12/1992 | Sindle |
| 5,182,833 A | 2/1993 | Yamaguchi et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Belker, Jr. et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,353,224 A | 10/1994 | Lee et al. |
| 5,363,305 A | 11/1994 | Cox et al. |
| 5,363,935 A | 11/1994 | Schempf |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |

(56) References Cited

U.S. PATENT DOCUMENTS

| | | | |
|---|---|---|---|
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,732,401 A | 3/1998 | Conway |
| 5,735,959 A | 4/1998 | Kubo et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo et al. |
| 5,764,888 A | 6/1998 | Bolan et al. |
| 5,767,437 A | 6/1998 | Rogers |
| 5,767,960 A | 6/1998 | Orman |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,812,267 A | 9/1998 | Everett, Jr. et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,869,910 A | 2/1999 | Colens |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A * | 11/1999 | Allen et al. ............... 701/24 |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,216,307 B1 | 4/2001 | Kaleta et al. |
| 6,220,865 B1 | 4/2001 | Macri et al. |
| 6,226,830 B1 | 5/2001 | Hendriks et al. |

(56) References Cited

U.S. PATENT DOCUMENTS

| | | |
|---|---|---|
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,300,737 B1 | 10/2001 | Begvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer |
| 6,507,773 B2 | 1/2003 | Parker et al. |
| 6,525,509 B1 | 2/2003 | Petersson et al. |
| D471,243 S | 3/2003 | Cioffi et al. |
| 6,532,404 B2 * | 3/2003 | Colens .................. 700/262 |
| 6,535,793 B2 | 3/2003 | Allard |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed, Jr. |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,687,571 B1 | 2/2004 | Byrne et al. |
| 6,690,134 B1 * | 2/2004 | Jones et al. ............ 318/567 |
| 6,690,993 B2 | 2/2004 | Foulke et al. |
| 6,697,147 B2 | 2/2004 | Ko et al. |
| 6,711,280 B2 | 3/2004 | Stafsudd et al. |
| 6,732,826 B2 | 5/2004 | Song et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 * | 8/2004 | Jones et al. ............ 318/567 |
| 6,809,490 B2 * | 10/2004 | Jones et al. ............ 318/568.12 |
| 6,810,305 B2 | 10/2004 | Kirkpatrick |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |

(56) References Cited

U.S. PATENT DOCUMENTS

| | | | |
|---|---|---|---|
| 6,929,548 B2 | 8/2005 | Wang | |
| D510,066 S | 9/2005 | Hickey et al. | |
| 6,938,298 B2 | 9/2005 | Aasen | |
| 6,940,291 B1 | 9/2005 | Ozik | |
| 6,941,199 B1 | 9/2005 | Bottomley et al. | |
| 6,956,348 B2 | 10/2005 | Landry et al. | |
| 6,957,712 B2 | 10/2005 | Song et al. | |
| 6,960,986 B2 | 11/2005 | Asama et al. | |
| 6,965,209 B2 * | 11/2005 | Jones et al. | 318/567 |
| 6,965,211 B2 | 11/2005 | Tsurumi | |
| 6,968,592 B2 | 11/2005 | Takeuchi et al. | |
| 6,971,140 B2 | 12/2005 | Kim | |
| 6,975,246 B1 | 12/2005 | Trudeau | |
| 6,980,229 B1 | 12/2005 | Ebersole | |
| 6,985,556 B2 | 1/2006 | Shanmugavel et al. | |
| 6,993,954 B1 | 2/2006 | George et al. | |
| 6,999,850 B2 | 2/2006 | McDonald | |
| 7,013,527 B2 | 3/2006 | Thomas et al. | |
| 7,024,278 B2 * | 4/2006 | Chiappetta et al. | 700/245 |
| 7,024,280 B2 | 4/2006 | Parker et al. | |
| 7,027,893 B2 | 4/2006 | Perry et al. | |
| 7,030,768 B2 | 4/2006 | Wanie | |
| 7,031,805 B2 | 4/2006 | Lee et al. | |
| 7,032,469 B2 | 4/2006 | Bailey | |
| 7,053,578 B2 | 5/2006 | Diehl et al. | |
| 7,054,716 B2 | 5/2006 | McKee | |
| 7,055,210 B2 | 6/2006 | Keppler et al. | |
| 7,057,120 B2 | 6/2006 | Ma et al. | |
| 7,057,643 B2 | 6/2006 | Iida et al. | |
| 7,065,430 B2 | 6/2006 | Naka et al. | |
| 7,066,291 B2 | 6/2006 | Martins et al. | |
| 7,069,124 B1 | 6/2006 | Whittaker et al. | |
| 7,079,923 B2 * | 7/2006 | Abramson et al. | 700/245 |
| 7,085,623 B2 | 8/2006 | Siegers | |
| 7,085,624 B2 | 8/2006 | Aldred et al. | |
| 7,113,847 B2 | 9/2006 | Chmura et al. | |
| 7,133,746 B2 * | 11/2006 | Abramson et al. | 700/259 |
| 7,142,198 B2 | 11/2006 | Lee | |
| 7,148,458 B2 | 12/2006 | Schell et al. | |
| 7,155,308 B2 | 12/2006 | Jones | |
| 7,167,775 B2 * | 1/2007 | Abramson et al. | 700/245 |
| 7,171,285 B2 | 1/2007 | Kim et al. | |
| 7,173,391 B2 | 2/2007 | Jones et al. | |
| 7,174,238 B1 | 2/2007 | Zweig | |
| 7,188,000 B2 | 3/2007 | Chiappetta et al. | |
| 7,193,384 B1 | 3/2007 | Norman et al. | |
| 7,196,487 B2 | 3/2007 | Jones | |
| 7,201,786 B2 | 4/2007 | Wegelin et al. | |
| 7,206,677 B2 | 4/2007 | Hulden | |
| 7,211,980 B1 | 5/2007 | Bruemmer et al. | |
| 7,225,500 B2 | 6/2007 | Diehl et al. | |
| 7,246,405 B2 | 7/2007 | Yan | |
| 7,248,951 B2 | 7/2007 | Hulden | |
| 7,275,280 B2 | 10/2007 | Haegermarck et al. | |
| 7,283,892 B1 | 10/2007 | Boillot et al. | |
| 7,288,912 B2 | 10/2007 | Landry et al. | |
| 7,318,248 B1 | 1/2008 | Yan | |
| 7,320,149 B1 | 1/2008 | Huffman et al. | |
| 7,324,870 B2 | 1/2008 | Lee | |
| 7,328,196 B2 | 2/2008 | Peters, II | |
| 7,332,890 B2 * | 2/2008 | Cohen et al. | 320/109 |
| 7,352,153 B2 | 4/2008 | Yan | |
| 7,359,766 B2 | 4/2008 | Jeon et al. | |
| 7,360,277 B2 | 4/2008 | Moshenrose et al. | |
| 7,363,108 B2 | 4/2008 | Noda et al. | |
| 7,388,879 B2 | 6/2008 | Sabe et al. | |
| 7,389,166 B2 | 6/2008 | Harwig et al. | |
| 7,408,157 B2 | 8/2008 | Yan | |
| 7,418,762 B2 | 9/2008 | Arai et al. | |
| 7,430,455 B2 | 9/2008 | Casey et al. | |
| 7,430,462 B2 | 9/2008 | Chiu et al. | |
| 7,441,298 B2 | 10/2008 | Svendsen et al. | |
| 7,444,206 B2 | 10/2008 | Abramson et al. | |
| 7,448,113 B2 | 11/2008 | Jones et al. | |
| 7,459,871 B2 | 12/2008 | Landry et al. | |
| 7,467,026 B2 | 12/2008 | Sakagami et al. | |
| 7,474,941 B2 | 1/2009 | Kim et al. | |
| 7,503,096 B2 | 3/2009 | Lin | |
| 7,515,991 B2 | 4/2009 | Egawa et al. | |
| 7,555,363 B2 | 6/2009 | Augenbraun et al. | |
| 7,557,703 B2 | 7/2009 | Yamada et al. | |
| 7,568,259 B2 | 8/2009 | Yan | |
| 7,571,511 B2 | 8/2009 | Jones et al. | |
| 7,578,020 B2 | 8/2009 | Jaworski et al. | |
| 7,600,521 B2 | 10/2009 | Woo | |
| 7,603,744 B2 | 10/2009 | Reindle | |
| 7,617,557 B2 | 11/2009 | Reindle | |
| 7,620,476 B2 | 11/2009 | Morse et al. | |
| 7,636,982 B2 | 12/2009 | Jones et al. | |
| 7,647,144 B2 | 1/2010 | Haegermarck | |
| 7,650,666 B2 | 1/2010 | Jang | |
| 7,660,650 B2 | 2/2010 | Kawagoe et al. | |
| 7,663,333 B2 * | 2/2010 | Jones et al. | 318/568.12 |
| 7,693,605 B2 | 4/2010 | Park | |
| 7,706,917 B1 * | 4/2010 | Chiappetta et al. | 700/245 |
| 6,925,357 C1 | 5/2010 | Wang et al. | |
| 7,765,635 B2 | 8/2010 | Park, II | |
| 7,801,645 B2 | 9/2010 | Taylor et al. | |
| 7,805,220 B2 | 9/2010 | Taylor et al. | |
| 7,809,944 B2 | 10/2010 | Kawamoto | |
| 7,849,555 B2 | 12/2010 | Hahm et al. | |
| 7,853,645 B2 | 12/2010 | Brown et al. | |
| 7,920,941 B2 | 4/2011 | Park et al. | |
| 7,937,800 B2 | 5/2011 | Yan | |
| 7,957,836 B2 | 6/2011 | Myeong et al. | |
| 2001/0004719 A1 | 6/2001 | Sommer | |
| 2001/0013929 A1 | 8/2001 | Torsten | |
| 2001/0020200 A1 | 9/2001 | Das et al. | |
| 2001/0025183 A1 | 9/2001 | Shahidi | |
| 2001/0037163 A1 | 11/2001 | Allard | |
| 2001/0043509 A1 | 11/2001 | Green et al. | |
| 2001/0045883 A1 | 11/2001 | Holdaway et al. | |
| 2001/0047231 A1 | 11/2001 | Peless et al. | |
| 2001/0047895 A1 | 12/2001 | De Fazio et al. | |
| 2002/0011367 A1 | 1/2002 | Kolesnik | |
| 2002/0011813 A1 | 1/2002 | Koselka et al. | |
| 2002/0016649 A1 | 2/2002 | Jones | |
| 2002/0021219 A1 | 2/2002 | Edwards | |
| 2002/0027652 A1 | 3/2002 | Paromtchik et al. | |
| 2002/0036779 A1 | 3/2002 | Kiyoi et al. | |
| 2002/0081937 A1 | 6/2002 | Yamada et al. | |
| 2002/0095239 A1 | 7/2002 | Wallach et al. | |
| 2002/0097400 A1 | 7/2002 | Jung et al. | |
| 2002/0104963 A1 | 8/2002 | Mancevski | |
| 2002/0108209 A1 | 8/2002 | Peterson | |
| 2002/0112742 A1 | 8/2002 | Bredo et al. | |
| 2002/0113973 A1 | 8/2002 | Ge | |
| 2002/0116089 A1 | 8/2002 | Kirkpatrick | |
| 2002/0120364 A1 | 8/2002 | Colens | |
| 2002/0124343 A1 | 9/2002 | Reed | |
| 2002/0153185 A1 | 10/2002 | Song et al. | |
| 2002/0156556 A1 | 10/2002 | Ruffner | |
| 2002/0159051 A1 | 10/2002 | Guo | |
| 2002/0166193 A1 | 11/2002 | Kasper | |
| 2002/0169521 A1 | 11/2002 | Goodman et al. | |
| 2002/0173877 A1 | 11/2002 | Zweig | |
| 2002/0189871 A1 | 12/2002 | Won | |
| 2003/0009259 A1 | 1/2003 | Hattori et al. | |
| 2003/0019071 A1 | 1/2003 | Field et al. | |
| 2003/0023356 A1 | 1/2003 | Keable | |
| 2003/0024986 A1 | 2/2003 | Mazz et al. | |
| 2003/0025472 A1 | 2/2003 | Jones et al. | |
| 2003/0028286 A1 | 2/2003 | Glenn et al. | |
| 2003/0030399 A1 | 2/2003 | Jacobs | |
| 2003/0058262 A1 | 3/2003 | Sato et al. | |
| 2003/0060928 A1 | 3/2003 | Abramson et al. | |
| 2003/0067451 A1 | 4/2003 | Tagg et al. | |
| 2003/0097875 A1 | 5/2003 | Lentz et al. | |
| 2003/0120389 A1 | 6/2003 | Abramson et al. | |
| 2003/0124312 A1 | 7/2003 | Autumn | |
| 2003/0126352 A1 | 7/2003 | Barrett | |
| 2003/0137268 A1 | 7/2003 | Papanikolopoulos et al. | |
| 2003/0146384 A1 | 8/2003 | Logsdon et al. | |
| 2003/0192144 A1 | 10/2003 | Song et al. | |

(56) References Cited

U.S. PATENT DOCUMENTS

| | | |
|---|---|---|
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0204792 A1 | 10/2004 | Taylor et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0021181 A1 | 1/2005 | Kim et al. |
| 2005/0067994 A1 | 3/2005 | Jones et al. |
| 2005/0085947 A1 | 4/2005 | Aldred et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0171636 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1* | 9/2005 | DiBernardo et al. ..... 356/139.03 |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | de Guzman |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0190133 A1 | 8/2006 | Konandreas et al. |
| 2006/0190146 A1 | 8/2006 | Morse et al. |
| 2006/0196003 A1 | 9/2006 | Song et al. |
| 2006/0220900 A1 | 10/2006 | Ceskutti et al. |
| 2006/0259194 A1* | 11/2006 | Chiu ............................. 700/245 |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1* | 3/2007 | Zweig ........................... 700/245 |
| 2007/0114975 A1 | 5/2007 | Cohen et al. |
| 2007/0150096 A1 | 6/2007 | Yeh et al. |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1* | 4/2008 | Ozick et al. .................. 700/258 |
| 2008/0184518 A1 | 8/2008 | Taylor |
| 2008/0276407 A1 | 11/2008 | Schnittman et al. |
| 2008/0281470 A1* | 11/2008 | Gilbert et al. ................ 700/259 |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |

(56) References Cited

U.S. PATENT DOCUMENTS

| | | |
|---|---|---|
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 10242257 A1 | 4/2003 |
| DE | 102004038074.0 | 6/2005 |
| DE | 10357636 | 7/2005 |
| DE | 102004041021 B3 | 8/2005 |
| DE | 102005046813 A1 | 4/2007 |
| DK | 338988 A | 12/1988 |
| EP | 0265542 A1 | 5/1988 |
| EP | 0281085 A2 | 9/1988 |
| EP | 0286328 A1 | 10/1988 |
| EP | 0294101 A2 | 12/1988 |
| EP | 0352045 A2 | 1/1990 |
| EP | 0433697 A2 | 6/1991 |
| EP | 0 437 024 | 7/1991 |
| EP | 0554978 A2 | 8/1993 |
| EP | 0615719 A1 | 9/1994 |
| EP | 0930040 A2 | 7/1999 |
| EP | 0861629 B1 | 9/2001 |
| EP | 1228734 A2 | 8/2002 |
| EP | 1 331 537 A1 | 7/2003 |
| EP | 1 331 537 B1 | 7/2003 |
| EP | 1331537 A1 | 7/2003 |
| EP | 1380245 | 1/2004 |
| EP | 1380246 A2 | 1/2004 |
| EP | 1018315 B1 | 11/2004 |
| EP | 1557730 | 7/2005 |
| EP | 1642522 A2 | 4/2006 |
| EP | 1836941 A2 | 9/2007 |
| ES | 2238196 A1 | 8/2005 |
| FR | 722755 | 3/1932 |
| FR | 2601443 A1 | 1/1988 |
| FR | 2 828 589 | 8/2001 |
| FR | 2828589 A1 | 2/2003 |
| GB | 702426 | 1/1954 |
| GB | 2128842 A | 5/1984 |
| GB | 2213047 A | 8/1989 |
| GB | 2225221 A | 5/1990 |
| GB | 2267360 A | 12/1993 |
| GB | 2 283 838 | 5/1995 |
| GB | 2284957 A | 6/1995 |
| GB | 2300082 A | 10/1996 |
| GB | 2344747 A | 6/2000 |
| GB | 2404330 A | 2/2005 |
| GB | 2417354 A | 2/2006 |
| JP | 53021869 | 2/1978 |
| JP | 53-64055 | 6/1978 |
| JP | 53110257 A2 | 9/1978 |
| JP | 57014726 A2 | 1/1982 |
| JP | 57064217 | 4/1982 |
| JP | 59005315 | 1/1984 |
| JP | 59005315 A2 | 1/1984 |
| JP | 59033511 U | 3/1984 |
| JP | 59094005 | 5/1984 |
| JP | 59099308 | 6/1984 |
| JP | 59112311 | 6/1984 |
| JP | 59120124 A | 7/1984 |
| JP | 59131668 U | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 | 5/1985 |
| JP | 60211510 A | 10/1985 |
| JP | 60259895 | 12/1985 |
| JP | 61023221 | 1/1986 |
| JP | 61023221 A2 | 1/1986 |
| JP | 61097712 A | 5/1986 |
| JP | 61160366 | 7/1986 |
| JP | 62070709 | 4/1987 |
| JP | 62074018 A | 4/1987 |
| JP | 62-120510 | 6/1987 |
| JP | 62-154008 | 7/1987 |
| JP | 62154008 | 7/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63-183032 | 7/1988 |
| JP | 63158032 | 7/1988 |
| JP | 63203483 A | 8/1988 |
| JP | 63-223913 | 9/1988 |
| JP | 63-241610 | 10/1988 |
| JP | 63241610 A | 10/1988 |
| JP | 63241610 A2 | 10/1988 |
| JP | 1118752 | 8/1989 |
| JP | 2-6312 | 1/1990 |
| JP | 2006312 U1 | 1/1990 |
| JP | 03-051023 | 3/1991 |
| JP | 3051023 A | 3/1991 |
| JP | 3051023 A2 | 3/1991 |
| JP | 03-162814 | 7/1991 |
| JP | 4019586 | 1/1992 |
| JP | 4074285 A | 3/1992 |
| JP | 4084921 A | 3/1992 |
| JP | 5-023269 | 2/1993 |
| JP | 5042076 A | 2/1993 |
| JP | 5046246 | 2/1993 |
| JP | 5091604 A2 | 4/1993 |
| JP | 5095879 A | 4/1993 |
| JP | 5150827 A | 6/1993 |
| JP | 5150829 A | 6/1993 |
| JP | 5054620 U | 7/1993 |
| JP | 5040519 Y2 | 10/1993 |
| JP | 05257527 A | 10/1993 |
| JP | 5257533 A2 | 10/1993 |
| JP | 05285861 A | 11/1993 |
| JP | 5302836 A | 11/1993 |
| JP | 5312514 A | 11/1993 |
| JP | 5341904 A | 12/1993 |
| JP | 6003251 U | 1/1994 |
| JP | 6038912 | 2/1994 |
| JP | 6105781 A | 4/1994 |
| JP | 6137828 A | 5/1994 |
| JP | 6154143 A | 6/1994 |
| JP | 6293095 A | 10/1994 |
| JP | 06-327598 | 11/1994 |
| JP | 7047046 A | 2/1995 |
| JP | 7059702 A2 | 3/1995 |
| JP | 07-129239 | 5/1995 |
| JP | HEI 07171081 | 7/1995 |
| JP | 7222705 A2 | 8/1995 |
| JP | 7270518 A | 10/1995 |
| JP | 7281742 A2 | 10/1995 |
| JP | 7-295636 | 11/1995 |
| JP | 07-295643 | 11/1995 |
| JP | 7295636 A2 | 11/1995 |
| JP | 7311041 A2 | 11/1995 |
| JP | 7313417 A | 12/1995 |
| JP | 7319542 A2 | 12/1995 |
| JP | 8-16776 | 1/1996 |

(56) References Cited

FOREIGN PATENT DOCUMENTS

| | | |
|---|---|---|
| JP | 8000393 A | 1/1996 |
| JP | 8000393 B2 | 1/1996 |
| JP | 8016241 A2 | 1/1996 |
| JP | 8016776 B2 | 2/1996 |
| JP | 8063229 A2 | 3/1996 |
| JP | 8083125 A2 | 3/1996 |
| JP | 08-089451 | 4/1996 |
| JP | 8084696 A | 4/1996 |
| JP | 8089449 A | 4/1996 |
| JP | 2520732 B2 | 5/1996 |
| JP | 8123548 A | 5/1996 |
| JP | 08-152916 | 6/1996 |
| JP | 8152916 A2 | 6/1996 |
| JP | 8256960 A2 | 10/1996 |
| JP | 8263137 A | 10/1996 |
| JP | 8286741 A2 | 11/1996 |
| JP | 8286744 A2 | 11/1996 |
| JP | HEI 08292812 | 11/1996 |
| JP | 8322774 A2 | 12/1996 |
| JP | 8335112 A | 12/1996 |
| JP | 8339297 A | 12/1996 |
| JP | 9044240 A | 2/1997 |
| JP | 9066855 A | 3/1997 |
| JP | 9145309 A | 6/1997 |
| JP | 9160644 A2 | 6/1997 |
| JP | 9-179625 | 7/1997 |
| JP | 9179625 A2 | 7/1997 |
| JP | 9179685 A2 | 7/1997 |
| JP | 9185410 | 7/1997 |
| JP | 9192069 A2 | 7/1997 |
| JP | 2555263 Y2 | 8/1997 |
| JP | 9204223 A | 8/1997 |
| JP | 9204223 A2 | 8/1997 |
| JP | 9206258 A2 | 8/1997 |
| JP | 0 792 726 | 9/1997 |
| JP | 09251318 | 9/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319431 A2 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10117973 A2 | 5/1998 |
| JP | 10118963 A | 5/1998 |
| JP | 10165738 A | 6/1998 |
| JP | 10177414 A | 6/1998 |
| JP | 10214114 A2 | 8/1998 |
| JP | 10228316 | 8/1998 |
| JP | 10240342 A2 | 9/1998 |
| JP | 10260727 A2 | 9/1998 |
| JP | 10295595 A | 11/1998 |
| JP | 10314088 | 12/1998 |
| JP | 11015941 A | 1/1999 |
| JP | 11065655 A2 | 3/1999 |
| JP | 11085269 A2 | 3/1999 |
| JP | 11102219 A2 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11-508810 | 8/1999 |
| JP | 11212642 A | 8/1999 |
| JP | 11212642 A2 | 8/1999 |
| JP | 11213157 A | 8/1999 |
| JP | 11508810 T2 | 8/1999 |
| JP | 11-510935 | 9/1999 |
| JP | 11510935 T2 | 9/1999 |
| JP | 11295412 A | 10/1999 |
| JP | 11346964 A2 | 12/1999 |
| JP | 2000047728 | 2/2000 |
| JP | 2000056006 A | 2/2000 |
| JP | 2000056831 A | 2/2000 |
| JP | 2000060782 A | 2/2000 |
| JP | 2000066722 A | 3/2000 |
| JP | 2000075925 A | 3/2000 |
| JP | 2000102499 A | 4/2000 |
| JP | 10240343 A2 | 5/2000 |
| JP | 2000-235416 | 8/2000 |
| JP | 2000275321 | 10/2000 |
| JP | 2000279353 A | 10/2000 |
| JP | 2000-342496 | 12/2000 |
| JP | 2000-353013 | 12/2000 |
| JP | 2000353014 A | 12/2000 |
| JP | 2000353014 A2 | 12/2000 |
| JP | 2001022443 A | 1/2001 |
| JP | 2001067588 | 3/2001 |
| JP | 2001087182 | 4/2001 |
| JP | 2001121455 | 5/2001 |
| JP | 2001125641 | 5/2001 |
| JP | 2001-508572 | 6/2001 |
| JP | 2001508572 A | 6/2001 |
| JP | 2001-197008 | 7/2001 |
| JP | 2001197008 | 7/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001-258807 | 9/2001 |
| JP | 2001258807 | 9/2001 |
| JP | 2001265437 A | 9/2001 |
| JP | 2001-275908 | 10/2001 |
| JP | 2001-287183 | 10/2001 |
| JP | 2001275908 A | 10/2001 |
| JP | 2001289939 | 10/2001 |
| JP | 2001306170 A | 11/2001 |
| JP | 2001-525567 | 12/2001 |
| JP | 2002-73170 | 3/2002 |
| JP | 2002-78650 | 3/2002 |
| JP | 2002073170 | 3/2002 |
| JP | 2002073170 A | 3/2002 |
| JP | 2002078650 A | 3/2002 |
| JP | 2002085305 | 3/2002 |
| JP | 2002-204768 | 7/2002 |
| JP | 22204768 A2 | 7/2002 |
| JP | 2002204768 A | 7/2002 |
| JP | 2002204769 A | 7/2002 |
| JP | 2002247510 A | 8/2002 |
| JP | 2002-532178 | 10/2002 |
| JP | 3356170 | 10/2002 |
| JP | 2002532180 A | 10/2002 |
| JP | 2002-323925 | 11/2002 |
| JP | 3375843 | 11/2002 |
| JP | 22323925 A2 | 11/2002 |
| JP | 2002323925 | 11/2002 |
| JP | 2002333920 A | 11/2002 |
| JP | 2002-355206 | 12/2002 |
| JP | 2002-360471 | 12/2002 |
| JP | 2002-360482 | 12/2002 |
| JP | 2005-366227 | 12/2002 |
| JP | 2002355206 | 12/2002 |
| JP | 2002360471 A | 12/2002 |
| JP | 2002360482 A | 12/2002 |
| JP | 2002366227 | 12/2002 |
| JP | 2002369778 | 12/2002 |
| JP | 2002369778 A2 | 12/2002 |
| JP | 2003-10076 | 1/2003 |
| JP | 23028528 A2 | 1/2003 |
| JP | 2003005296 A | 1/2003 |
| JP | 2003010076 A | 1/2003 |
| JP | 2003010088 A | 1/2003 |
| JP | 2003028528 A | 1/2003 |
| JP | 2003-5296 | 2/2003 |
| JP | 2003-036116 | 2/2003 |
| JP | 2003-38401 | 2/2003 |
| JP | 2003-38402 | 2/2003 |
| JP | 2003-047579 | 2/2003 |
| JP | 2003-505127 | 2/2003 |
| JP | 23036116 A2 | 2/2003 |
| JP | 23052596 A2 | 2/2003 |
| JP | 2003036116 | 2/2003 |

(56) References Cited

FOREIGN PATENT DOCUMENTS

| | | |
|---|---|---|
| JP | 2003036116 A | 2/2003 |
| JP | 2003038401 A | 2/2003 |
| JP | 2003038402 A | 2/2003 |
| JP | 2003047579 | 2/2003 |
| JP | 2003-061882 | 3/2003 |
| JP | 2003061882 A | 3/2003 |
| JP | 2003084994 | 3/2003 |
| JP | 2003167628 A | 6/2003 |
| JP | 2003-180586 | 7/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003190064 A2 | 7/2003 |
| JP | 2003-228421 | 8/2003 |
| JP | 2003228421 | 8/2003 |
| JP | 2003241836 A | 8/2003 |
| JP | 2003262520 A | 9/2003 |
| JP | 2003304992 A | 10/2003 |
| JP | 2003-310489 | 11/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004-185586 | 7/2004 |
| JP | 2004198330 A | 7/2004 |
| JP | 2004219185 | 8/2004 |
| JP | 2004351234 A | 12/2004 |
| JP | 2005118354 A | 5/2005 |
| JP | 2005-211360 | 8/2005 |
| JP | 2005211360 A | 8/2005 |
| JP | 2005224265 A | 8/2005 |
| JP | 2005-230032 | 9/2005 |
| JP | 2005-242489 | 9/2005 |
| JP | 2005230032 A | 9/2005 |
| JP | 2005245916 A | 9/2005 |
| JP | 2005-296511 | 10/2005 |
| JP | 2005346700 A2 | 12/2005 |
| JP | 2005352707 A | 12/2005 |
| JP | 2006043071 A | 2/2006 |
| JP | 2006-127448 | 5/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 2004-267236 | 9/2007 |
| JP | 2009015611 A | 1/2009 |
| JP | 2010198552 A | 9/2010 |
| WO | 9526512 A1 | 10/1995 |
| WO | WO 95/26512 | 10/1995 |
| WO | WO9526512 A1 | 10/1995 |
| WO | 9530887 A1 | 11/1995 |
| WO | 9617258 A1 | 6/1996 |
| WO | 9715224 A1 | 5/1997 |
| WO | WO 97/15224 | 5/1997 |
| WO | 9740734 A1 | 11/1997 |
| WO | 9741451 A1 | 11/1997 |
| WO | WO 97/40734 | 11/1997 |
| WO | WO 97/41451 | 11/1997 |
| WO | WO9740734 A1 | 11/1997 |
| WO | WO9741451 A1 | 11/1997 |
| WO | 9853456 A1 | 11/1998 |
| WO | WO 98/53456 | 11/1998 |
| WO | 9905580 A2 | 2/1999 |
| WO | 9916078 A1 | 4/1999 |
| WO | WO 99/16078 | 4/1999 |
| WO | WO 99/28800 | 6/1999 |
| WO | 9938056 A1 | 7/1999 |
| WO | 9938237 A1 | 7/1999 |
| WO | WO 99/38056 | 7/1999 |
| WO | WO 99/38237 | 7/1999 |
| WO | WO9938056 A1 | 7/1999 |
| WO | WO9938237 A1 | 7/1999 |
| WO | 9943250 A1 | 9/1999 |
| WO | WO 99/43250 | 9/1999 |
| WO | WO 99/59042 | 11/1999 |
| WO | WO9959042 A1 | 11/1999 |
| WO | WO 00/04430 | 1/2000 |
| WO | WO0004430 A1 | 1/2000 |
| WO | 0038026 A1 | 6/2000 |
| WO | 0038028 A1 | 6/2000 |
| WO | 0038029 A1 | 6/2000 |
| WO | WO 00/36962 | 6/2000 |
| WO | WO 00/38026 | 6/2000 |
| WO | WO 00/38029 | 6/2000 |
| WO | WO0038026 A1 | 6/2000 |
| WO | WO0038029 A1 | 6/2000 |
| WO | 0004430 A1 | 10/2000 |
| WO | 0078410 A1 | 12/2000 |
| WO | WO 00/78410 | 12/2000 |
| WO | 0106904 A1 | 2/2001 |
| WO | 0106905 A1 | 2/2001 |
| WO | WO 01/06904 | 2/2001 |
| WO | WO 01/06905 | 2/2001 |
| WO | WO0106904 A1 | 2/2001 |
| WO | 0180703 A1 | 11/2001 |
| WO | 0191623 A2 | 12/2001 |
| WO | WO 01/91623 | 12/2001 |
| WO | 0224292 A1 | 3/2002 |
| WO | 0239864 A1 | 5/2002 |
| WO | 0239868 A1 | 5/2002 |
| WO | WO 02/39864 | 5/2002 |
| WO | WO 02/39868 | 5/2002 |
| WO | WO0239868 A1 | 5/2002 |
| WO | 02058527 A1 | 8/2002 |
| WO | 02062194 A1 | 8/2002 |
| WO | WO 02/058527 | 8/2002 |
| WO | WO 02/062194 | 8/2002 |
| WO | 02067744 A1 | 9/2002 |
| WO | 02067745 A1 | 9/2002 |
| WO | 02067752 A1 | 9/2002 |
| WO | 02069774 A1 | 9/2002 |
| WO | 02069775 A2 | 9/2002 |
| WO | 02071175 A1 | 9/2002 |
| WO | 02074150 A1 | 9/2002 |
| WO | 02075350 A1 | 9/2002 |
| WO | 02075356 A1 | 9/2002 |
| WO | 02075469 A1 | 9/2002 |
| WO | 02075470 A1 | 9/2002 |
| WO | WO 02/067744 | 9/2002 |
| WO | WO 02/067745 | 9/2002 |
| WO | WO 02/071175 | 9/2002 |
| WO | WO 02/074150 | 9/2002 |
| WO | WO 02/075356 | 9/2002 |
| WO | WO 02/075469 | 9/2002 |
| WO | WO 02/075470 | 9/2002 |
| WO | WO02075356 A1 | 9/2002 |
| WO | WO02075469 A1 | 9/2002 |
| WO | WO02075470 A1 | 9/2002 |
| WO | 02081074 | 10/2002 |
| WO | WO 02/081074 | 10/2002 |
| WO | 02101477 A2 | 12/2002 |
| WO | WO 02/101477 | 12/2002 |
| WO | WO02101477 A2 | 12/2002 |
| WO | 03015220 A1 | 2/2003 |
| WO | WO03015220 A1 | 2/2003 |
| WO | 03024292 A2 | 3/2003 |
| WO | 2003/026474 | 4/2003 |
| WO | WO 03/026474 | 4/2003 |
| WO | 03040546 A1 | 5/2003 |
| WO | 03040845 A1 | 5/2003 |
| WO | 03040846 A1 | 5/2003 |
| WO | WO 03/040845 | 5/2003 |
| WO | WO 03/040846 | 5/2003 |
| WO | 03062850 A2 | 7/2003 |
| WO | 03062852 A1 | 7/2003 |
| WO | 2004004533 A1 | 1/2004 |

(56) References Cited

FOREIGN PATENT DOCUMENTS

| | | |
|---|---|---|
| WO | 2004004534 A1 | 1/2004 |
| WO | 2004006034 A2 | 1/2004 |
| WO | WO 2004/006034 | 1/2004 |
| WO | WO2004004533 A1 | 1/2004 |
| WO | WO2004005956 A1 | 1/2004 |
| WO | WO2004006034 A2 | 1/2004 |
| WO | WO2004058028 A2 | 1/2004 |
| WO | 2004025947 A2 | 3/2004 |
| WO | WO2004/025947 | 3/2004 |
| WO | 2004058028 A2 | 7/2004 |
| WO | 2004059409 A1 | 7/2004 |
| WO | WO2004/058028 | 7/2004 |
| WO | WO2004/059409 | 7/2004 |
| WO | WO2004058028 | 7/2004 |
| WO | 2005006935 A1 | 1/2005 |
| WO | 2005037496 A1 | 4/2005 |
| WO | 2005055795 A1 | 6/2005 |
| WO | 2005055796 A2 | 6/2005 |
| WO | WO 2005/055795 | 6/2005 |
| WO | 2005076545 A1 | 8/2005 |
| WO | 2005077243 A1 | 8/2005 |
| WO | 2005077244 A1 | 8/2005 |
| WO | WO 2005/077244 | 8/2005 |
| WO | WO2005077244 A1 | 8/2005 |
| WO | 2005081074 A1 | 9/2005 |
| WO | 2005083541 A1 | 9/2005 |
| WO | WO 2005/081074 | 9/2005 |
| WO | WO2005/083541 | 9/2005 |
| WO | WO2005082223 A1 | 9/2005 |
| WO | 2005098475 A1 | 10/2005 |
| WO | 2005098476 A1 | 10/2005 |
| WO | 2006046400 A1 | 5/2006 |
| WO | 2006061133 A1 | 6/2006 |
| WO | 2006068403 A1 | 6/2006 |
| WO | WO2006/061133 | 6/2006 |
| WO | WO2006068403 A1 | 6/2006 |
| WO | 2006073248 A1 | 7/2006 |
| WO | 2006089307 A2 | 8/2006 |
| WO | 2007028049 A2 | 3/2007 |
| WO | 2007036490 A2 | 4/2007 |
| WO | 2007065033 A2 | 6/2007 |
| WO | 2007137234 A2 | 11/2007 |

OTHER PUBLICATIONS

Cameron Morland, *Autonomous Lawn Mower Control*, Jul. 24, 2002.
Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.
Electrolux designed for the well-lived home, website: http://www.electroluxusa.com/node57.as[?currentURL=node142.asp%3F, acessed Mar. 18, 2005, 5 pgs.
eVac Robotic Vacuum S1727 Instruction Manual, Sharper Image Corp, Copyright 2004, 16 pgs.
Everyday Robots, website: http://www.everydayrobots.com/index.php?option=content&task=view&id=9, accessed Apr. 20, 2005, 7 pgs.
Facts on the Trilobite webpage: "http://trilobiteelectroluxse/presskit_en/nodel1335asp?print=yes&pressID=" accessed Dec. 12, 2003 (2 pages).
Friendly Robotics Robotic Vacuum RV400—The Robot Store website: http://www.therobotstore.com/s.nl/sc.9/category,-109/it.A/id.43/.f, accessed Apr. 20, 2005, 5 pgs.
Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.
Hitachi: News release: The home cleaning robot of the autonomous movement type (experimental machine) is developed, website: http://www.i4u.com/japanreleases/hitachirobot.htm., accessed Mar. 18, 2005, 5 pgs.

Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004 (16 pages).
Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.
Kärcher RoboCleaner RC 3000 Product Details webpages: "http://wwwrobocleanerde/english/screen3html" through " . . . screen6html" accessed Dec. 12, 2003 (4 pages).
Karcher USA, RC3000 Robotic Cleaner, website: http://www.karcher-usa.com/showproducts.php?op=view_prod&param1=143&param2=&param3=, accessed Mar. 18, 2005, 6 pgs.
koolvac Robotic Vacuum Cleaner Owner's Manual, Koolatron, Undated, 26 pgs.
NorthStar Low-Cost, Indoor Localization, Evolution robotics, Powering Intelligent Products, 2 pgs.
Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005, 5 pgs.
Put Your Roomba . . . On "Automatic" webpages: "http://www.acomputeredge.com/roomba," accessed Apr. 20, 2005, 5 pgs.
RoboMaid Sweeps Your Floors So You Won't Have to, the Official Site, website: http://www.thereobomaid.com/, acessed Mar. 18, 2005, 2 pgs.
Robot Review Samsung Robot Vacuum (VC-RP30W), website: http://www.onrobo.com/reviews/At_Home/Vacuun_Cleaners/on00vcrp30rosam/index.htm, accessed Mar. 18, 2005, 11 pgs.
Robotic Vacuum Cleaner-Blue, website: http://www.sharperimage.com/us/en/catalog/productview.jhtml?sku=S1727BLU, accessed Mar. 18, 2005, 3 pgs.
Sebastian Thrun, *Learning Occupancy Grid Maps With Forward Sensor Models*, School of Computer Science, Carnegie Mellon University, pp. 1-28.
Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.
Wired News: Robot Vacs Are in the House, website: http://www.wired.com/news/print/0,1294,59237,00.html, accessed Mar. 18, 2005, 6 pgs.
Zoombot Remote Controlled Vaccum-RV-500 New Roomba 2, website: http://cgi.ebay.com/ws/eBayISAPI.dll?ViewItem&category=43526&item=4373497618&rd=1, accessed Apr. 20, 2005, 7 pgs.
International Preliminary Report for counterpart application, PCT/US2006/046395 dated Feb. 28, 2008.
European Search Report dated Apr. 3, 2009 in connection with Application No. 09154458.5-2206. 6 pages.
Chamberlin, et al., Robot Locator Beacon System, NASA Goddard SFC, Design Proposal, Feb. 17, 2006.
Cameron Morland, Autonomous Lawnmower Control, Jul. 24, 2002.
Keith L. Doty and Reid R. Harrison, Sweep Strategies for a Sensory Driven Behavior Based Vacuum Cleaning Agent, Oct. 22-24, 1993.
European Search Report dated Oct. 6, 2009 in connection with EP Application No. 09168571.9-2206. 149 pages.
Examination report dated Dec. 22, 2010 for corresponding application EP 10174129.6.
Examination report dated Feb. 8, 2011 for corresponding application EP 10174129.6.
Examination report dated Apr. 5, 2011 from corresponding U.S. Appl. No. 12/959,879.
Examination report dated Feb. 22, 2010 from corresponding U.S. Appl. No. 11/633,883.
Examination report dated Jul. 15, 2011from corresponding U.S. Appl. No. 12/211,938.
Examination report dated Jul. 20, 2011 from corresponding JP application 2008-543548.
Examination report dated Jun. 21, 2011 from corresponding JP application 2011-088402.

(56) References Cited

OTHER PUBLICATIONS

Examination report dated Mar. 10, 2011 from corresponding JP application 2010-282185.
Examination report dated Mar. 11, 2010 from corresponding U.S. Appl. No. 11/758,289.
Examination report dated May 2, 2011 from corresponding U.S. Appl. No. 11/773,845.
Examination report dated Nov. 10, 2010 from corresponding U.S. Appl. No. 11/758,289.
Examination report dated Oct. 29, 2010 from corresponding U.S. Appl. No. 11/633,886.
Prassler et al., "A Short History of Cleaning Robots", Autonomous Robots 9, 211-226, 2000.
Hitachi "Feature", http://kadenfan.hitachi.co.jp/robot/feature/feature.html, 1 page Nov. 19, 2008.
Notification of Reasons for Rejection, JP Application No. 2008-543546, Nov. 2, 2011, 4 pages (English translation included, 4 pages).
Andersen et al., "Landmark based navigation strategies", SPIE Conference on Mobile Robots XIII, SPIE vol. 3525, pp. 170-181, Jan. 8, 1999.
Ascii, Mar. 25, 2002, http://ascii.jp/elem/000/000/330/330024/ accessed Nov. 1, 2011.
U.S. Appl. No. 60/605,066 as provided to WIPO in PCT/US2005/030422, corresponding to U.S. National Stage Entry U.S. Appl. No. 11/574,290, U.S. publication 2008/0184518, filed Aug. 27, 2004.
U.S. Appl. No. 60/605,181 as provided to WIPO in PCT/US2005/030422, corresponding to U.S. National Stage Entry U.S. Appl. No. 11/574,290, U.S. publication 2008/0184518, filed Aug. 27, 2004.
Derek Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Electrolux Trilobite, Jan. 12, 2001, http://www.electrolux-ui.com:8080/2002%5C822%5C833102EN.pdf, accessed Jan. 2, 2012, 10 pages.
Florbot GE Plastics, 1989-1990, 2 pages, available at http://www.fuseid.com/, accessed Sep. 27, 2012.
Hitachi 'Feature', http://kadenfan.hitachi.co.jp/robot/feature/feature.html, 1 page, Nov. 19, 2008.
Hitachi, http://www.hitachi.co.jp/New/cnews/hi_030529_hi_030529.pdf_, 8 pages, May 29, 2003.
Home Robot—UBOT; Microbotusa.com, retrieved from the WWW at www.microrobotusa.com, accessed Dec. 2, 2008.
King and Weiman, "Helpmate™ Autonomous Mobile Robots Navigation Systems," SPIE vol. 1388 Mobile Robots, pp. 190-198 (1990).
Li et al. "Robust Statistical Methods for Securing Wireless Localization in Sensor Networks," Information Procesing in Sensor Networks, 2005, Fourth International Symposium on, pp. 91-98, Apr. 2005.
Maschinemarkt Würzburg 105, Nr. 27, pp. 3, 30, Jul. 5, 1999.
Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.
Paromtchik "Toward Optical Guidance of Mobile Robots," Proceedings of the Fourth World Multiconference on Systemics, Cybernetics and Informatics, Orlando, FL, USA, Jul. 23, 2000, vol. IX, pp. 44-49, available at http://emotion.inrialpes.fr~paromt/infos/papers/paromtchik:asama:sci:2000.ps.gz, accessed Jul. 3, 2012.
Roboking—not just a vacuum cleaner, a robot!, Jan. 21, 2004, infocom.uz/2004/01/21/robokingne-prosto-pyilesos-a-robot/, accessed Oct. 10, 2011, 7 pages.
Sebastian Thrun, "Learning Occupancy Grid Maps With Forward Sensor Models," Autonomous Robots 15, 111-127, Sep. 1, 2003.
SVET Computers—New Technologies—Robot Vacuum Cleaner, Oct. 1999, available at http://www.sk.rs/1999/10/sknt01.html, accessed Nov. 1, 2011.

Written Opinion of the International Searching Authority, PCT/US2004/001504, Aug. 20, 2012, 9 pages.
Andersen et al., "Landmark based navigation strategies," SPIE Conference on Mobile Robots XIII, SPIE vol. 3525, pp. 170-181, Jan. 8, 1999.
Ascii, Mar. 25, 2002, http://ascii.jp/elem/000/000/330/330024/, accessed Nov. 2011, 15 pages (with English translation).
Barker, "Navigation by the Stars—Ben Barker 4th Year Project," Nov. 2004, 20 pages.
Becker et al., "Reliable Navigation Using Landmarks," IEEE International Conference on Robotics and Automation, 0-7803-1965-6, pp. 401-406, 1995.
Benayad-Cherif et al., "Mobile Robot Navigation Sensors," SPIE vol. 1831 Mobile Robots, VII, pp. 378-387, 1992.
Betke et al. "Mobile robot localization using landmarks," Proceedings of the IEEE/RSJ/GI International Conference on Intelligent Robots and Systems '94 Advanced Robotic Systems and the Real World (IROS '94), Accessed via IEEE Xplore, 1994, 8 pages.
Bison et al., "Using a structured beacon for cooperative position estimation," *Robotics and Autonomous Systems*, 29(1):33-40, Oct. 1999.
Blaasvaer et al., "AMOR—An Autonomous Mobile Robot Navigation System," Proceedings of the IEEE International Conference on Systems, Man, and Cybernetics, pp. 2266-2271, 1994.
Borges et al., "Optimal Mobile Robot Pose Estimation Using Geometrical Maps," IEEE Transactions on Robotics and Automation, 18(1): 87-94, Feb. 2002.
Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.
Bulusu et al., "Self Configuring Localization systems: Design and Experimental Evaluation," *ACM Transactions on Embedded Computing Systems*, 3(1):24-60, 2003.
Caccia et al., "Bottom-Following for Remotely Operated Vehicles," 5th IFAC Conference, Alaborg, Denmark, pp. 245-250, Aug. 2000.
Chae et al., "StarLITE: A new artificial landmark for the navigation of mobile robots," http://www.irc.atr.jp/jk-nrs2005/pdf/Starlite.pdf, 4 pages, 2005.
Chamberlin et al., "Team 1: Robot Locator Beacon System," NASA Goddard SFC, Design Proposal, 15 pages, Feb. 2006.
Champy, "Physical management of IT assets in Data Centers using RFID technologies," RFID 2005 University, Oct. 12-14, 2005, 19 pages.
Chin, "Joystick Control for Tiny OS Robot," http://www.eecs.berkeley.edu/Programs/ugrad/superb/papers2002/chiri.pdf. 12 pages, Aug. 2002.
Christensen et al. "Theoretical Methods for Planning and Control in Mobile Robotics," 1997 First International Conference on Knowledge-Based Intelligent Electronic Systems, Adelaide, Australia, pp. 81-86, May 1997.
CleanMate 365, Intelligent Automatic Vacuum Cleaner, Model No. QQ-1, User Manual www.metapo.com/support/user_manual.pdf, Dec. 2005, 11 pages.
Clerentin et al., "A localization method based on two omnidirectional perception systems cooperation," *Proc of IEEE International Conference on Robotics & Automation*, San Francisco, CA vol. 2, pp. 1219-1224, Apr. 2000.
Corke, "High Performance Visual serving for robots end-point control," SPIE vol. 2056, Intelligent Robots and Computer Vision, 1993, 10 pages.
Cozman et al., "Robot Localization using a Computer Vision Sextant," IEEE International Midwest Conference on Robotics and Automation, pp. 106-111, 1995.
D'Orazio et al., "Model based Vision System for mobile robot position estimation", *SPIE*, vol. 2058 Mobile Robots VIII, pp. 38-49, 1992.
De Bakker et al., "Smart PSD—array for sheet of light range imaging", *Proc. of SPIE*, vol. 3965, pp. 1-12, May 2000.
Denning Roboscrub image, 1989, 1 page.
Desaulniers et al., "An Efficient Algorithm to find a shortest path for a car-like Robot," *IEEE Transactions on robotics and Automation*, 11(6):819-828, Dec. 1995.

(56) References Cited

OTHER PUBLICATIONS

Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.
Dorsch et al., "Laser Triangulation: Fundamental uncertainty in distance measurement," *Applied Optics*, 33(7):1306-1314, Mar. 1994.
Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.
Dudek et al., "Localizing a Robot with Minimum Travel" *Proceedings of the sixth annual ACM-SIAM symposium on Discrete Algorithms*, 27(2):583-604, Apr. 1998.
Dulimarta et al., "Mobile Robot Localization in Indoor Environment", *Pattern Recognition*, 30(1):99-111, 1997.
Dyson's Robot Vacuum Cleaner—the DC06, May 2004, Retrieved from the Internet: URL<http://www.gizmag.com/go/1282/>. Accessed Nov. 2011, 3 pages.
EBay, "Roomba Timer -> Timed Cleaning—Floorvac Robotic Vacuum," Retrieved from the Internet: URL Cgi.ebay.com/ws/eBayISAPI.dll?viewitem&category=43526&item=4375198387&rd=1, 5 pages, Apr. 2005.
Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.
Electrolux Trilobite, Jan. 12, 2001, http://www.electroluxui.com:8080/2002%5C822%5C833102EN.pdf, accessed Jul. 2, 2012, 10 pages.
Electrolux, "Designed for the well-lived home," Retrieved from the Internet: URL<http://www.electroluxusa.com/node57.as[?currentURL=node142.asp%3F >. Accessed Mar. 2005, 2 pages.
Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.
Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.
Euroflex Intelligente Monstre, (English excerpt only), 2006, 15 pages.
Euroflex, Jan. 2006, Retrieved from the Internet: URL<http://www.euroflex.tv/novita_dett.php?id=15, accessed Nov. 2011, 1 page.
eVac Robotic Vacuum S1727 Instruction Manual, Sharper Image Corp, Copyright 2004, 16 pages.
Everyday Robots, "Everyday Robots: Reviews, Discussion and News for Consumers," Aug. 2004, Retrieved from the Internet: URL<www.everydayrobots.com/index.php?option=content&task=view&id=9> (Sep. 2012), 4 pages.
Evolution Robotics, "NorthStar—Low-cost Indoor Localiztion—How it Works," E Evolution Robotics , 2 pages, 2005.
Facchinetti Claudio et al., "Self-Positioning Robot Navigation Using Ceiling Images Sequences," ACCV '95, 5 pages, Dec. 1995.
Facchinetti Claudio et al., "Using and Learning Vision-Based Self-Positioning for Autonomous Robot Navigation," ICARCV '94, vol. 3, pp. 1694-1698, 1994.
Facts on Trilobite, webpage, Retrieved from the Internet: URL<http://trilobiteelectroluxse/presskit_en/model11335asp?print=yes&pressID=>. 2 pages, accessed Dec. 2003.
Fairfield et al., "Mobile Robot Localization with Sparse Landmarks," SPIE vol. 4573, pp. 148-155, 2002.
Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.
Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.

Floorbot GE Plastics—Image, available at http://www.fuseid.com/, 1989-1990, Accessed Sep. 2012, 1 page.
Floorbotics, VR8 Floor Cleaning Robot, Product Description for Manufacturing, URL: <http://www.consensus.sem.au/SoftwareAwards/CSAarchive/CSA2004/CSAart04/FloorBot/F>. Mar. 2004, 11 pages.
Franz et al., "Biomimetric robot navigation", Robotics and Autonomous Systems, vol. 30 pp. 133-153, 2000.
Friendly Robotics, "Friendly Robotics—Friendly Vac, Robotic Vacuum Cleaner," Retrieved from the Internet: URL< www.friendlyrobotics.com/vac.htm > 5 pages, Apr. 2005.
Friendly Robotics, Retrieved from the Internet: URL<http://www.robotsandrelax.com/PDFs/RV400Manual.pdf>. 18 pages, accessed Dec. 2011.
Fuentes et al., "Mobile Robotics 1994," University of Rochester. Computer Science Department, TR 588, 44 pages, Dec. 1994.
Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466/1471, Aug. 1995.
Gat, "Robust Low-Computation Sensor-driven Control for Task-Directed Navigation," Proc of IEEE International Conference on Robotics and Automation , Sacramento, CA pp. 2484-2489, Apr. 1991.
Gionis, "A hand-held optical surface scanner for environmental Modeling and Virtual Reality," Virtual Reality World, 16 pages, 1996.
Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International University, 5 pages.
Grumet, "Robots Clean House," Popular Mechanics, Nov. 2003, 3 pages.
Hamamatsu "SI PIN Diode S5980, S5981 S5870—Multi-element photodiodes for surface mounting," Hamatsu Photonics, 2 pages, Apr. 2004.
Hammacher Schlemmer, "Electrolux Trilobite Robotic Vacuum," Retrieved from the Internet: URL< www.hammacher.com/publish/71579.asp?promo=xsells>. 3 pages, Mar. 2005.
Haralick et al. "Pose Estimation from Corresponding Point Data", *IEEE Transactions on Systems, Man, and Cybernetics*, 19(6):1426-1446, Nov. 1989.
Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi, http://www.hitachi.co.jp/New/cnews/hi_030529_hi_030529.pdf, May 29, 2003, 15 pages (with English translation).
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Hoag et al., "Navigation and Guidance in interstellar space," ACTA Astronautica, vol. 2, pp. 513-533 , Feb. 1975.
Home Robot—UBOT; Microbotusa.com, retrieved from the WWW at www.microrobotusa.com, accessed Dec. 2, 2008, 2 pages.
Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.
InMach "Intelligent Machines," Retrieved from the Internet: URL<www.inmach.de/inside.html>. 1 page, Nov. 2008.
Innovation First, "2004 EDU Robot Controller Reference Guide," Retrieved from the Internet: URL<http://www.ifirobotics.com>. 13 pages, Mar. 2004.

(56) References Cited

OTHER PUBLICATIONS

IT media, Retrieved from the Internet: URL<http://www.itmedia.co.jp/news/0111/16/robofesta_m.html>. Accessed Nov. 1, 2011, 8 pages (with English translation).
It's eye, Retrieved from the Internet: URL< www.hitachi.co.jp/rd/pdf/topics/hitac2003_10.pdf>. 11 pages, 2003 (with English translation).
Jarosiewicz et al., "Final Report—Lucid," University of Florida, Departmetn of Electrical and Computer Engineering, EEL 5666—Intelligent Machine Design Laboratory, 50 pages, Aug. 1999.
Jensfelt et al., "Active Global Localization for a mobile robot using multiple hypothesis tracking," *IEEE Transactions on Robots and Automation*, 17(5): 748-760, Oct. 2001.
Jeong et al., "An intelligent map-building system for indoor mobile robot using low cost photo sensors,"*SPIE*, vol. 6042, 6 pages, 2005.
Kahney, "Robot Vacs are in the House," Retrieved from the Internet: URL<www.wired.com/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages, Dec. 2003.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher RC3000 RoboCleaner,—Image, Accessed at <http://www.karcher.de/versions/int/assets/video/2_4_robo_en.swf>. Accessed Sep. 2009, 1 page.
Karcher USA, RC3000 Robotic Cleaner, website: http://www.karcher-usa.com/showproducts.php?op=view prod¶m1=143&param2=&param3=, 3 pages, accessed Mar. 2005.
Karcher, "Product Manual Download Karch", available at www.karcher.com, 16 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
King and Weiman, "HelpmateTM Autonomous Mobile Robots Navigation Systems," SPIE vol. 1388 Mobile Robots, pp. 190-198, 1990.
Kleinberg, The Localization Problem for Mobile Robots, Laboratory for Computer Science, Massachusetts Institute of Technology, 1994 IEEE, pp. 521-531, 1994.
Knights, et al., "Localization and Identification of Visual Landmarks," *Journal of Computing Sciences in Colleges*, 16(4):312-313, May 2001.
Kolodko et al., "Experimental System for Real-Time Motion Estimation," Proceedings of the 2003 IEEE/ASME International Conference on Advanced Intelligent Mechatronics (AIM 2003), pp. 981-986, 2003.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
Koolvac Robotic Vacuum Cleaner Owner's Manual, Koolatron, 2004, 13 pages.
Krotkov et al., "Digital Sextant," Downloaded from the internet at: http://www.cs.cmu.edu/~epk/ , 1 page, 1995.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.
Kurs et al, Wireless Power transfer via Strongly Coupled Magnetic Resonances, Downloaded from www.sciencemag.org, Aug. 2007, 5 pages.

Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Kwon et al., "Table Recognition through Range-based Candidate Generation and Vision based Candidate Evaluation," ICAR 2007, The 13th International Conference on Advanced Robotics Aug. 21-24, 2007, Jeju, Korea, pp. 918-923, 2007.
Lambrinos et al., "A mobile robot employing insect strategies for navigation," Retrieved from the Internat: URL<http://www8.cs.umu.se/kurser/TDBD17NT04/dl/Assignment%20Papers/lambrinos-RAS-2000.pdf>. 38 pages, Feb. 1999.
Lang et al., "Visual Measurement of Orientation Using Ceiling Features", 1994 IEEE, pp. 552-555, 1994.
Lapin, "Adaptive position estimation for an automated guided vehicle," *SPIE*, vol. 1831 Mobile Robots VII, pp. 82-94, 1992.
LaValle et al., "Robot Motion Planning in a Changing, Partially Predictable Environment," 1994 IEEE International Symposium on Intelligent Control, Columbus, OH, pp. 261-266, Aug. 1994.
Lee et al., "Development of Indoor Navigation system for Humanoid Robot Using Multi-sensors Integration", ION NTM, San Diego, CA pp. 798-805, Jan. 2007.
Lee et al., "Localization of a Mobile Robot Using the Image of a Moving Object," *IEEE Transaction on Industrial Electronics*, 50(3):612-619, Jun. 2003.
Leonard et al., "Mobile Robot Localization by tracking Geometric Beacons," *IEEE Transaction on Robotics and Automation*, 7(3):376-382, Jun. 1991.
Li et al. "Robust Statistical Methods for Securing Wireless Localization in Sensor Networks," Information Processing in Sensor Networks, 2005, Fourth International Symposium on, pp. 91-98, Apr. 2005.
Li et al., "Making a Local Map of Indoor Environments by Swiveling a Camera and a Sonar," Proceedings of the 1999 IEEE/RSJ International Conference on Intelligent Robots and Systems, pp. 954-959, 1999.
Lin et al., "Mobile Robot Navigation Using Artificial Landmarks," *Journal of robotics System*, 14(2): 93-106, 1997.
Linde, Dissertation—"On Aspects of Indoor Localization," Available at: https://eldorado.tu-dortmund.de/handle/2003/22854, University of Dortmund, 138 pages, Aug. 2006.
Lumelsky et al., "An Algorithm for Maze Searching with Azimuth Input", 1994 IEEE International Conference on Robotics and Automation, San Diego, CA vol. 1, pp. 111-116, 1994.
Luo et al., "Real-time Area-Covering Operations with Obstacle Avoidance for Cleaning Robots," IEEE, pp. 2359-2364, 2002.
Ma, Thesis—"Documentation on Northstar," California Institute of Technology, 14 pages, May 2006.
Madsen et al., "Optimal landmark selection for triangulation of robot position," Journal of Robotics and Autonomous Systems, vol. 13 pp. 277-292, 1998.
Malik et al., "Virtual Prototyping for Conceptual Design of a Tracked Mobile Robot," Electrical and Computer Engineering, Canadian Conference on, IEEE, PI. pp. 2349-2352, May 2006.
Martishevcky, "The Accuracy of point light target coordinate determination by dissectoral tracking system", SPIE vol. 2591, pp. 25-30, Oct. 23, 2005.
Maschinemarkt Würzburg 105, No. 27, pp. 3, 30, Jul. 5, 1999 (with English translation).
Matsumura Camera Online Shop: Retrieved from the Internet: URL<http://www.rakuten.co.jp/matsucame/587179/711512/>. Accessed Nov. 2011, 15 pages (with English translation).
Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.
McGillem et al., "Infra-red Lacation System for Navigation and Autonomous Vehicles," 1988 IEEE International Conference on Robotics and Automation, vol. 2, pp. 1236-1238, Apr. 1988.
McGillem,et al. "A Beacon Navigation Method for Autonomous Vehicles," *IEEE Transactions on Vehicular Technology*, 38(3):132-139, Aug. 1989.

(56) References Cited

OTHER PUBLICATIONS

McLurkin "Stupid Robot Tricks: A Behavior-based Distributed Algorithm Library for Programming Swarms of Robots," Paper submitted for requirements of BSEE at MIT, May 2004, 127 pages.
McLurkin, "The Ants: A community of Microrobots," Paper submitted for requirements of BSEE at MIT, May 1995, 60 pages.
Michelson, "Autonomous navigation," McGraw-Hill—Access Science, Encyclopedia of Science and Technology Online, 2007, 4 pages.
Miro et al., "Towards Vision Based Navigation in Large Indoor Environments," Proceedings of the IEEE/RSJ International Conference on Intelligent Robots and Systems, Beijing, China, pp. 2096-2102, Oct. 2006.
MobileMag, "Samsung Unveils High-tech Robot Vacuum Cleaner," Retrieved from the Internet: URL<http://www.mobilemag.com/content/100/102/C2261/>. 4 pages, Mar. 2005.
Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.
Moore et al., "A simple Map-bases Localization strategy using range measurements," *SPIE*, vol. 5804 pp. 612-620, 2005.
Morland,"Autonomous Lawnmower Control", Downloaded from the internet at: http://cns.bu.edu/~cjmorlan/robotics/lawnmower/report.pdf, 10 pages, Jul. 2002.
Munich et al., "ERSP: A Software Platform and Architecture for the Service Robotics Industry," Intelligent Robots and Systems, 2005. (IROS 2005), pp. 460-467, Aug. 2005.
Munich et al., "SIFT-ing Through Features with ViPR", IEEE Robotics & Automation Magazine, pp. 72-77, Sep. 2006.
Nam et al., "Real-Time Dynamic Visual Tracking Using PSD Sensors and extended Trapezoidal Motion Planning", Applied Intelligence 10, pp. 53-70, 1999.
Nitu et al., "Optomechatronic System for Position Detection of a Mobile Mini-Robot," *IEEE Ttransactions on Industrial Electronics*, 52(4):969-973, Aug. 2005.
On Robo, "Robot Reviews Samsung Robot Vacuum (VC-RP3OW)," Retrieved from the Internet: URL <www.onrobo.com/reviews/AT_Home/vacuum_cleaners/on00vcrb30rosam/index.htm>. 2 pages, 2005.
OnRobo "Samsung Unveils Its Multifunction Robot Vacuum," Retrieved from the Internet: URL <www.onrobo.com/enews/0210/samsung_vacuum.shtml>. 3 pages, Mar. 2005.
Pages et al., "A camera-projector system for robot positioning by visual serving," Proceedings of the 2006 Conference on Computer Vision and Pattern Recognition Workshop (CVPRW06), 8 pages, Jun. 2006.
Pages et al., "Optimizing Plane-to-Plane Positioning Tasks by Image-Based Visual Servoing and Structured Light," *IEEE Transactions on Robotics*, 22(5):1000-1010, Oct. 2006.
Pages et al., "Robust decoupled visual servoing based on structured light," 2005 IEEE/RSJ, Int. Conf. on Intelligent Robots and Systems, pp. 2676-2681, 2005.
Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun./Jul. 1994.
Park et al., "Dynamic Visual Servo Control of Robot Manipulators using Neutral Networks," *The Korean Institute Telematics and Electronics*, 29-B(10):771-779, Oct. 1992.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.
Paromtchik et al., "Optical Guidance System for Multiple mobile Robots," Proceedings 2001 ICRA. IEEE International Conference on Robotics and Automation, vol. 3, pp. 2935-2940, May 2001.

Penna et al., "Models for Map Building and Navigation", IEEE Transactions on Systems. Man. and Cybernetics., 23(5):1276-1301, Sep./Oct. 1993.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.
Pirjanian, "Challenges for Standards for consumer Robotics," IEEE Workshop on Advanced Robotics and its Social impacts, pp. 260-264, Jun. 2005.
Pirjanian, "Reliable Reaction," Proceedings of the 1996 IEEE/SICE/RSJ International Conference on Multisensor Fusion and Integration for Intelligent Systems, pp. 158-165, 1996.
Prassler et al., "A Short History of Cleaning Robots," Autonomous Robots 9, 211-226, 2000, 16 pages.
Put Your Roomba . . . On, Automatic webpages: http://www.acomputeredge.com/roomba, 5 pages, accessed Apr. 2005.
Remazeilles et al., "Image based robot navigation in 3D environments," Proc. of *SPIE*, vol. 6052, pp. 1-14, Dec. 2005.
Rives et al., "Visual servoing based on ellipse features," *SPIE*, vol. 2056 Intelligent Robots and Computer Vision pp. 356-367, 1993.
Roboking—not just a vacuum cleaner, a robot!, Jan. 21, 2004, infocom.uz/2004/01/21/robokingne-prosto-pyilesos-a-robot/, accessed Oct. 10, 2011, 5 pages.
RoboMaid Sweeps Your Floors So You Won't Have to, the Official Site, website: Retrieved from the Internet: URL<http://therobomaid.com>. 2 pages, accessed Mar. 2005.
Robot Buying Guide, "LG announces the first robotic vacuum cleaner for Korea," Retrieved from the Internet: URL<http://robotbg.com/news/2003/04/22/lg_announces_the_first_robotic_vacu>. 1 page, Apr. 2003.
Robotics World, "A Clean Sweep," 5 pages, Jan. 2001.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," *SPIE*, vol. 1388 Mobile Robots, pp. 453-463, 1990.
Sahin et al., "Development of a Visual Object Localization Module for Mobile Robots," 1999 Third European Workshop on Advanced Mobile Robots, (Eurobot '99), pp. 65-72, 1999.
Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE* Proc. 3208, pp. 24-36, 1997.
Schofield, "Neither Master nor slave—A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.

(56) References Cited

OTHER PUBLICATIONS

Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Celluar Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Takio et al., "Real-Time Position and Pose Tracking Method of Moving Object Using Visual Servo System," 47th IEEE International Symposium on Circuits and Systems, pp. 167-170, 2004.
Tech-on!, Retrieved from the Internet: URL<http://techon.nikkeibp.co.jp/members/01db/200203/1006501/>. 7 pages, accessed Nov. 2011 (with English translation).
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmorework1printable.jhtml, 1 page, Accessed Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, 2004, Accessed at http://ww.totalvac.com/robot_vacuum.htm (Mar. 2005), 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," *IEEE*, pp. 1393-1399, 2007.

Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
UBOT, cleaning robot capable of wiping with a wet duster, Retrieved from the Internet: URL<http://us.aving.net/news/view.php?articleId=23031>. 4 pages, accessed Nov. 2011.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yujin Robotics,"An intelligent cleaning robot," Retrieved from the Internet: URL<http://us.aving.net/news/view.php?articleId=7257>. 8 pages, accessed Nov. 2011.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.
Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.
Zhang et al., "A Novel Mobile Robot Localization Based on Vision," *SPIE* vol. 6279, 6 pages, Jan. 2007.
Zoombot Remote Controlled Vaccuum-RV-500 New Roomba 2, website: http://cgi.ebay.com/ws/eBayISAPI.dll?ViewItem&category=43526&item=4373497618&rd=1, accessed Apr. 20, 2005, 7 pages.
Extended European Search Report issued in EP Application No. 14183566.0, dated Jan. 8, 2015, 6 pages.
International Search Report and Written Opinion issued in International Application No. PCT/US2006/046395, dated Jul. 23, 2007, 14 pages.
Extended European Search Report issued in EP Application No. 10181669.2, dated Apr. 26, 2013, 5 pages.
Non-final Office Action issued in U.S. Appl. No. 14/044,346, dated Mar. 16, 2015, 69 pages.

\* cited by examiner

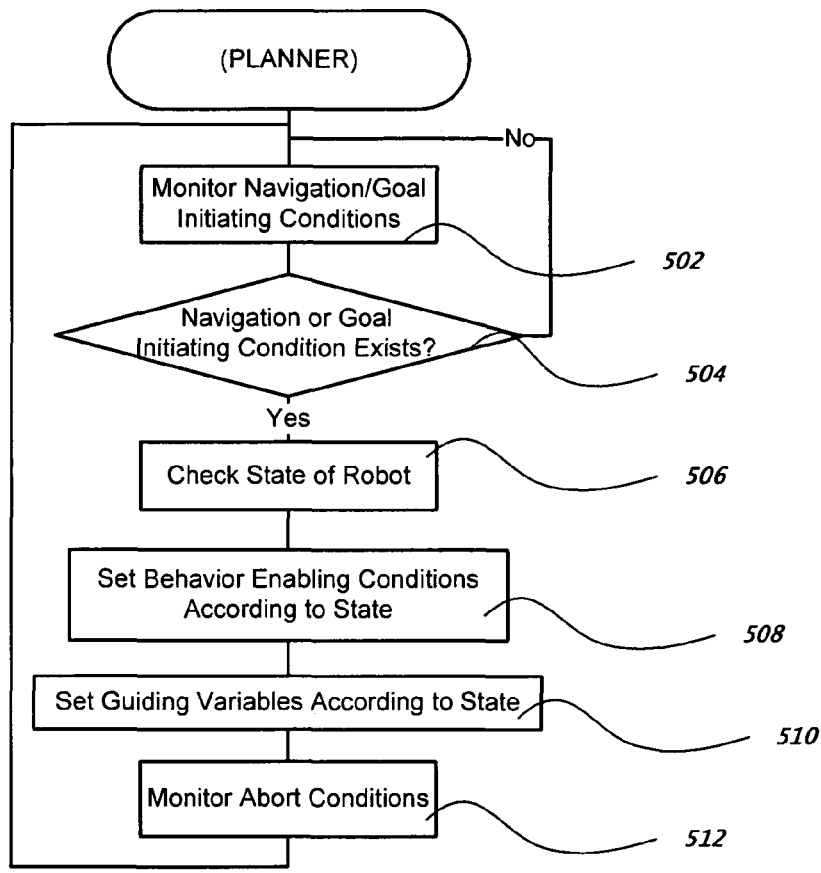
FIG. 25A
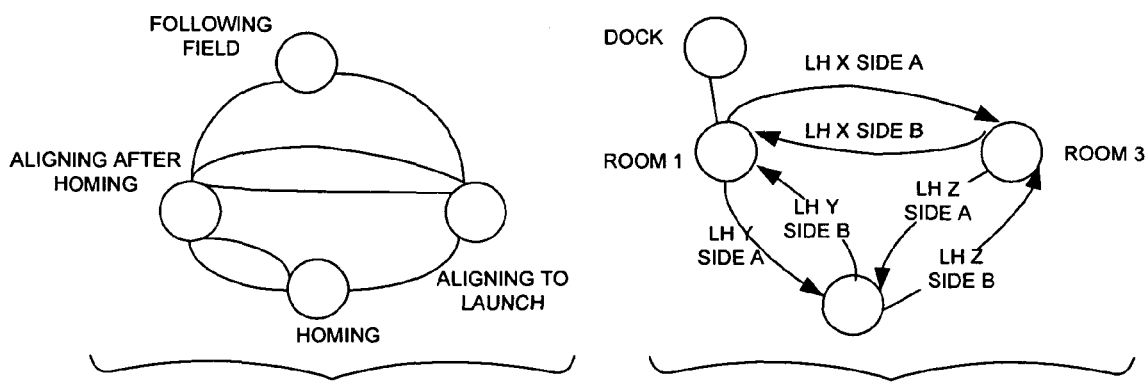
FIG. 25B
FIG. 25C

AUTONOMOUS COVERAGE ROBOT NAVIGATION SYSTEM

This U.S. patent application claims priority under 35 U.S.C. 119(e) to a U.S. provisional patent application filed on Dec. 2, 2005, entitled "ROBOT NETWORKING, THEMING AND COMMUNICATION SYSTEM" and having assigned Ser. No. 60/741,442, the entire contents of which are hereby incorporated by reference.

TECHNICAL FIELD

This invention relates to robots, and more particularly to autonomous coverage robots and associated navigation systems.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

SUMMARY

In one aspect, an autonomous coverage robot includes a chassis defining a forward drive direction, a controller carried by the chassis, omni-directional receiver carried by the chassis, and a directional receiver disposed on a forward portion of the chassis and responsive to an emission incident on the forward portion of the chassis from the drive direction. The directional receiver includes a mounting receptacle defining first and second apertures substantially aligned with the drive direction, and first and second component receivers housed in the receptacle and positioned to be responsive to the emission received through the first and second apertures, respectively. The component receivers are each configured to generate a respective signal in response to the emission. The controller is configured to determine a direction of the emission in relation to the drive direction based on the signals generated by the component receivers.

The directional receiver is installed onto a front portion of the chassis and housed within the mounting receptacle. The mounting structure stabilizes and supports the directional receiver which is used for docking and navigation throughout a room. The directional receiver includes two detectors which are highly directional in the sense that they are able to detect peaks of an overlapping signal from far away and servo in on the source of the beam using those peaks. In one example, the first and second component receivers of the directional receiver are positioned to form an angle of between about 1 and 15 degrees there between. In addition, the first and second component receivers may be collimated to focus at a point between about 3 and 5 meters from the robot or on any point within each bounded area.

The controller maneuvers the robot to detect an emission with the omni-directional receiver, and in response to the detection, orients the chassis to align the robot drive direction with the determined emission direction based on the signals generated by the component receivers of the directional receiver. The controller, in response to a detected emission with the directional receiver, orients the chassis to align the robot drive direction with the determined emission direction based on the signals generated by the component receivers of the directional receiver. The receivers may be configured to receive transmissions of infrared light.

In one implementation, the omni-directional receiver includes a housing having an upper portion and defining an inner cavity, a conical, and an emission receiver. The upper portion allows a transmission of an emission into the inner cavity. The conical reflector is disposed on an upper surface of the cavity to reflect emissions incident on the upper portion of the housing down into the cavity. The emission receiver is disposed in the cavity below the conical reflector.

In one example, the robot includes a floor cleaning assembly carried by the chassis, a cleaning bin carried by the chassis and arranged to collect debris removed from a floor by the cleaning assembly, and a bin sensor. The bin sensor is configured to generate a signal indicative of the cleaning bin reaching a threshold filling that causes the controller to initiate a docking sequence.

In another aspect, an autonomous mobile robot system for bounded areas includes a navigation beacon and an autonomous coverage robot. The navigation beacon has a gateway beacon emitter arranged to transmit a gateway marking emission with the navigation beacon disposed within a gateway between the first bounded area and an adjacent second bounded area. The autonomous coverage robot includes a beacon emission sensor responsive to the beacon emission, and a drive system configured to maneuver the robot about the first bounded area in a cleaning mode in which the robot is redirected in response to detecting the gateway marking emission. The drive system is also configured to maneuver the robot through the gateway into the second bounded area in a migration mode.

The beacon may be configured to emit an infrared signal for the gateway marking emission, or any other type of signal, which is readily stopped by a wall so as not to "bleed over" into adjacent rooms and uniquely identify the current room or locality in which the robot is located.

In one implementation, the robot remains in the first bounded area upon the robot redirection in response to detecting the gateway marking emission in the cleaning mode. The gateway marking emission may be infrared light and the beacon emission sensor is configured to detect transmissions of infrared light.

In another implementation, the drive system is configured to maneuver the robot about the first bounded area in the cleaning mode for a preset time interval, and to automatically initiate the migration mode at expiration of the time interval. The drive system is configured to maneuver the robot across the gateway emission in the migration mode.

In yet another implementation, the drive system is configured to maneuver the robot about the first bounded area in the cleaning mode until a preset number of encounters of the gateway marking emission have been detected, and then to automatically initiate the migration mode. The coverage robot's dwell time in one room or selective rooms can also be set by a timer or schedule, a number of collisions or interactions with a proximity beam of a particular beacon, a character or number of dirt or debris detections, remaining battery life, and maintenance or remote control overrides.

In one example, the robot includes a floor cleaning system that removes debris from the floor as the robot is maneuvered.

In some examples, the robot includes a transmitter that signals the beacon to disrupt transmission of the gateway emission in the migration mode.

In another example, the navigation beacon includes a vectoring beacon emitter arranged to transmit a directed vectoring emission into the first bounded area with the beacon disposed within the gateway. The robot drive system is configured to direct the robot toward the beacon upon encountering the vectoring emission in the migration mode. The navigation beacon transmits the directed vectoring emission, which may be infrared light, at an angle adjacent the cross-gateway direction of between about 45 and 90 degrees. The robot, while in the migration mode, discerns a position of the navigation beacon in response to detection of the directed vectoring emission and aligns a drive direction defined by the robot in relation to an emission path defined by the directed vectoring emission. The robot advances along the emission path to reach and traverse the gateway. The navigation beacon may also transmit a proximity emission laterally about the beacon, where the robot avoids cleaning and migration within the proximity emission.

In some examples, the robot wirelessly communicates with the navigation beacon to deactivate the directed vectoring emission while in the cleaning mode and activate the directed vectoring emission while in the migration mode. In other examples, the robot remotely activates the directed vectoring emission of the navigation beacon and deactivates the gateway emission upon initiating the migration mode. Furthermore, the robot remotely deactivates the directed vectoring emission of the navigation beacon and activates the gateway emission upon terminating the migration mode. The robot remotely activates and deactivates the emissions of the navigation beacon with a radiofrequency communication. The navigation beacon may also be configured to communicate schedule information with the robot.

The system may also include a base station located in one of the bounded areas. The base station includes a base defining a docking direction from which the robot may properly dock, and a robot charger housed in the base. An omni-directional beam emitter may be mounted on the base and configured to project a proximity beam laterally around the docking station. Two navigational field emitters are housed in the base and arranged to emit respective, laterally bounded and overlapping fields of emissions of signal beams, respectively. One of the emitted fields defines a lateral field edge aligned with the docking direction and overlapped by the other of the fields. The two navigational field emitters of the base station are positioned to form an angle therebetween of between about 45 and 90 degrees. The fields of emissions of the two navigational field emitters of the base station may be infrared light.

In another aspect, a method of navigating an autonomous coverage robot between bounded areas includes positioning a navigation beacon in a gateway between adjoining first and second bounded areas. The beacon configured to transmit a gateway marking emission across the gateway. In some example, the navigation beacon may also transmit a proximity emission laterally about the beacon, where the robot avoids cleaning and migration within the proximity emission. The method also includes placing the coverage robot within the first bounded area. The robot autonomously traverses the first bounded area in a cleaning mode and upon encountering the gateway marking emission in the gateway, the robot remains in the first bounded area, thereby avoiding the robot migration into the second area. Upon termination of the cleaning mode in the first area, the robot autonomously initiates a migration mode to move through the gateway, past the beacon, into the second bounded area.

In some examples, the robot remotely deactivates the gateway marking emission of the navigation beacon upon initiating the migration mode and activates the gateway marking emission upon terminating the migration mode. The gateway marking emission may be infrared light. In other examples, the robot is non-responsive to the gateway emission while in the migration mode.

In one example, upon termination of the migration mode in the second area, the robot autonomously initiates the cleaning mode in the second bounded area.

In one example, the navigation beacon is configured to transmit a directed vectoring emission into the first bounded area with the beacon disposed within the gateway. The robot drives toward the beacon upon detecting the vectoring emission in the migration mode. Detecting the directed vectoring emission in the migration mode includes the robot sensing the directed vectoring emission with a directional receiver on the robot, where the directional receiver is aligned with a robot drive direction, and the robot aligning the robot drive direction with a path defined by the directed vectoring emission. The robot may also sense the directed vectoring emission with an omni-directional receiver on the robot before maneuvering to detect the directed vectoring emission by the directional receiver on the robot. The robot moves past the beacon by moving towards the beacon along the emission path, sensing a beacon perimeter emitted by the beacon, and moving along the beam perimeter through the gateway and into the second area.

In another aspect, a method of navigating an autonomous coverage robot between bounded areas includes positioning a navigation beacon in a gateway between adjoining first and second bounded areas. The beacon is configured to transmit a directed emission into the first bounded area and a gateway emission in a cross-gateway direction. The method also includes placing the coverage robot within the first bounded area. The robot autonomously traverses the first bounded area in a cleaning mode and upon encountering the gateway emission, the robot remains in the first bounded area, thereby avoiding the robot migration into the second area. Upon termination of the cleaning mode in the first area, the robot autonomously initiates a migration mode to move through the gateway into the second bounded area by detecting the directed emission and, in response to the directed emission, moves past the beacon through the gateway and into the second area.

The navigation beacon includes a base positionable in the gateway, the base defining a cross-gateway direction. A gateway beam emitter is housed in the base and arranged to emit a beam in the cross-gateway direction. First and second directional beam emitters are housed in the base and arranged to emit respective focused beams into each of the adjoining areas when the base is positioned in the gateway. An omni-directional beam emitter is disposed on the base and configured to project a proximity beam laterally around the beacon. The first and second directional focused beams form angles adjacent the cross-gateway direction of between about 45 and 90 degrees.

Another example of the navigation beacon includes a beam emitter emitting a beam along the line of a "virtual wall" and a circular proximity beam (and/or RF zone) to prevent the robot collisions when detected by the robot. A first beam emitter may be positioned in the gateway to emit a beam across the gateway. A second beam emitter may be positioned in the gateway to emit a beam angled into a first room and modulated to signify the first room. A third beam emitter may be positioned in the gateway to emit a beam angled into a second adjoining room and modulated to signify the second room.

The navigation beacon can also act as a virtual temporary confinement wall or gateway, where the robot stays within the virtual gateway(s) for, e.g., a predetermined number of virtual gateway interactions or time span, then crosses the virtual gateway and resets its time or incident counter to dwell in the next "room" which could be partially or wholly defined by virtual gateways.

Multiple beacons may be employed to define the boundaries of each bounded area. The directed vectoring and gateway emissions may be infrared light. Each transmitted emission is differentiated by time division multiplexing with a fixed period random offset. Each beacon is encoded differently (e.g. left and right beams) and can be set by a DIP switch or other such device located on the beacon. The beacon encoding can be set or changed by the robot (e.g. via RF commands issued by the robot) as the robot encounters successive beacons or two beacons with the same encoding. The beacon may be set to be virtual walls or threshold markers (or both). As the robot encounters each beacon, the robot counts the beacons and identifies them by their modulation. The first one encountered is number one, and is believed to be nearest a base. The second one is number two, farther yet. The third one is number three, farther yet. The left and right side beams or directed beams of the beacons are encoded differently. As a result, the robot can record which side is thought to be nearer to the base. When the robot is ready to return to the base (e.g. timed out, low battery remaining, bin full, schedule finished, maintenance needed, general event triggered, or under any other circumstances), the robot looks for the lowest numbered beacon with an away-side beam and heads in that direction. The directionality of the beam also allows the robot to maneuver past the beacon appropriately. For example, on the way out from the base station, the robot passes directed beam A and directed beam B, sequentially, of a beacon, either one or both on the left side of the robot. To return to the base station the robot should wait/hunt/clean until it detects directed beam B of the beacon. The robot then approaches the beacon by following beam B until it detects a proximity beam of the beacon. The robot turns left and proceeds in a curved path along an edge of the proximity beam while hunting/cleaning until the robot detects beam A. The robot follows beam A out away from the beacon and then hunts/cleans for the base station. This is merely one example of how to navigate using the directionality of the room-identifying left and right beacons.

In some examples, upon termination of the migration mode in the second area, the robot autonomously initiates a docking mode to maneuver towards a base station in the second area and docking with the station. The base station includes a base defining a docking direction from which the robot may properly dock, a robot charger housed in the base, an omni-directional beam emitter mounted on the base and configured to project a proximity beam latently around the base station, and two navigational field emitters housed in the base and arranged to emit respective, laterally bounded and overlapping fields of emissions of signal beams, respectively. One of the emitted fields defines a lateral field edge aligned with the docking direction and overlapped by the other of the fields. The robot maneuvers towards the base station by detecting and advancing along the lateral field edge of the overlapping fields aligned with the docking direction until docked with the station. The two navigational field emitters, which may be infrared emitters, are positioned to form an angle therebetween of between about 45 and 90 degrees. The robot detects the emissions of the base station with an omni-directional receiver on the robot and maneuvers to detect an outer lateral field edge of at least one field emission. The robot advances along the outer lateral field edge of the one field emission to the aligned lateral field edge of the overlapping fields. Upon detecting the aligned lateral field edge, the robot advances along the aligned lateral field edge until docked with the station.

DESCRIPTION OF DRAWINGS

Like reference symbols in the various drawings indicate like elements.

FIGS. 25A-C show schematic views of a robot moving from one area to another using a navigation beacon.

Like reference symbols in the various drawings indicate like elements.

DETAILED DESCRIPTION

Figure 1A:
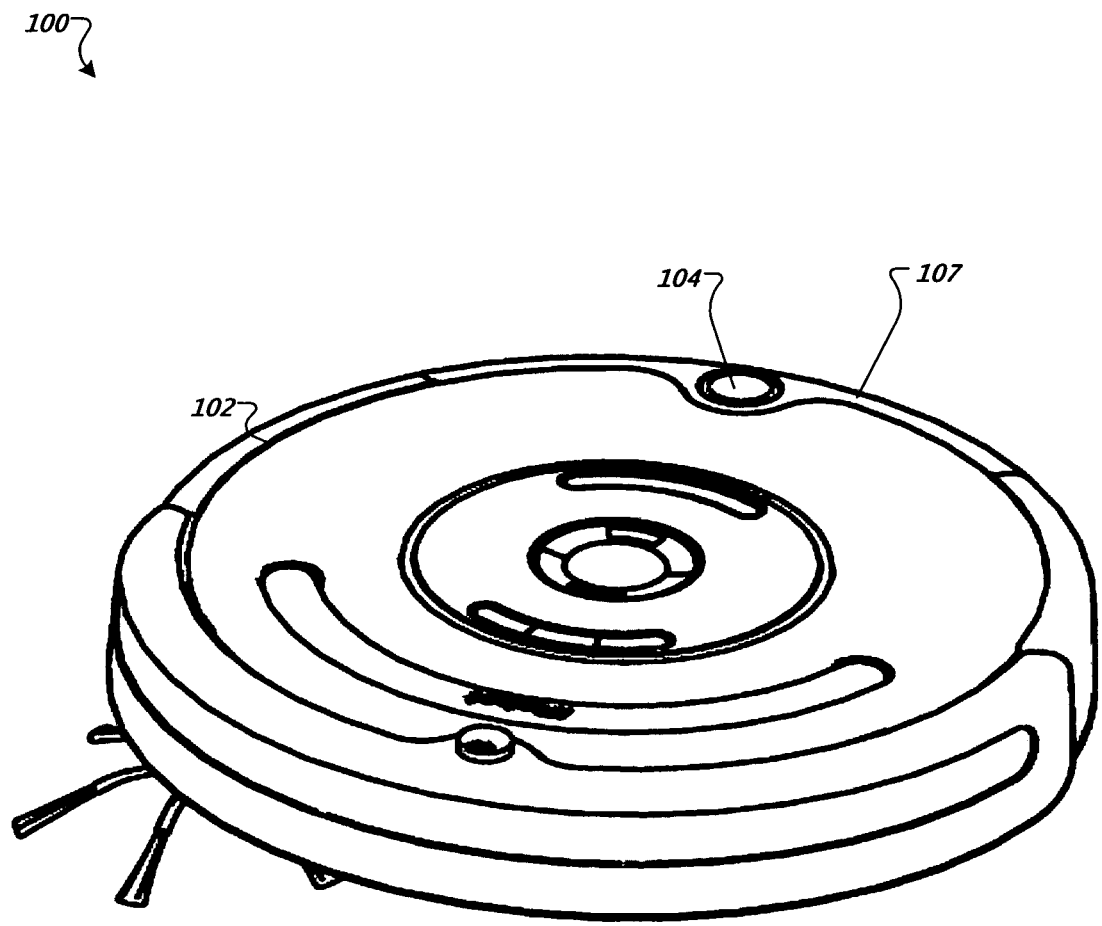
FIG. 1A is a perspective view showing an example of an autonomous coverage robot.
Figure 1B:
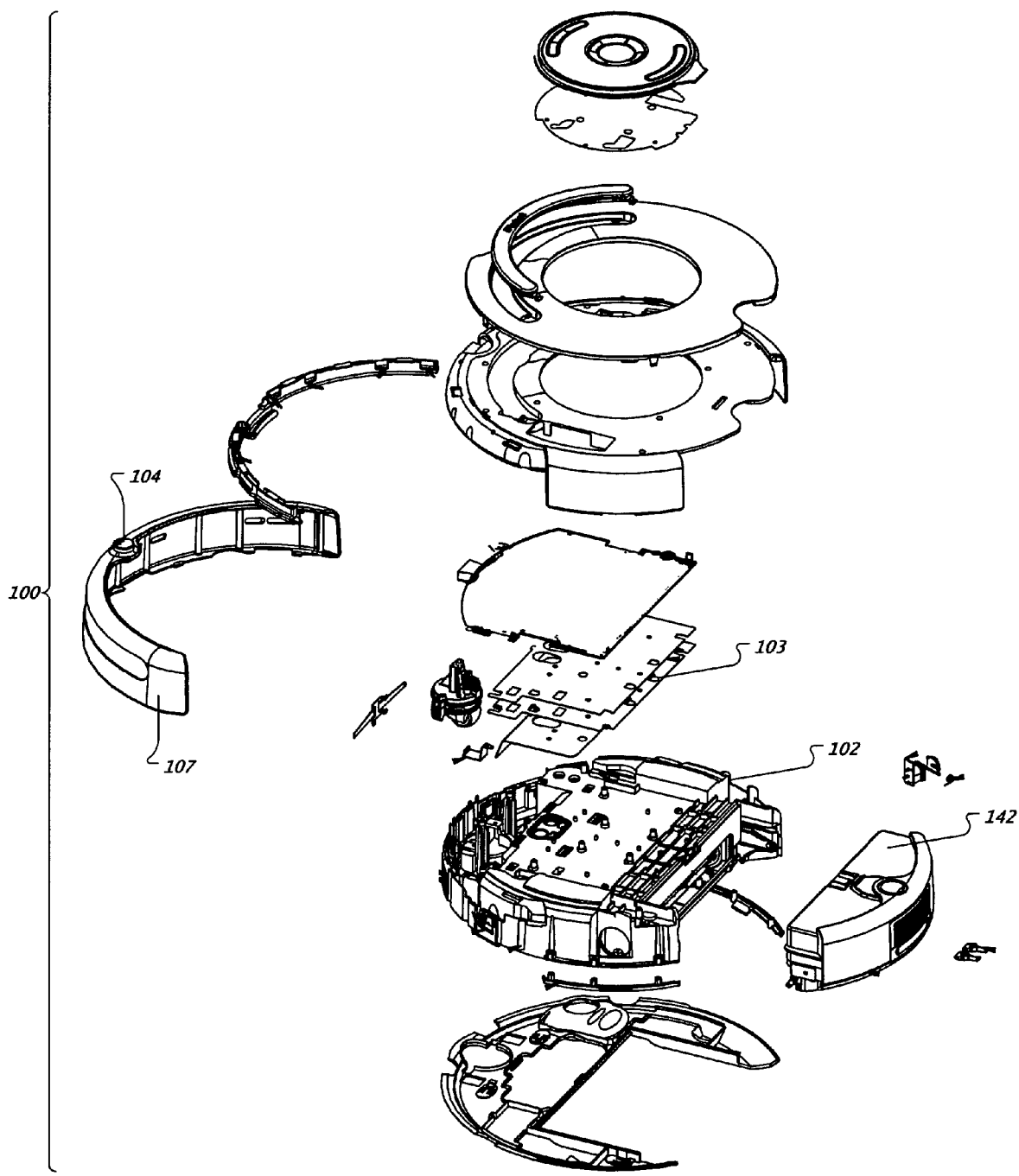
FIG. 1B is an exploded views of an autonomous coverage robot.

FIGS. 1A and 1B show above-perspective and exploded views of an autonomous coverage robot 100. The robot 100 has a chassis 102, a controller 103, an omni-directional receiver 104, and a directional receiver 106. Chassis 102 has a forward drive direction and carries controller 103 and the receivers 104 and 106 on a bumper 107. Receivers 104 and 106 provide navigation information to controller 103. Using input from receivers 104 and 106, controller 103 generates commands to be carried out by the robot 100. As a result, the robot 100 is capable of cleaning floors in an autonomous fashion.

Figure 1C:
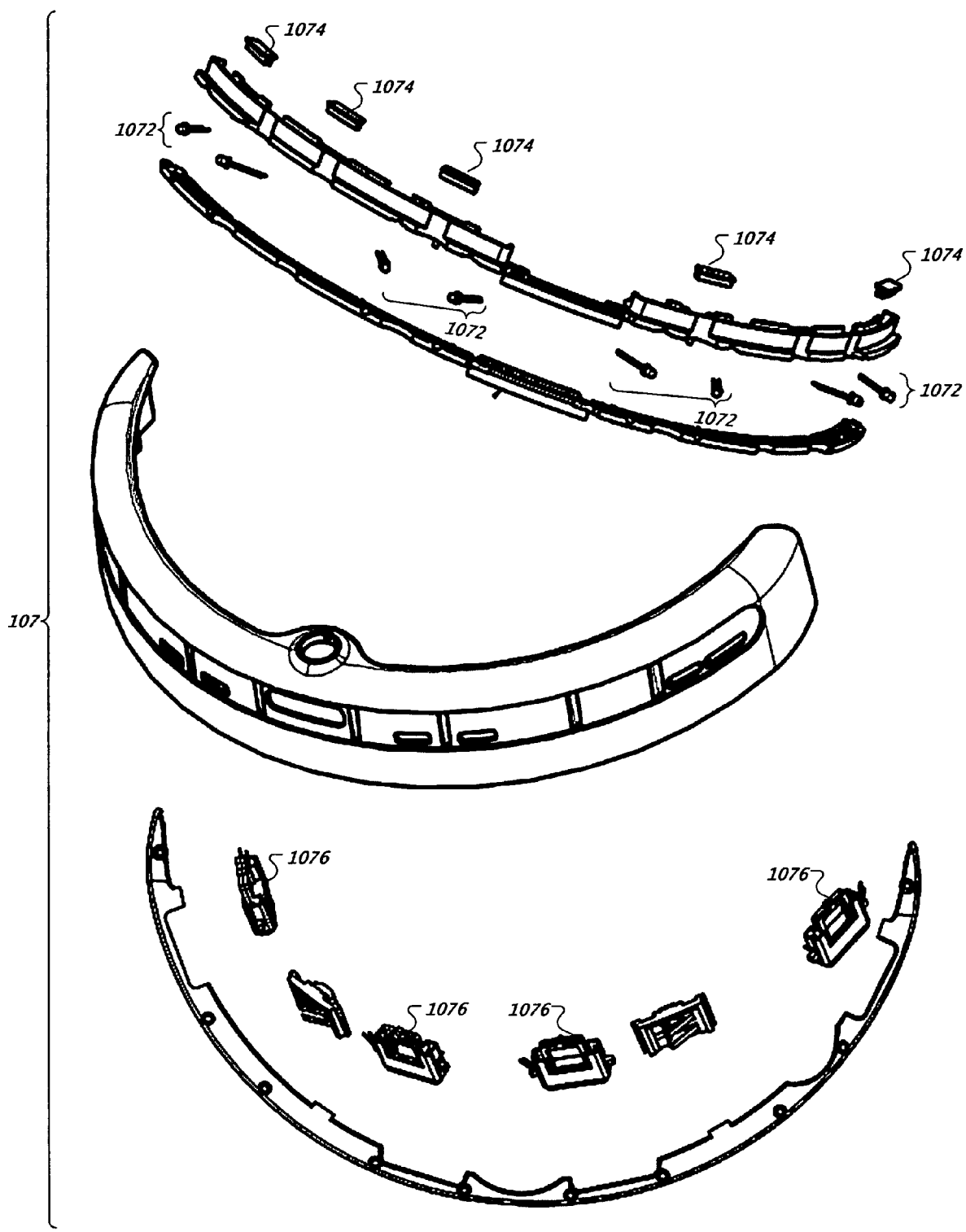
FIG. 1C is an exploded views of a bumper of an autonomous coverage robot.
Figure 2:
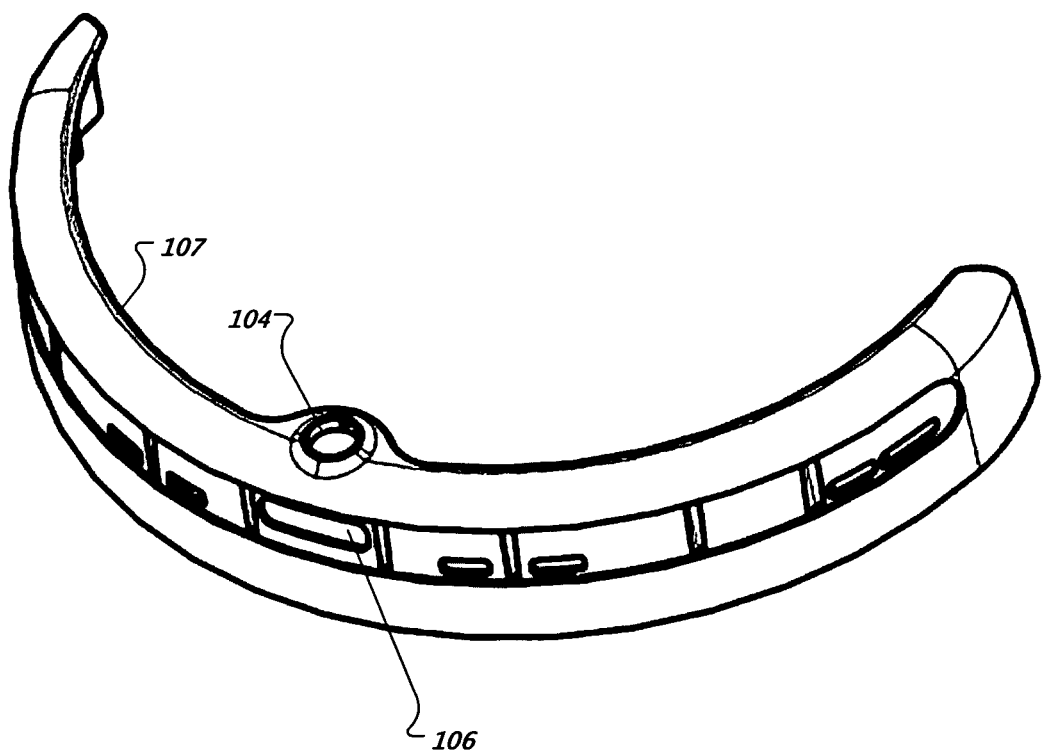
FIG. 2 illustrates the positions of omni-directional receiver and directional receiver on the bumper of an autonomous coverage robot.

FIG. 2 illustrates the positions of omni-directional receiver 104 and directional receiver 106 on the bumper 107 of the robot 100. Bumper 107 may also have other sensors, as shown in FIG. 1C, to aid the robot 100 as it navigates about its surroundings. Proximity sensors 1072 may be used to determine when an obstacle is close to the robot 100. Contact sensors 1074 may be used to determine when the robot 100 has physically encountered an object. Cliff sensors 1076 may be used to sense when the robot 100 has encountered the edge of the floor, such as when it encounters a set of stairs.

Omni directional sensors 104 may be used to sense when the robot 100 is in close proximity to a navigation beacon. For example, the omni-directional sensor 104 may relay a signal to a control system that indicates the strength of an emission, where a stronger signal indicates closer proximity to a navigation beacon.

Proximity sensors 1072 may be used to detect when an obstacle is nearby. The proximity sensors 1072 may, for example, be infrared or ultrasonic sensors that provide a signal when an object is within a given range of the robot 100.

Contact or bump sensors 1074 may be used to detect if the robot 100 physically encounters an obstacle. Such sensors 1074 may use a physical property such as capacitance or physical displacement within the robot 100 to determine when it has encountered an obstacle.

Cliff sensors 1076 may be used to sense when the robot 100 has encountered the edge of the floor, such as when it encounters a set of stairs. The robot 100 may have behaviors that cause it to take an action, such as changing its direction of travel, when an edge is detected.

In some implementations, cliff sensors 1074 may be installed within a mounting apparatus that stabilizes and protects the sensor and which positions the sensor to point towards the window installed onto the bottom of the mounting apparatus. Together the sensor, the mounting apparatus and the window comprise a cliff sensor unit. There may, for instance, be four cliff sensor units installed within the bumper.

Reliability of a cliff sensor may be increased by reducing dust buildup.

In some implementations, a window may be installed on the bottom of the mounting apparatus which includes a shield mounted within a slanted molding composed of a material which prevents dust build up, such as an antistatic material. The shield component and the molding may be welded together. To further facilitate the reduction in dust and dirt buildup, the shield may be mounted on a slant to allow dirt to more easily slide off.

In some implementations, a secondary cliff sensor may be present behind existing cliff sensors to detect floor edges in the event that a wheel drop sensor on the caster wheel fail.

Controller 103 may be configured to propel the robot 100 according to a heading setting and a speed setting. Signals received from proximity and contact sensors may be used by the control system to issue commands that deal with obstacles. Signals from the proximity and contact sensors may cause the control system to change the commanded speed or heading of the robot 100. For instance, a signal from a proximity sensor due to a nearby wall may result in the control system issuing a command to slow down. In another instance, a collision signal from the contact sensors due to an encounter with a chair may cause the control system to issue a command to change heading. In other instances, the speed setting of the mobile the robot may not be reduced in response to the contact sensor; and/or the heading setting of the mobile the robot may not be altered in response to the proximity sensor, but instead the two sensors may operate independently.

Controller 103 may include a first independent behavioral routine configured to adjust the speed setting of the mobile the robot; and a second independent behavioral routine configured to alter the heading setting of the mobile the robot, in which the first and second independent behavioral routines are configured to execute concurrently and mutually independently. The first independent behavioral routine may be configured to poll the proximity sensor, and the second independent behavioral routine may be configured to poll the kinetic bump sensor.

Figure 3:
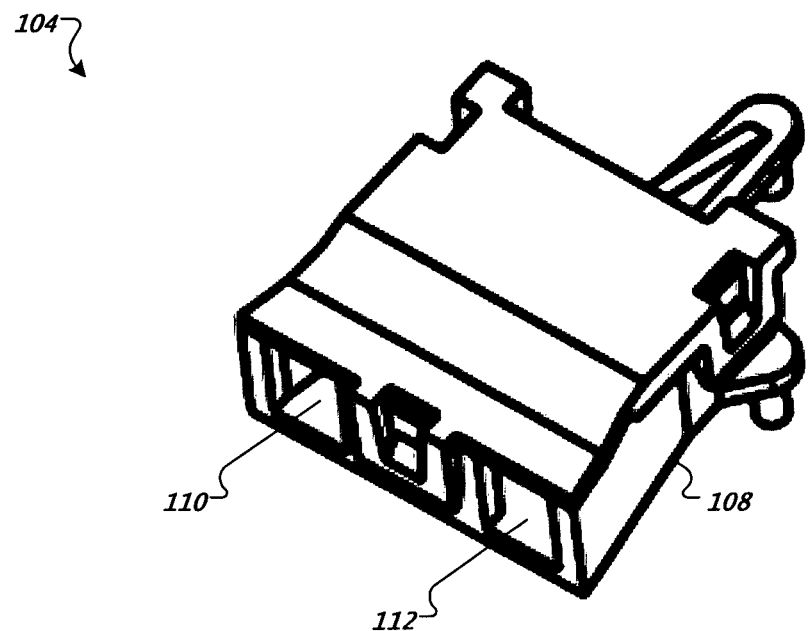
FIG. 3 is a perspective view of a directional receiver.
Figure 4:
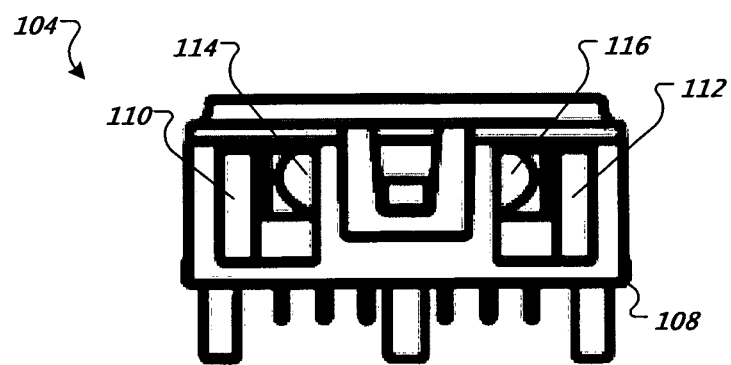
FIG. 4 is a front view of a directional receiver.
Figure 5:
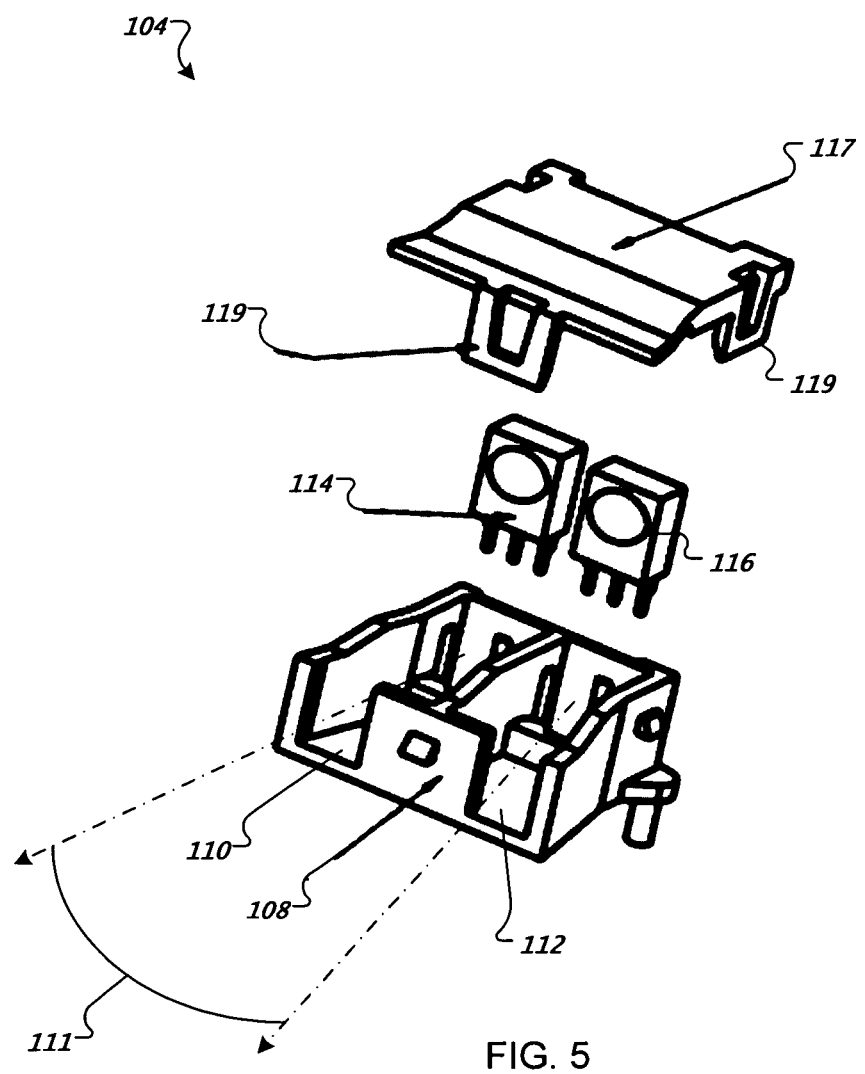
FIG. 5 is an exploded view of the directional receiver.

FIG. 3-5 show perspective, front, and exploded views of the directional receiver 104. The directional receiver 104 is positioned on the front of the chassis 102. Emissions may be received along the drive direction by the directional receiver 104 which generates and sends corresponding signals to controller 103. The directional receiver 104 includes a mounting receptacle 108 with a first aperture 110 and a second aperture 112 that are aligned with the drive direction of the chassis 102. Associated with the apertures 110, 112 are a first component receiver 114 and a second component receiver 116.

The component receivers 114, 116 are positioned relative to the apertures 110, 112 such that emissions which originate along the driving direction and fall on the directional receiver 104 may pass through the apertures 110, 112 and onto their respective component receivers 114, 116. Emissions falling on the component receivers 114, 116 result in a corresponding signals being generated which may be used by controller 103 to determine the direction of the emission relative to the robot's drive direction. A cover 117 attached to the top of the mounting receptacle 108 to prevent emissions that do not originate along the driving direction from falling on the component receivers 114, 116. In some implementations, locking tabs 119 or some other fastening method may be used to secure the cover 117 to the mounting receptacle 108.

In some implementations, the component receivers 114, 116 of the directional receiver 104 can detect a homing beam with an overlap of substantially between 10% and 30%. In one example, the first and second component receivers 114, 116 may be positioned such that emissions falling squarely on each would form an angle in the range of 1 to 15 degrees. In another example, the first and second component receivers 114, 116 may be aligned so emissions aligned with them cross at a point 3 to 5 meters in front of the robot. In one example, each component receiver 114, 116 receives emissions within a sweep angle of between about 28 to 33 degrees with a center of the sweep at about 14 degrees from a direction normal to the directional receiver 104 and a sweep overlap of about 10 degrees with the other component receiver 114, 116.

In some cases, the controller 103 may maneuver the robot 100 to detect an emission with the omni-directional receiver 104. The direction of the emission may be determined using the component receivers 114, 116. In response to the detection, the controller 103 may orient the chassis 102 to align the robot drive direction with the determined emission direction.

In other cases, controller 103 may orient the chassis 102 to align the robot drive direction with the determined emission direction based on the signals generated by the component receivers 114, 116 in response to emissions detected with the directional receiver 106.

Figure 6:
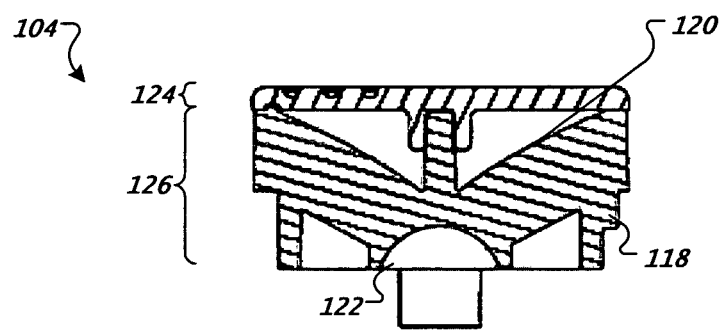
FIGS. 6-8 show perspective, side, and cut-away views of the omni-directional receiver.
Figure 7:
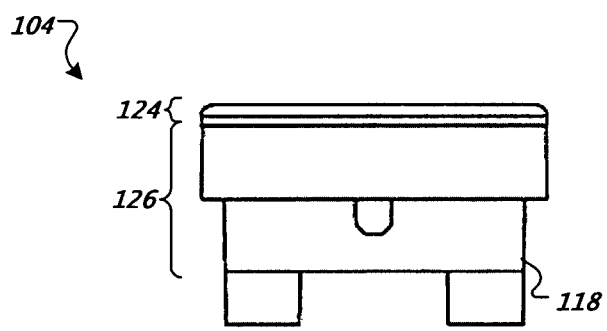
Figure 8:
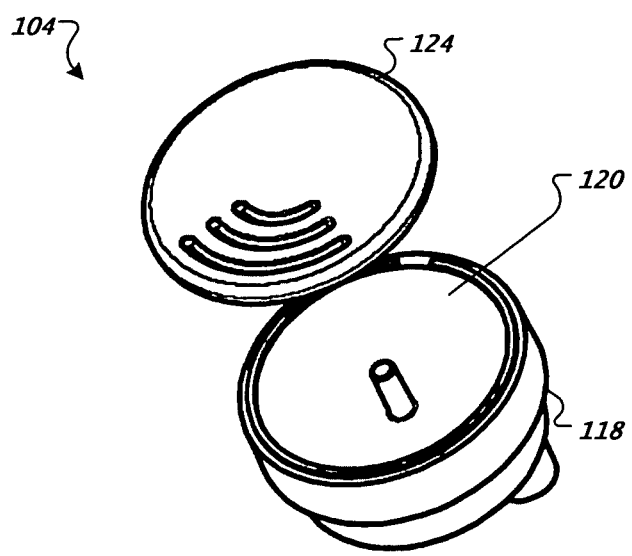

FIGS. 6-8 show perspective, side, and cut-away views of the omni-directional receiver 104. The omni-directional receiver 104 may include a housing 118, a conical reflector 120 and an emission receiver 122. The housing 118 has an upper portion 124 and an inner cavity 126. The upper portion 124 may allow a transmission of an emission into inner cavity 126. Conical reflector 120 is located on an upper surface of the cavity 126 to reflect emissions falling on the upper portion 124 of the housing 118 into the inner cavity 126. Emission receiver 122 is located in inner cavity 126 below conical reflector 120.

In some implementations, the receivers 114, 116, and 122 may be configured to receive transmissions of infrared light (IR). In such cases, a guide 128 (e.g. a light pipe) may guide emissions reflected off the conical reflector 120 and channels them to emission receiver 122.

Figure 9:
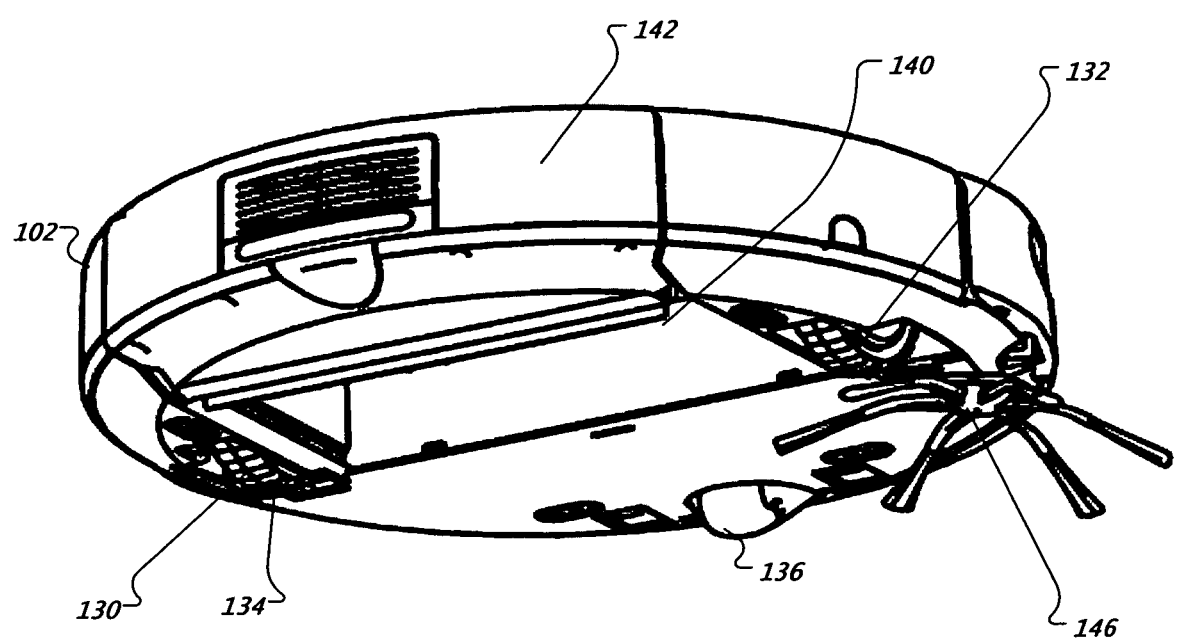
FIG. 9 shows a below-perspective view autonomous coverage robot.

FIG. 9 shows a below-perspective view of the autonomous coverage robot 100. A drive system 130 includes a first drive wheel 132 and a second drive wheel 134 which support chassis 102. A castor 136 may provide additional support to chassis 102. Motors may be mechanically coupled to the drive wheels to propel the robot 100, providing forward, reverse, and turning capabilities.

The robot 100 may have a floor cleaning system that removes dirt and debris from the floor as it maneuvers about. The floor cleaning system may include a floor cleaning assembly 140, a cleaning bin 142 and a bin sensor (not shown). The floor cleaning assemblies 140 and 146 and cleaning bin 142 may be carried by the chassis 102. Cleaning bin 142 may be arranged to collect debris removed from a floor being cleaned by cleaning assembly 140. The bin sensor may be configured to generate a signal that indicates whether the cleaning bin has been filled to a threshold. When the threshold has been reached, controller 103 may initiate a docking sequence with a base station (described below). Cleaning bin 142 may be accessed to empty its contents either manually or, in some implementations, the robot 100 may automatically empty cleaning, bin 142 when docked.

In addition to providing a framework for the other elements that make up the robot 100, the chassis 102 may have a ridge on its front which is higher than all other points on the chassis 102. Such a ridge may be stop the robot 100 if it encounters an overhead obstacle, such as a couch, and prevent it from becoming wedged underneath. To enable the robot 100 to more easily free itself in the event it becomes wedged, controller 103 may normally command the drive system 130 to operate at less than maximum torque, for instance at 50% of capacity. If the robot 100 becomes wedged, for instance, sensed by increased current flowing to the drive motors, controller 103 may command increased torque to free the robot 100.

Another example of an anti-wedging system includes a spring loaded wheel system having a potentiometer to measure how much the robot 100 is pushed down by a potential wedging obstacle. Another example includes an infrared sensor disposed on a lower surface of the robot 100, where the infrared sensor is used to measure a distance that the robot 100 is pushed down.

Figure 10:
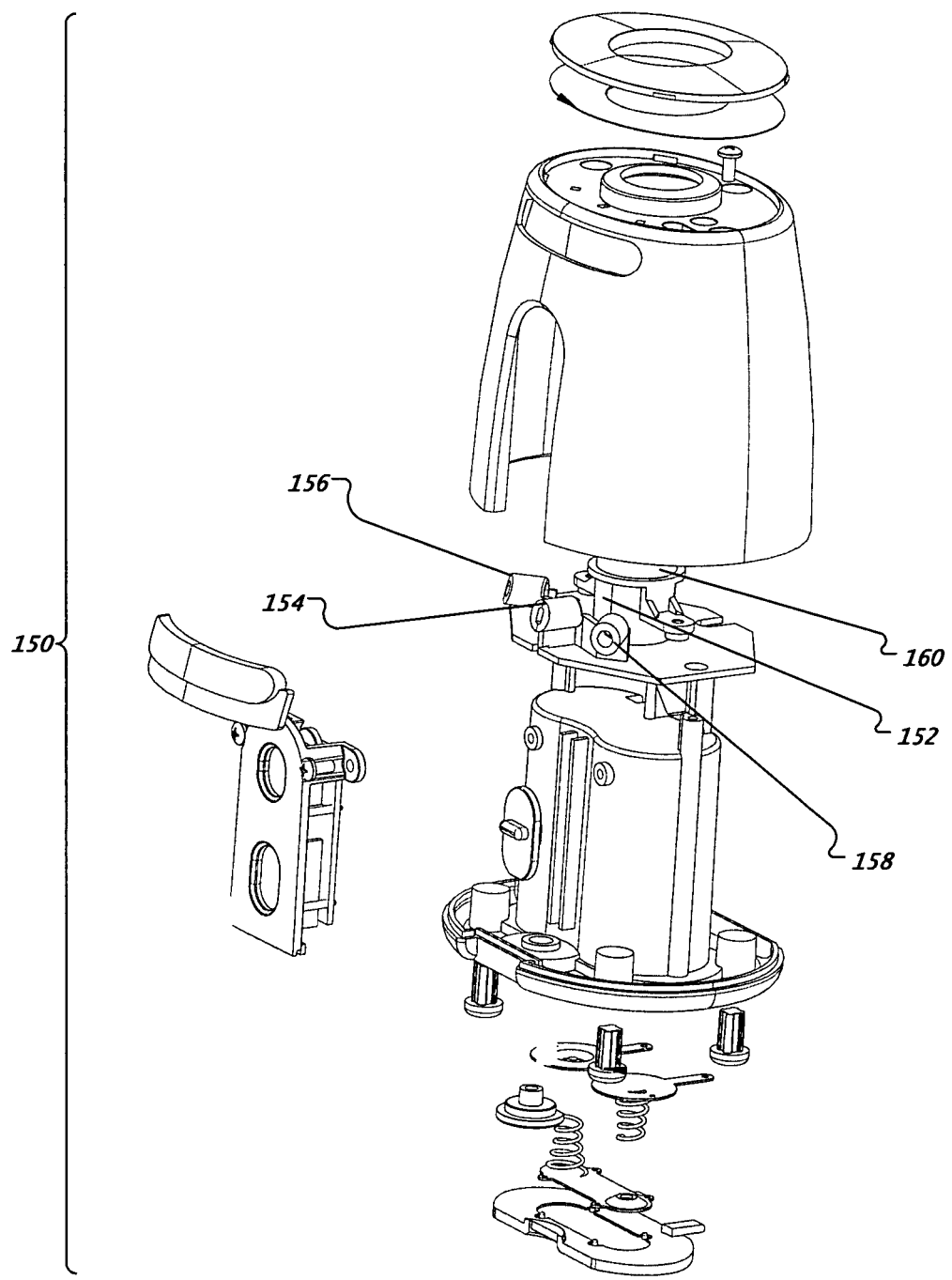
FIG. 10 shows an exploded view of an example navigation beacon.

FIG. 10 shows an exploded view of an example navigation beacon 150. Navigation beacon 150 may be used in conjunction with existing walls or other obstacles to create a bounded area. Bounding an area may be done, for example, to restrict a robot from entering or leaving an area. The navigation beacon 150, along with the robot 100 described above, form an example of an autonomous mobile robot system.

Navigation beacon 150 has a beacon emitter assembly 152, which includes a gateway beacon emitter 154 and an omni-directional emitter 160. Gateway beacon emitter 154 may be arranged to transmit a gateway marking emission. For instance, beacon 150 may be located within a gateway that separates a first and second adjacent areas and emit the gateway marking emission to form a boundary. Omni-directional receiver 104 and directional receiver 106 on the robot 100 may detect the gateway marking emissions and thereby function as beacon emission sensors. For example, beacon 150 and the robot 100 may use infrared light (IR) emitters and sensors to create and detect the gateway marking emissions.

In one example, the robot 100 controls the state of the navigation beams through commands transmitted over a packet radio network. The address that the beacons respond to on this network is a combination of a robot address and a node address. After installing batteries in the beacon 150, the beacon 150 periodically tries to contact any robot to see if it should wake up and operate its emitters. A robot 100 may respond by transmitting a radio packet containing an invitation to join its network and a temporary address to use. While operating with a temporary address, the beacon 150 transmits an infrared code in a fence beam from emitter 154 and force field beam from omni-directional emitter 160 indicating that it is not bound, i.e. its radio address is temporary. When a robot 100 sees a beam with the bound code, it iteratively transmits a radio packet to every recently assigned temporary address to send a new code in its beam called a wink. If the robot 100 sees a wink code, it transmits a radio packet containing a new node address to be used from now on as well as a time indicating the number of hours the address is valid for use. Having bound to a robot 100 successfully, the beacon 150 will henceforth only wake up in the presence of that robot 100. The technique of confirming radio communications using infrared light signals is designed to prevent a robot 100 that is not on the same floor as the beacon 150 from controlling it permanently.

Drive system 130 may be configured to maneuver the robot 100 about the first area while in a cleaning mode. In the cleaning mode, the robot 100 may be redirected in response to detecting the gateway marking emission. In addition, the drive system 130 may also be configured to maneuver the robot 100 through the gateway into the second bounded area while in a migration mode.

While in the cleaning mode, the robot 100 may remain in the first bounded area by changing its drive direction when it detects the gateway marking emission. The gateway marking emission thus acts as a virtual barrier which may prevent the robot 100 from leaving the first bounded area.

In some instances, the drive system 130 may be configured to maneuver the robot 100 about the first bounded area in the cleaning mode for a preset time interval. When the preset time interval elapses, the drive system 130 may be automatically put in migration mode. While in migration mode, drive system 130 may be configured to maneuver the robot 100 across the gateway emission. In other instances, the drive system may configured to maneuver the robot about the first bounded area in the cleaning mode until it encounters of the gateway marking emission a preset number of times. Once the gateway marking emission has been encountered the preset number of times, the migration mode may be automatically initiated.

The robot 100 may include a transmitter for communicating with beacon 150. The transmitter may be used to signals beacon 150 to halt or pause transmission of the gateway emission in the migration mode. By signaling beacon 150 to turn on its various emitters only when needed, the system may implement a power-saving function. Such a function may serve to extend battery life in beacon 150.

Figure 11:
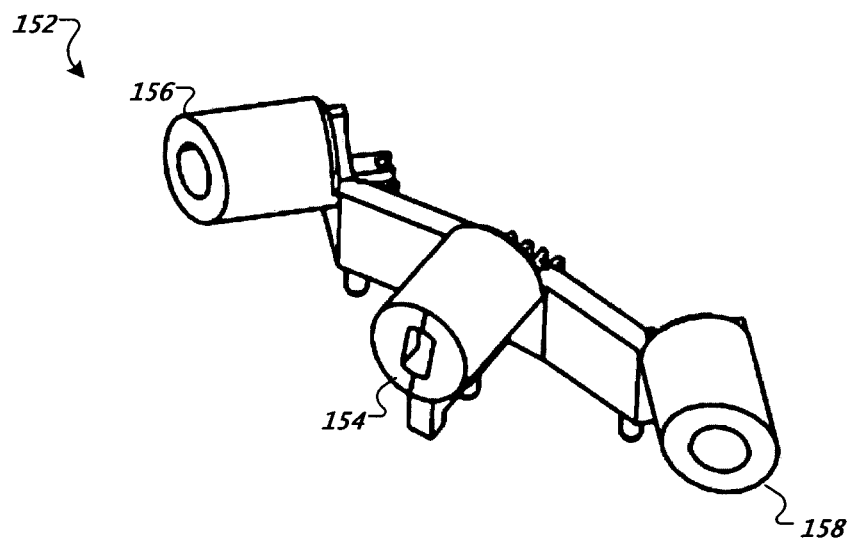
FIGS. 11 and 12 show perspective and front views of an example beacon emitter assembly.
Figure 12:
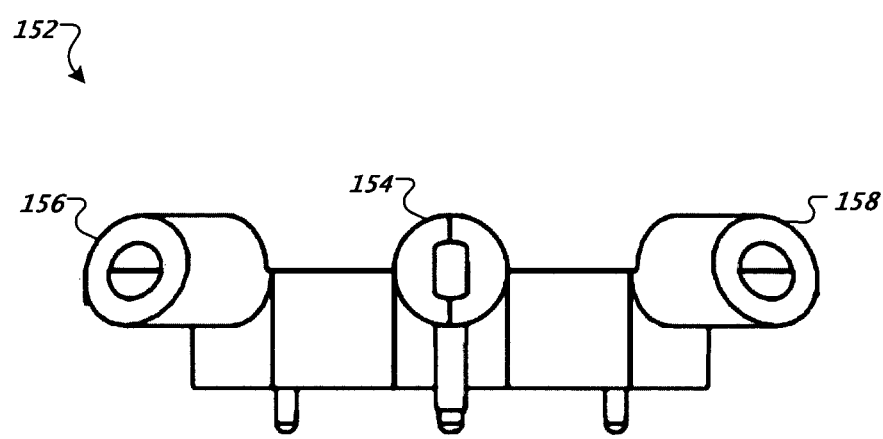

FIGS. 11 and 12 show perspective and front views of beacon emitter assembly 152. Beacon emitter assembly 152 includes a first directed vectoring beacon emitter 156 and a second directed vectoring beacon emitter 158. Directed vectoring beam emitters may be used to create an emission field with a characteristic edge and spread pattern that may be used to define a navigation route. Navigation beacon 150 may be located within a gateway between two bounded areas with vectoring beacon emitter 156 arranged to transmit a directed vectoring emission into the first bounded area. The angle between the directed vectoring emission and the gateway may be, for example, in the range of 45-90 degrees. In some instances, the directed vectoring emission may consist of infrared light.

While in migration mode, drive system 130 may be configured to direct the robot 100 toward beacon 150 when it encounters the directed vectoring emission emanating from vectoring beacon emitter 156. The robot 100 may then determine the position of the beacon 150 based on the detected direction of the directed vectoring emission relative to directional receiver 106. Once position is determined, the robot 100 may align itself in a drive direction relative to the directed vectoring emission. For example, the robot 100 may advance forward along the path of the directed vectoring emission to reach and traverse the gateway in which beacon 150 is located.

The robot 100 may be able to remotely activate and deactivate the beacon emissions. For example, the robot 100 may use wireless communication, such as radiofrequency (RF) communication, to pass activation and deactivation signals. The robot 100 may remotely activate the directed vectoring emission of the beacon 150 and deactivate the gateway emission upon initiating the migration mode. The robot 100 may remotely deactivate the directed vectoring emission of beacon 150 and activate the gateway emission upon terminating the migration mode.

In some instances, the beacon 150 may be configured to communicate schedule information with the robot 100. For example, beacon 150 may be able to transmit times for which the robot 100 should enter cleaning mode, when it should enter migration mode, etc. Schedule information may include details such as starting or ending times and dates.

Navigation beacon 150 may also transmit a proximity emission laterally about itself. The robot 100 may avoid cleaning and migration within the proximity emission by executing a pre-configured behavior such as changing its course when the proximity emission is detected. The proximity emission may be thought of as a "force field" through which the robot 100 is not permitted to pass.

Navigation beacon 150 may have a switch to select between a confinement mode, a navigation mode, and an off mode. Navigation beacon 150 may have a range select switch like a virtual wall. There may be a light to indicate when the navigation beacon is operating. The navigation beacon 150 may turn on an operational indicator light it is enabled or only when commanded to do so by the robot 100. There may also be a low battery warning, and there may be a separate low battery light.

In order to reduce power consumption and thus increase battery life, different operational modes may exist for the navigation beacon. When the robot 100 is not operating, navigation beacon 150 may be in a low power mode in which emitters are off and the navigation beacon periodically monitors the communication link to determine if a wakeup is necessary. When the robot 100 is operating, it may send a signal to a single or multiple navigation beacons to turn on their respective emitters. There may be different commands to turn on the various emitters. In addition, the navigation beacon may return to low power mode after an elapsed time.

In the event multiple navigation beacon are used with the robot 100, each navigation beacon may have a unique identifier, such as a 16-bit (or larger) identification number contained in memory. This identifier may be generated in the factory or by the navigation beacon itself. If the identifier is generated in the factory it may be stored in non-volatile memory in the beacon. The robot 100 may use the unique identifier to generate an internal map which may be used to navigate from one bounded region to another by navigating from one navigation beacon to another. In some implementations, the identifier for navigation beacon 150 may be used to generate signals encoded in its emissions that may be detected by the robot 100. In the event that navigation beacon 150 is unable to transmit the entire identification number, a unique code maybe generated as a derivation of the ID or by negotiation between the navigation beacons that are present and/or the robot 100.

The robot and navigation beacons may communicate via point to point or via broadcast transmissions. In the point to point scheme, the robot would have to learn the identifiers of all of the navigation beacons. Then it could send transmissions with a data field indicating the destination navigation beacon. That navigation beacon and only that navigation beacon would respond accordingly. This has the advantage that only specific navigation beacons would respond, keeping other navigation beacons off and thus increasing their battery life. User interaction may be used to train the robot to know the navigation beacons.

An alternate concept is for the robot to broadcast to all navigation beacons a command to enable them. This scheme works without user interaction. In order to mitigate this effect of increased battery consumption and reduced battery life on these navigation beacons, an alleviating technique is to reduce the power of the robot transmission.

Figure 13:
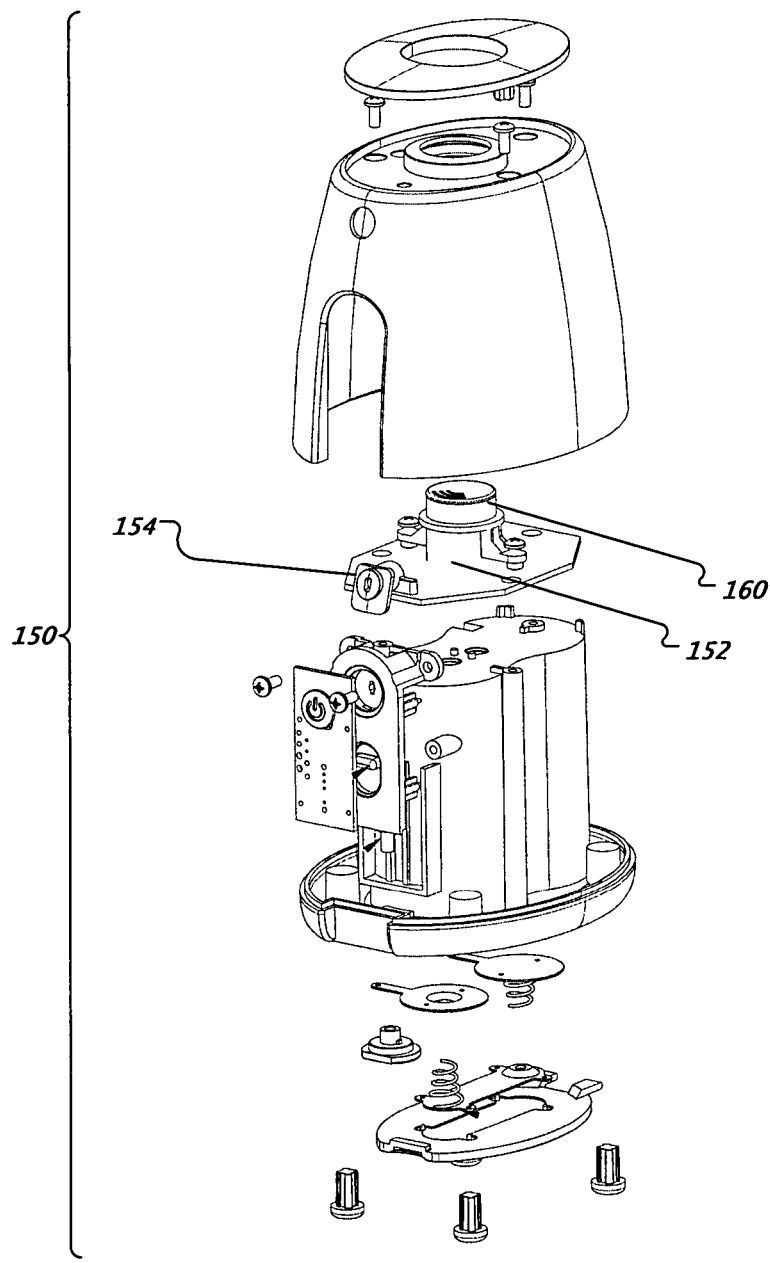
FIG. 13 shows an example of a simplified navigation beacon that may be used with an autonomous mobile robot navigation system.
Figure 14:
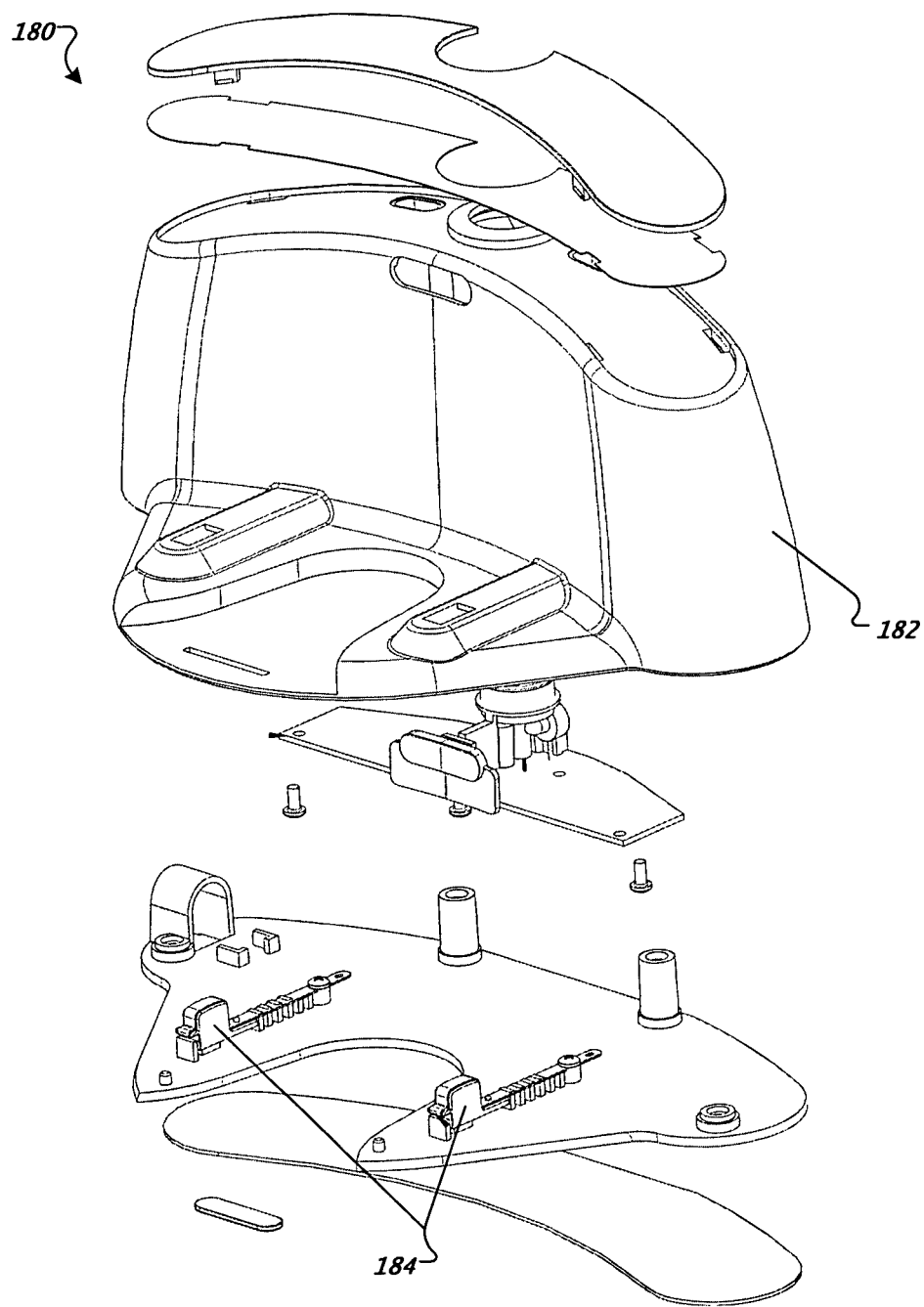
FIGS. 14-17 show various views of an example base station that may be included in the autonomous mobile robot system.
Figure 15:
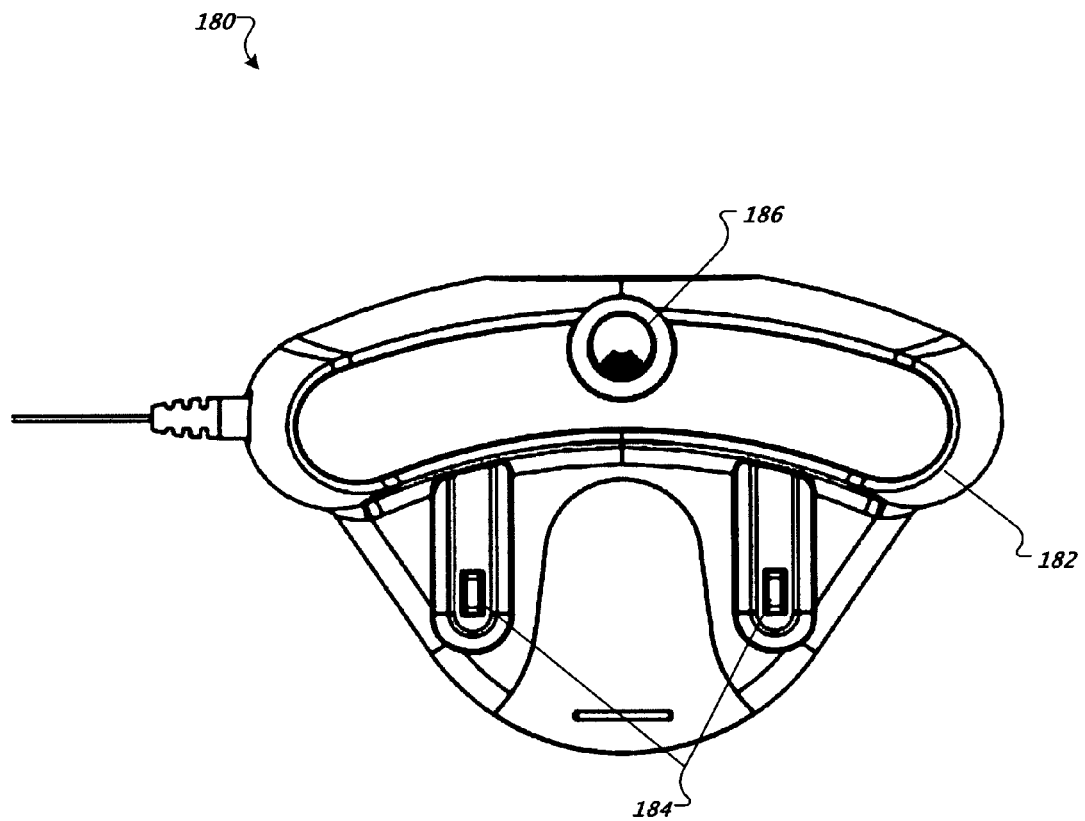
Figure 16:
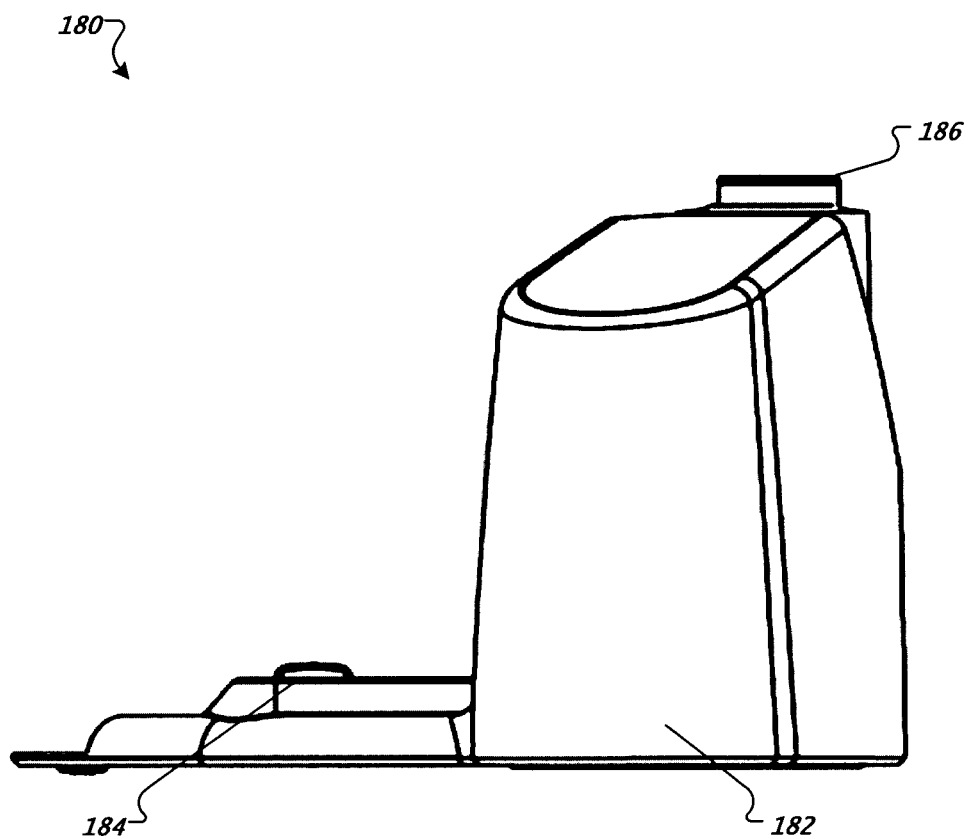
Figure 17:
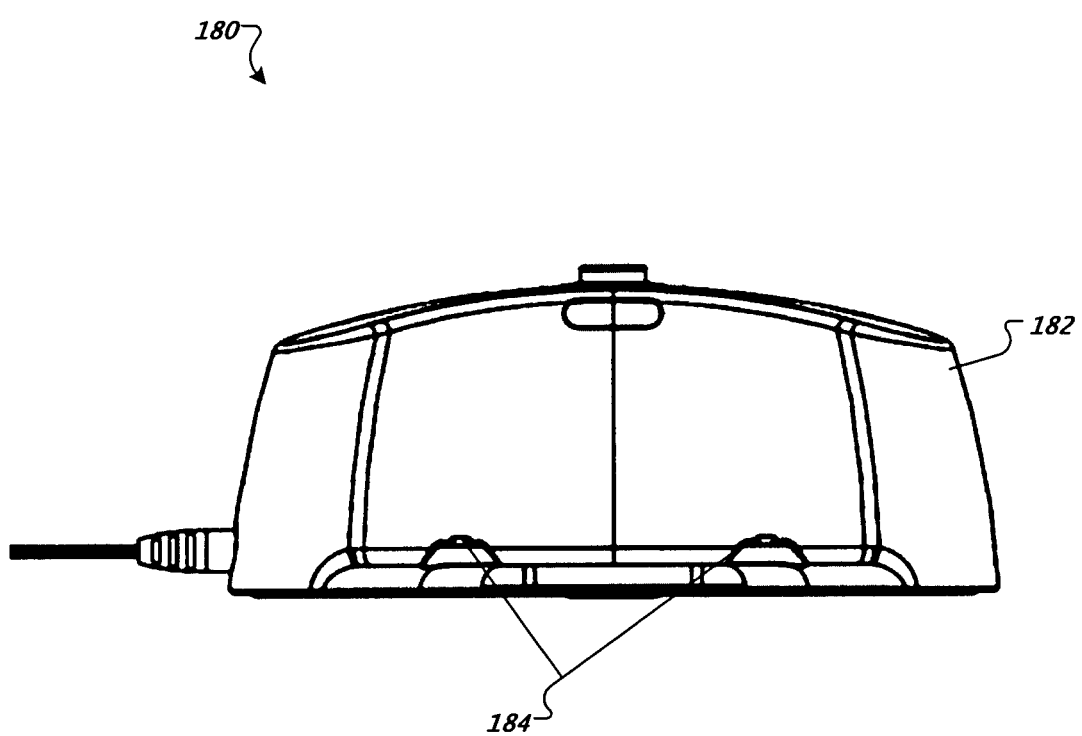
Figure 18:
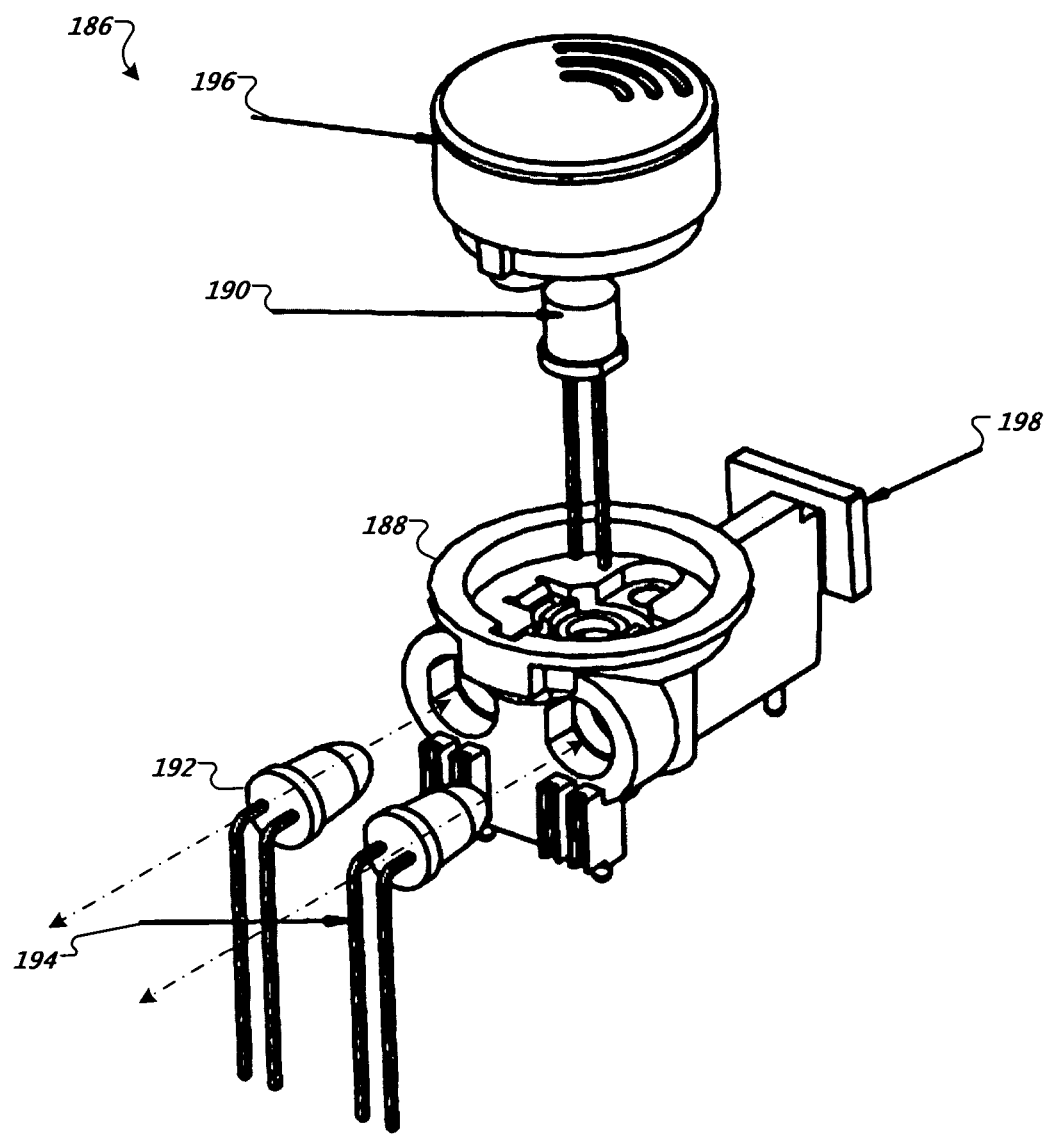
FIGS. 18-21 show perspective, top, rear, and side views of an example emitter assembly used in base station.
Figure 19:
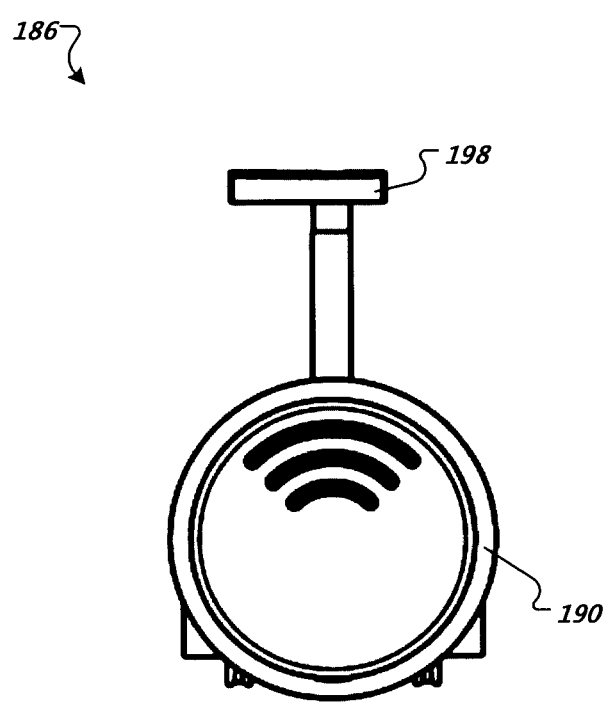
Figure 20:
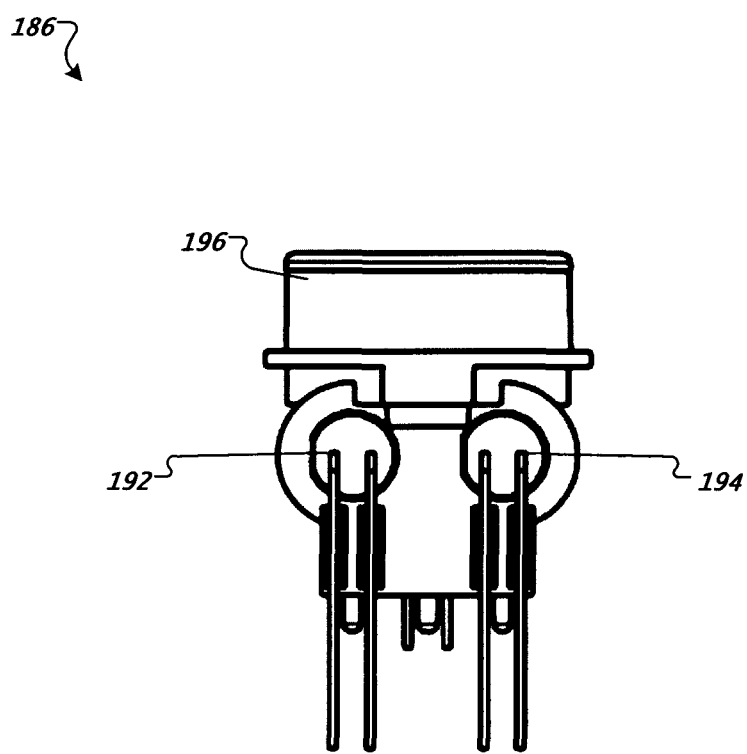
Figure 21:
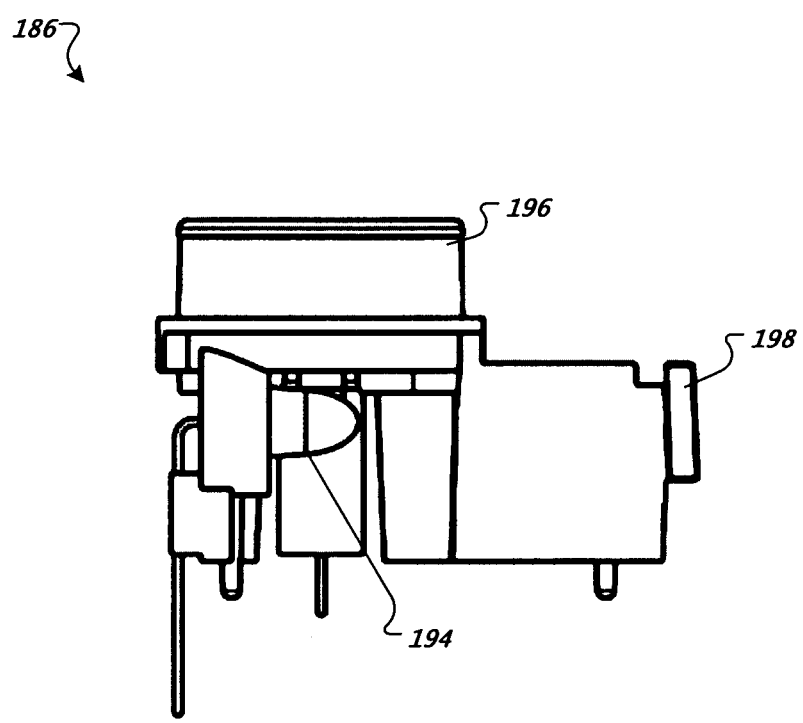

FIG. 13 shows an example of a simplified navigation beacon 152 that may be used with an autonomous mobile robot navigation system. In this example, the beacon has a beacon emitter assembly 152 including a gateway emitter 154 and an omni-directional emitter 160, but does not have vectoring emitters. Such a beacon may be used to define boundaries of a region but not necessarily support migration functionality.

FIGS. 14-17 show various views of an example base station 180 that may be included in the autonomous mobile robot system. Base station 180 may be located in a bounded area served by the system. Base station 180 has a base 182 with a defined docking direction and a robot charger 184. The robot 100 may approach base 182 from the docking direction to dock with the base 182. The robot charger 184 is housed in the base 182 and may be used to charge the robot 100 when it is properly docked.

The robot charger 184 may begins operating when triggered by a detection circuit after the robot 100 is docked to base 182. Battery conditions may be used to govern whether a deeply discharge mode, a pre-charge trickle mode, or a post charge trickle mode is used to charge the battery.

FIGS. 18-21 show perspective, top, rear, and side views of an example emitter assembly 186 used in base station 180.

Emitter assembly 186 has a lower housing 188 which holds an omni-directional beam emitter 190 and two navigational field emitters 192 and 194.

The omni-directional emitter 190 may be mounted on housing 188 and be configured to project a proximity beam laterally around the docking station through the use of an upper housing 196. Upper housing 196 may be configured such that emissions from omni-directional emitter 190 form a desired pattern outside base 182, such as a circle.

Navigational field emitters 192 and 194 may be attached to lower housing 188 and arranged to emit respective, laterally bounded and overlapping fields of emissions of signal beams. One of the emitted fields may define a lateral field edge aligned with the docking direction and be overlapped by the other emitted fields. The two navigational field emitters of the base station may be positioned such that their angle of overlap may be about 6 degrees and each emitter's aperture angle may be 20-30 degrees. A projection 198 on lower housing 188 may be used to shape the emissions from emitters 192, 194 to achieve the above pattern. In one example, the navigational field emitters 192 projects a beam at about 12 degrees from a direction normal to the emitter assembly 186, where the beam sweeps about 40 degrees starting from about −5 degrees to about 35. The other navigational field emitters 194, with the L-shaped baffle or mask 198 terminating near the middle of the LED, projects a beam at about 12 degrees from a direction normal to the emitter assembly 186, where the beam sweeps from straight out to about −35 degrees. In some implementations, the emission fields may consist of infrared light (IR). In such cases, field emitters 190, 192, and 194 may consist of infrared light emitting diodes (LEDs).

Figure 22:
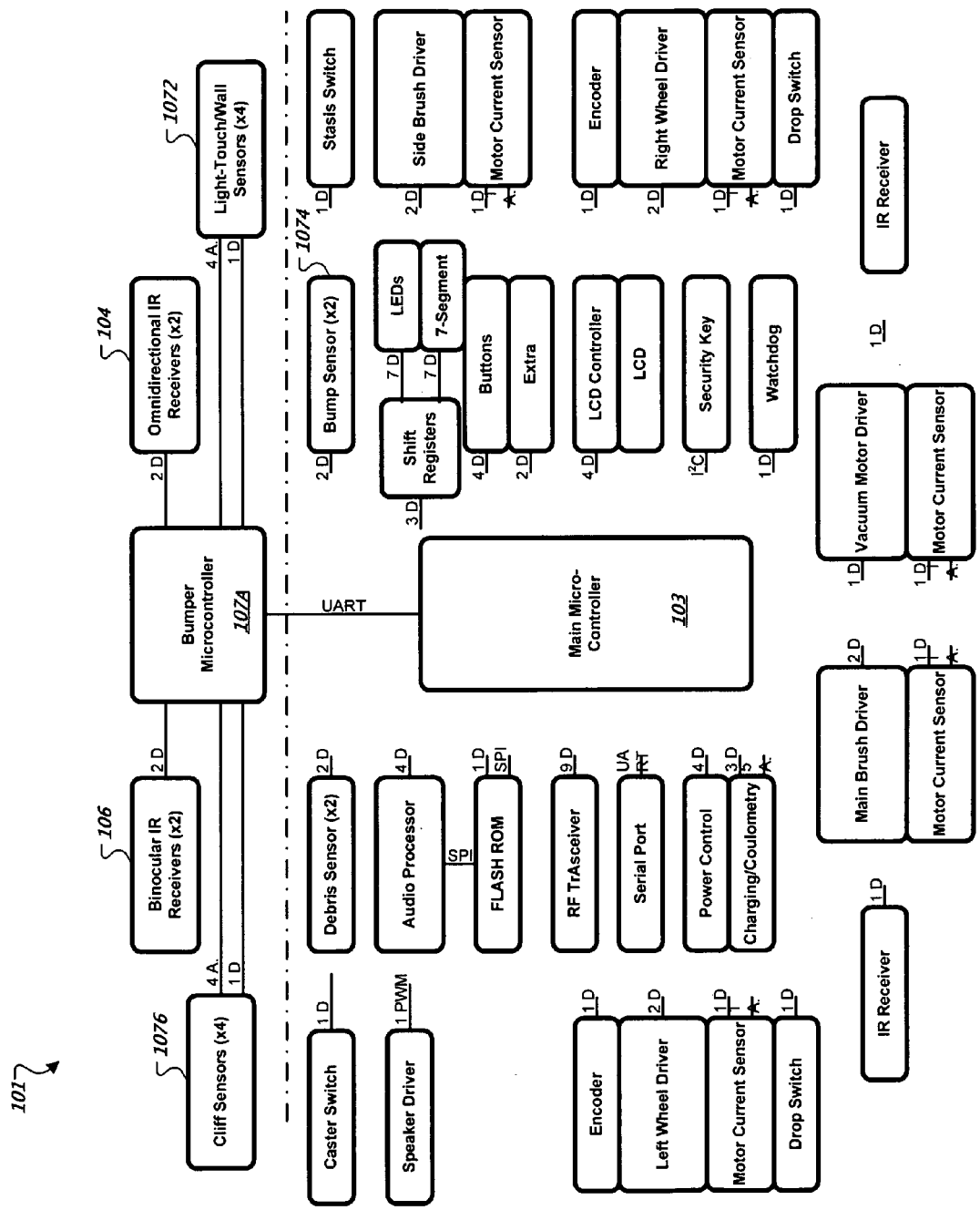
FIG. 22 shows a block diagram of representative electronic structure of an autonomous coverage robot.

FIG. 22 shows a schematic view of electronics 101 of the robot 100. The electronics 101 include the controller 103 which communicates with a bumper micro-controller 107A that controls the omni-directional receiver 104, directional receiver 106, wall proximity sensors 1072, and bumper switch 1074. The controller 103 monitors all other sensor inputs, including the cliff sensors 1076.

Figure 23A:
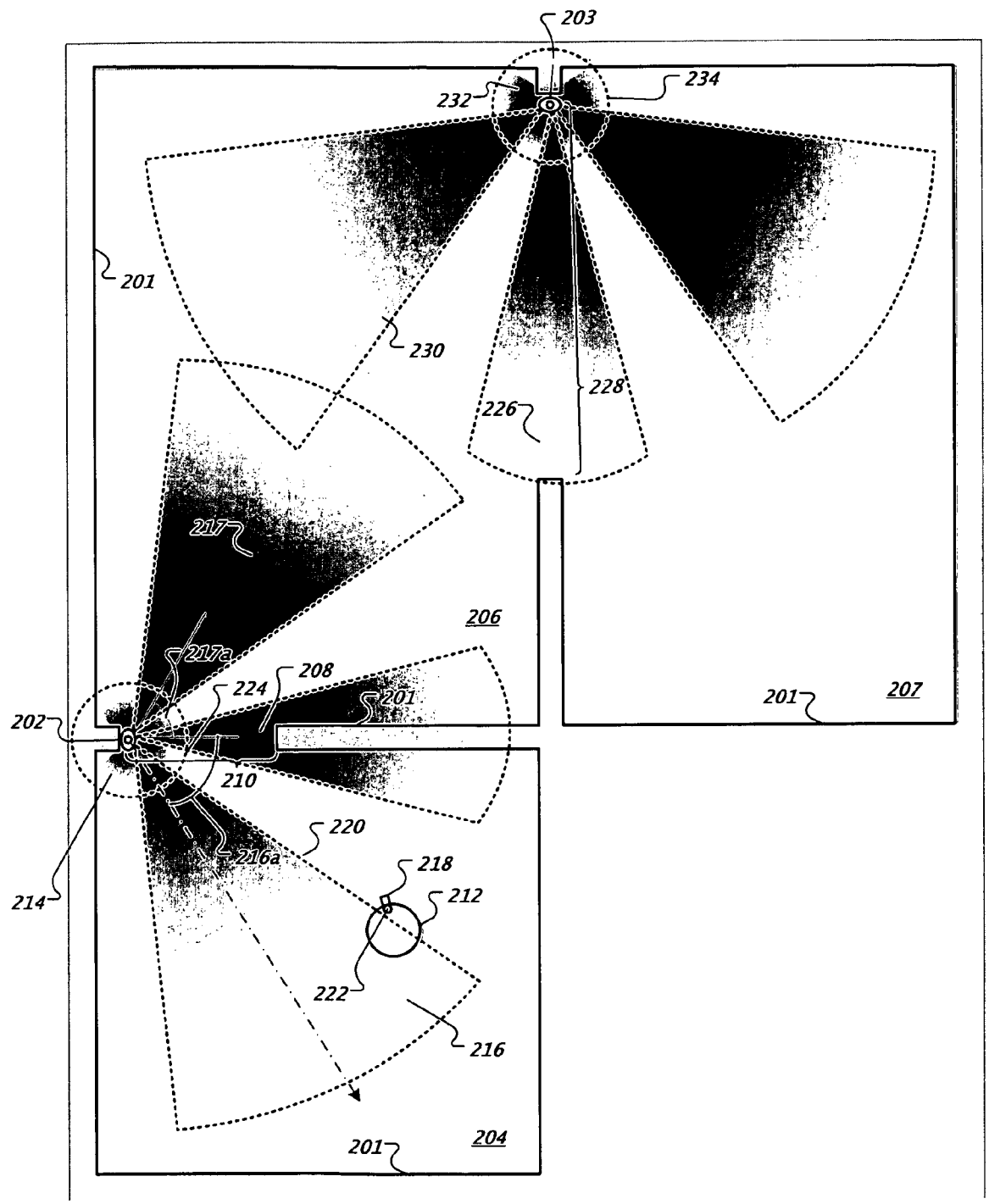
FIG. 23A shows a first example of applying of a method of navigating an autonomous coverage robot between bounded areas using navigation beacons with the addition of a base station.
Figure 23B:
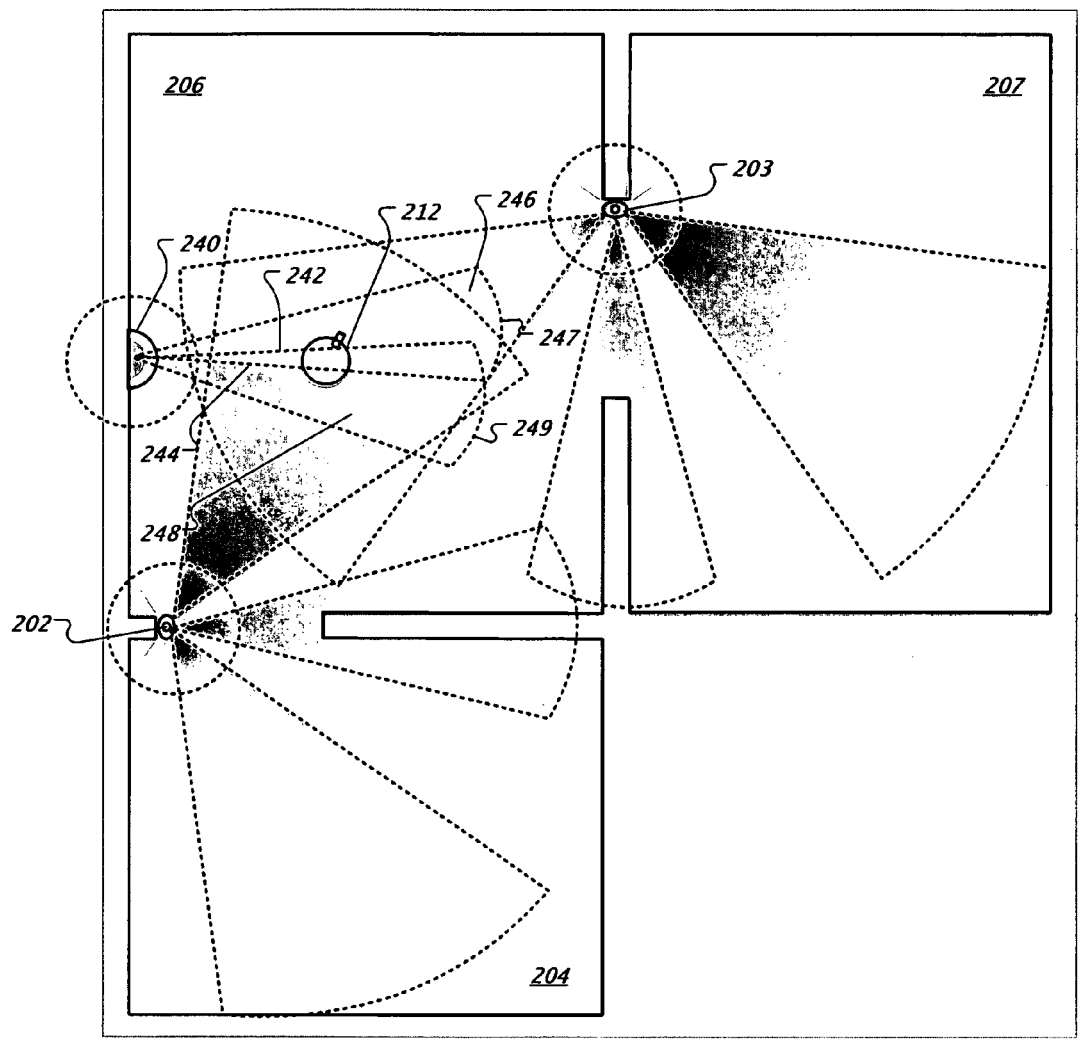
FIG. 23B shows a second example in which the robot encounters more than one beam at the same time.

FIGS. 23A-B show an example of applying of a method of navigating an autonomous coverage robot between bounded areas using navigation beacons. The method may be applied to a system such as the example the robot navigation system described above. While the following description relates a particular software architecture and set of algorithms to the navigation beacons disclosed as a physical infrastructure, the very same embodiments of a robot, control and software architecture, and/or many particular algorithms can be used with a different physical infrastructure.

Accordingly, because the manner and methods by which the robot handles sequences of goals and navigation are relatively independent of the actual physical form of the infrastructure, for discussions involving such manner and methods, "navigation beacon" includes active and passive landmarks of other physical kinds (e.g., bar codes, retro-reflective tags, illuminated or IR spots projected on the ceiling or walls, directional RF or visible light, and other features identifiable in the environment), and "beam" includes directed vectors of other physical kinds (including inferred directional vectors calculated or kept in memory that may be followed, as well as line-of-sight directions to distant observed objects). In the example shown, walls 201, a first navigation beacon 202 and a second navigation beacon 203 (also discussed herein as "lighthouses") define a first bounded area 204, a second bounded area 206, and a third bounded area 207 (which are typically rooms of a home). Navigation beacon 202 may be configured to transmit a gateway marking emission 208 (also noted herein as a "virtual gateway" or "gateway beam") across a gateway 210 (typically a doorway, but openings of a few feet to 10 or 12 feet are possible, as well as arbitrary segmenting of a room without any particular openings). The gateway marking emission 208 may be an IR signal, for example, which can be sensed by a coverage robot 212.

The robot 212 may be placed within a bounded area 204. The robot 212 may autonomously traverse the bounded area 204 in a cleaning mode. If the robot 212 encounters gateway marking emission 208 in gateway 210, the robot 212 remains in the bounded area 204 without moving into an adjacent bounded area 206. Upon termination of the cleaning or coverage mode in the first area, the robot 212 may autonomously (i.e., in response to an internal trigger condition as discussed herein, e.g., time expired, distance covered, percent covered) enter a migration mode in which the robot continues cleaning but monitors for the gateway 210, locates a gateway 210, moves to and through gateway 210, (past beacon 202), into the adjacent bounded area 206.

In some implementations, the robot 212 may autonomously enter the cleaning mode after the migration to bounded area 206 has been completed. While in the migration mode, the robot 202 may be non-responsive to gateway emission 208 (although the robot may record having crossed the gateway emission 208). In some cases, the robot 212 may remotely (i.e., by direct or relayed RF communications or line-of-sight or reflected optical signaling) deactivate gateway marking emission 208 upon entering migration mode. The robot 212 may also activate gateway marking emission 208 after exiting the migration mode.

Furthermore, navigation beacon 202 may transmit a proximity emission or field 214 laterally around (surrounding) itself, establishing an exclusion zone or "force field". The robot 212 may detect this proximity field and use the detection to attempt to avoid maneuvering within the exclusion zone around a beacon 202 while in the cleaning or migrating modes. The primary purpose of the exclusion zone is to prevent the robot 202 from striking the beacon 202 itself and moving it.

Navigation beacon 202 may be configured to transmit a first directed vectoring emission 216 (also discussed herein as a "directed emission," "directed beam," "launch beam" or "tractor beam") into bounded area 204 and a second directed vectoring emission 217 into bounded area 206, with beacon 202 positioned within gateway 210. For example, the robot 212 may drive toward beacon 202 upon detecting directed emission 216 while in the migration mode.

While in the migration mode, the robot 212 may detect the directed emission 216 by sensing the directed emission 216 with a directional receiver 218 (also discussed herein as a "binocular sensor," e.g., including twin detectors in collimated tubes) located on the front of the robot 212 (i.e. the side of the robot 212 that is aligned with the forward the robot drive direction). Alternatively, the robot 212 may sense the directed emission 216 with an omni-directional receiver 222 prior to detection by directional receiver 218. The term "omni-directional receiver" as discussed herein includes non-directional and multi-directional receivers, e.g., receivers including two or more sensors (at compass points, etc.) directed about the periphery of the robot. The robot 212 may use the signal detected by omni-directional receiver 222 to then maneuver (turn in place or turn going in forward or reverse directions) to sense directed emission 216 with directional receiver 218. The robot 212 may align its direction of travel with a path defined by an edge 220 of directed emission 216. Directional and omni-directional receivers 218 and 222 may have construction and function similar to that described above.

In some cases, the robot 212 may move towards the beacon 202 along the emission path (i.e., servoing using the two beam detectors 114 and 116 of the binocular sensor 106) until it senses a beacon perimeter 224 (i.e. the edge of proximity field emission 214). The robot 212 may move along beam perimeter 224 through the gateway 210 and into bounded area 206. The angle between the gateway emission 208 and directed emission 216 may, in some instances, be between about 45 and 90 degrees, and optionally is about 60 degrees. The gateway emission 208 is sized according to the robot diameter, and diverges to be approximately the width of the robot at the proximity field edge or range of detection (e.g., to prevent the robot crossing at that point). This may be a span of 10 degrees or more, but is determined by the robot diameter. The angle between the center of the gateway emission 208 and the center of each directed emission 216 is, in two different examples, about 45 degrees or about 60 degrees, and each directed emission 216 beam is a diverging beam made diffuse by the slot mask near the emitter, and is, in two different examples, about 20-30 degrees (e.g., 25 degrees) or about 30-50 degrees (e.g., 40 degrees). In some instances, the directed emissions 216 and 217 may consist of infrared light.

The robot 212 may remotely activate and/or deactivate emissions coming from beacon 202, such as directed emission 216 or gateway emission 208. Various methods may be used to transmit signals between the robot 212 and the navigation beacons 202 and 203.

In particular, it is effective to use the same inexpensive, common IR-LED emitters for each of the emitters of each of the beacons 202, 203, and in addition for a recharging or other dock 240 for the robot 212. The same sensors on the robot 212 can detect all of the emitters; and different sensors on the robot 212 (e.g., the multi-directional as well as the collimated directional sensors) can detect the same emitters for different purposes (as discussed herein, e.g., following, homing, stopping). In order to differentiate between the different emitters, each emitter may be encoded (e.g., modulated with a different serial code). This also helps avoid confusion with household and other remote controls as well as IR components of sunlight and other ambient sources. However, as shown in FIG. 23, the robot 212 can encounter situations in which it is traveling through the emission paths of several different emitters.

In this situation, especially when using optical multi-directional receivers or a common optical omni-directional receiver (but also in other instances, e.g., RF) the sensor or software structure is configured to be capable of discerning one emitter from another when several signals are simultaneously received. If different frequencies are available, then these may be employed. One strategy is for the emitters to take turns, being synchronized by their communications with the robot or each other. However, this is complex and introduces a failure mode when synchronization breaks down. It is advantageous for each beacon 202, 203 and dock 240 to self-control, and stagger their own signals in time, with intervals between each emission. For instance, each transmitted emission may be differentiated by time division multiplexing (i.e., multiplexing as the beam origins are taken together as a system, including within a beacon having more than one beam or among several beacons) with a fixed period random offset (e.g., which may be different for each beam source). The interval or random offset may be changed from time to time (e.g., at random intervals) or by communication with the robot (e.g., by RF communication when the robot detects an interference condition). At manufacture, or upon changing offset, e.g., the offset may be selected from a set of offsets unlikely to harmonically interfere, or that do not share common factors. In this manner, the robot may encounter several emission paths at once yet discern the identity of each. In other instances, each transmitted emission may be differentiated by different wavelengths of light, infrared modulations, and wavelength filters/windows on the emitters and receivers.

The robot 212 may use RF communication to signal to beacon 202 to remotely activate directed emission 216 and deactivate gateway emission 208 upon initiating the migration mode. In another example, the robot 212 may remotely deactivate the directed vectoring emission 216 and activate gateway emission 208 upon exiting the migration mode.

In some instances, the robot 212 may activate a gateway emission 226 separating bounded areas 206 and 207 and initiate the cleaning mode. Similarly to that described above, the robot 212 may be prevented from leaving bounded area 206 when it encounters gateway emissions 208 and 226. When finished cleaning in bounded area 206, the robot 212 may initiate the migration mode and navigate through gateway 228 by following directed emission 230 to a perimeter 234 of a proximity emission 232 and enter bounded area 207. Once in bounded area 207, the robot 212 may re-enter the cleaning or working mode. After, for instance, a set time period or preset number of encounters with gateway emission 208, the robot 212 may migrate from bounded area 204 to bounded area 206.

Alternatively, a virtual wall emitter (gateway) may be set to independently deactivate itself on a schedule to permit the robot to cross the gateway, e.g., acting as a virtual wall for a first interval (to confine in a first or current room), then deactivating temporarily or intermittently, then acting as a virtual wall for a second interval (to confine in a second or successive room). This technique may also be interactive, e.g., the robot may use RF communication with one or more beacons to deactivate a virtual wall or bypass/cross a virtual wall.

It should be noted that in all instances herein, the robot's behavior system is arranged such that obstacle events, including cliff detection events, have a higher priority than any room-to-room navigation or cleaning. Accordingly, for example, when the robot encounters a cliff detection in the middle of a navigation or other set of sequenced behaviors, the robot may nonetheless avoid the cliff (aborting the current part of the sequence and resetting the state of the sequence).

FIG. 23 shows a set of rooms similar to FIG. 22, but arranged (with the addition of a base station) to illustrate the situation in which the robot encounters multiple beams from two beacon emitters and also from a dock 240. Using the strategies avoiding beam confusion noted above, the robot 212 may nonetheless navigate from room to room or the robot 212 may autonomously initiate a docking mode to maneuver towards the base station 240 in bounded area 206 and dock with the station upon termination of the migration mode in the second area.

The base station 240 may include a base, a robot charger, an omni-directional beam emitter and two navigational field emitters and be similar to the base station 180 described above. The robot 212 may maneuver towards base station 240 by detecting and advancing along one of the lateral field edges 242 or 244 of the overlapping fields 246, 248 aligned with the docking direction until docked with the station 240.

The robot 212 may detect the emissions of base station 240 with omni-directional receiver 222 on the robot and maneuver to detect an outer lateral field edge (e.g. 247) of at least one field emission 246 or 248. The robot 212 may then advance along outer lateral field edge 247 or 249 to the aligned lateral field edge 242 or 244 of the overlapping fields. Upon detecting the aligned lateral field edge 242 or 244, the robot 212 advances along the aligned lateral field edge 242 or 244 until docked with base station 240.

Figure 24A:
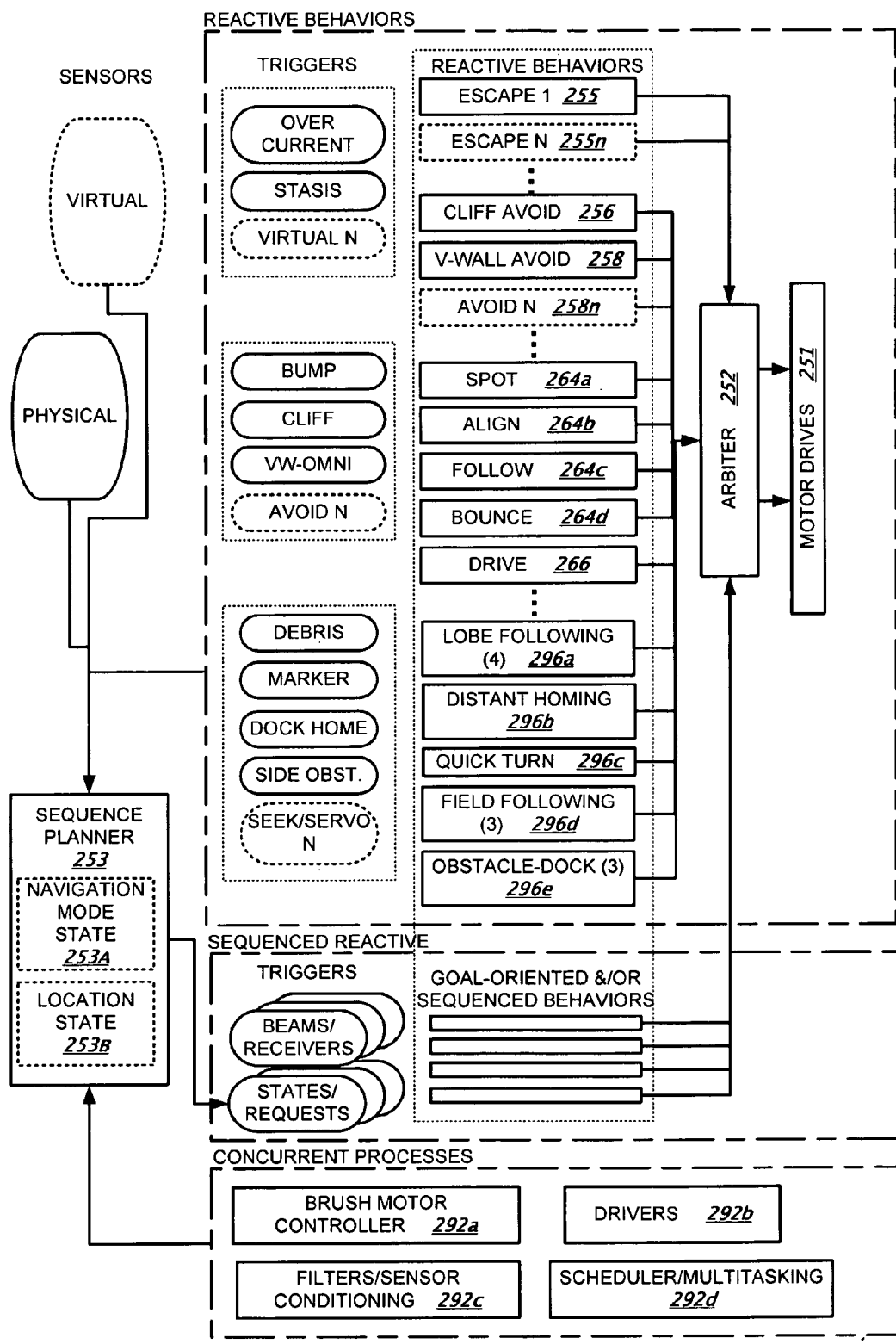
FIGS. 24A and 24B are block diagrams illustrating a software architecture for navigating an autonomous coverage robot.
Figure 24B:
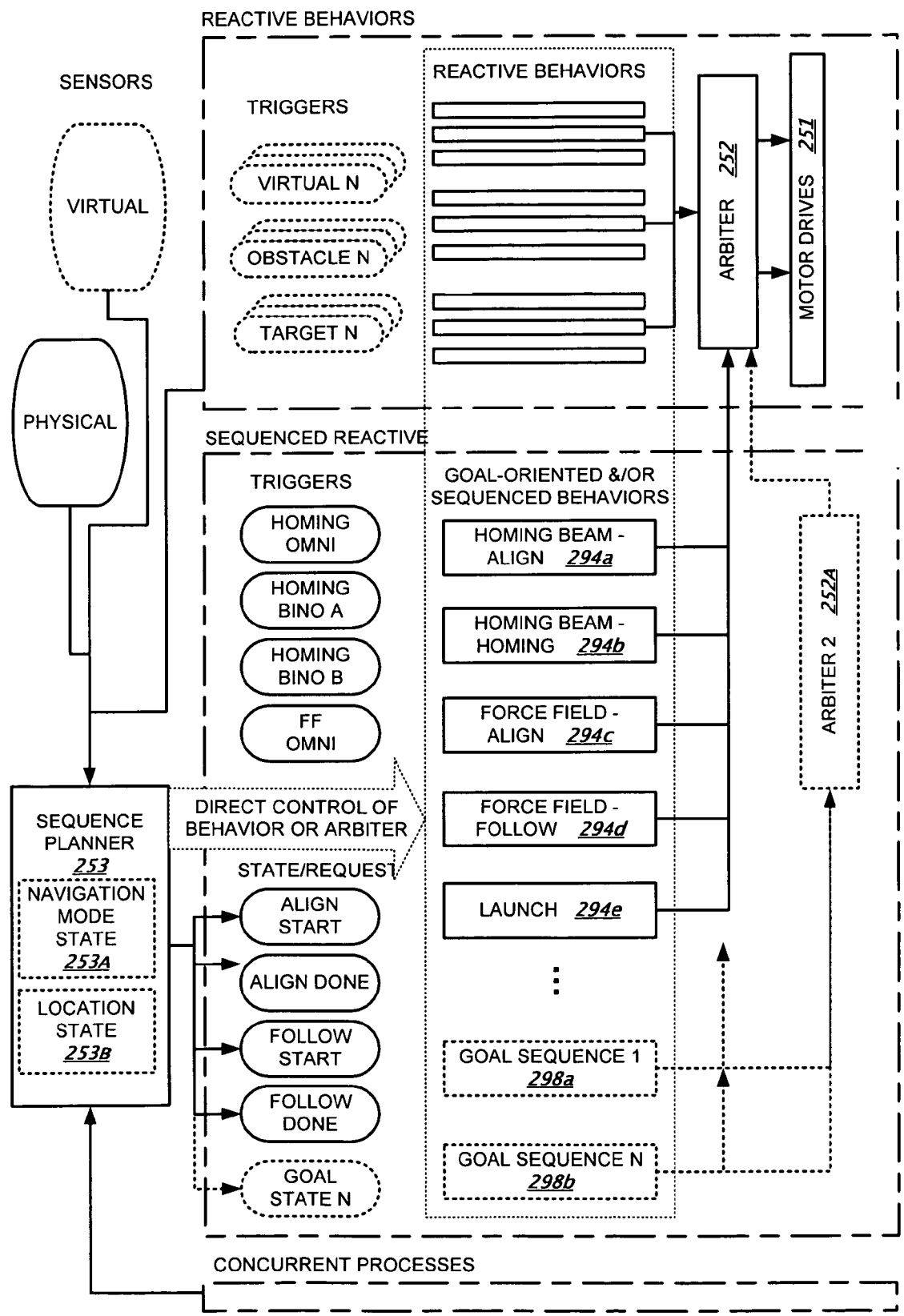

FIG. 24A is a block diagram showing a behavioral software architecture within a controller 250, in which goal-oriented or sequenced behaviors are depicted in simplified form. FIG. 24B shows the same software architecture, but provides more detail on the goal-oriented or sequenced behaviors while simplifying some of the elements of FIG. 24A.

While embodiments of the robot discussed herein may use behavioral based control only in part or not at all, behavior based control is effective at controlling the robot to be robust (i.e. not getting stuck or failing) as well as safe. Accordingly, FIGS. 24A and 24B depict a software architecture that permits improved control of a mobile robot. Rather than being a purely reactive architecture, FIGS. 24A and 24B introduce an element of planning that is partially reactive (and therefore more robust)—goal oriented, sequenced reactive behaviors.

In the reactive yet sequenced behaviors, the implied success of a related behavior in a sequence is an enabling condition (among others) for each behavior beyond the initiating behavior in the sequence (some sequences may have more than one initiating behavior or branches). The implied success is kept as a state signifying an enabling condition of a successive behavior, in the form of a flag, state machine, or the like. The state may be set or changed by a behavior itself upon completion, by an arbiter process, or by a planning process.

Referring to FIG. 24A, the robot 302 employs a control and software architecture that has a number of behaviors that are executed by an arbiter 252 in controller 250. A behavior is entered into the arbiter 252 in response to a sensor event, or a sequence state event from the planner 253. In one embodiment, all behaviors have a fixed relative priority with respect to one another. The arbiter 252 (in this case) recognizes enabling conditions, which behaviors have a full set of enabling conditions, and selects the behavior having the highest priority among those that have fulfilled enabling conditions. The diagram shown in FIGS. 24A and 24B does not necessarily reflect the (fixed) priority hierarchy of the robot 302. In order of decreasing priority, the behaviors are generally categorized as escape and/or avoidance behaviors (such as avoiding a cliff or escaping a corner), working behaviors (e.g., wall following, bouncing, or driving in a straight line), and for the purposes of this application, sequenced reactive behaviors. The behaviors may include: different escape behaviors 255, 255a, 255n (including escaping corners, anti-canyoning, stuck situations, "ballistic" temporary fire-and-forget movement that suppress some avoid behaviors, e.g., as disclosed in U.S. Pat. No. 6,809,490, the entire contents of the which are hereby incorporated by reference) cliff avoiding 256, virtual wall avoiding 258 (a virtual wall may be a beacon with a gateway beam), other avoidance 258n as a class (e.g., avoiding people via a pyrometer, in general the class of detecting and moving away from something that is a hazard to the robot 302 or to which the robot 302 may be a hazard), spot coverage 264a (covering in a confined pattern such as a spiral or boustrophedon patch), align 264b (turning in place, using side proximity sensors to align with a forward obstacle encountered while obstacle following, e.g., an inside corner), following 264c (representing either or both of substantially parallel or bump following along an obstacle using a side proximity sensor or bumper that extends to the side of the robot), responding to a bump in order to "bounce" 264d (a behavior that occurs after the robot bumps an object), and drive 266. Movement of the robot 302, if any, occurs while a behavior is arbitrated. If more than one behavior is in the arbiter 252, the behavior with a higher priority is executed, as long as any corresponding required conditions are met. For example, the cliff avoiding behavior 256 will not be executed unless a cliff has been detected by a cliff detection sensor, but execution of the cliff avoiding behavior 256 always takes precedence over the execution of other behaviors that also have satisfied enabling conditions.

The reactive behaviors have, as their enabling conditions or triggers, various sensors and detections of phenomena, but, in general, not (arbitrary) states of a sequence. As shown in FIG. 24A, these include sensors for obstacle avoidance and detection, such as forward proximity detection (multiple), forward bump detection (multiple), cliff sensors (multiple), detection of a virtual wall signal (which may instead be considered a coverage trigger). Sensors of these types are be monitored and conditioned by filters, conditioning 292c, and their drivers 292b, which can generate the enabling conditions as well as record data that helps the behavior act predictably and on all available information (e.g., conversion to one-bit "true/false" signals, recording of likely angle of impact or incidence based on strength or time differences from a group of sensors, or historical, averaging, frequency, or variance information).

Actual physical sensors may be represented in the architecture by "virtual" sensors synthesized from the conditioning and drivers. Additional "virtual" sensors that are synthesized from detectable or interpreted physical properties, proprioceptive or interpreted upon the robot 302, such as over-current of a motor, stasis or stuck condition of the robot 302 (by monitoring a lack of odometry reading from a wheel encoder or counter), battery charge state via coulometry, and other virtual sensors "virtual N."

In addition, reactive behaviors can act according to enabling conditions that represent detected phenomena to be sought or followed. A beam or wireless (RF, acoustic) signal can be detected without direction; or in some cases with direction. A remote beam or marker (bar code, retro-reflective, distinctive, fiducial, or natural recognized by vision landmark) giving a direction can permit homing or relative movement; without direction the robot 302 can nonetheless move to servo on the presence, absence, and/or relative strength of a detected signal. The reflection of a beam from the robot 302, edge, or line can be similarly detected, and following behaviors (such as obstacle following by the robot 302) conducted by servoing on such signal. A debris or artifact signal can be collected by monitoring debris or objects collected by or traversed by the robot, and that signal can be an enabling condition for a reactive behavior controlling a spot coverage pattern. A general class of "seek/servo N" signals are thus also reactive behavior enabling conditions or triggers.

The robot 302 maintains concurrent processes, "parallel" processes that are not generally considered reactive behaviors. A scheduler 292d may be necessary to allocate processor time to most other processes, e.g., including the arbiter and behaviors, in a co-operative or other multitasking manner. If more threading is available, less processes may be managed by the scheduler 292d. As noted, filters and conditioning 292c and drivers 292b, can interpret and translate raw signals. These processes are not considered reactive behaviors, and exercise no direct control over the motor drives or other actuators. In addition, in the present embodiment, brush motor controller(s) 292a control the main and side brushes, although these may alternatively be controlled by dedicated brush behaviors and a brush control arbiter.

With reference to FIG. 24B (the same representation as FIG. 24A, with other areas of the drawing emphasized/deemphasized for clarity), a special concurrent process is a sequence planner 253. The sequence planner 253 is capable of monitoring and/or maintaining state in order to control sequenced reactive behaviors, e.g., setting enabling conditions (that will be caught by the arbiter 252), and/or resetting states in the case of abort conditions (e.g., time-outs, escape or avoidance behavior execution), and/or monitoring or supervising finite state machines that themselves transition between states. It should be noted that enabling condition states or flags or supervised state machines that request a transition between sequential reactive behaviors can be set by a behavior itself, by the arbiter, or by the sequence planner 253, depending on efficiencies and circumstances. It should also be noted that the sequence planner 253 may optionally be capable of directly controlling the arbiter 252 (or second arbiter 252A) to prefer (e.g., re-prioritize) a behavior or directly control a sequenced reactive behavior without setting an enabling condition, state variable or state machine.

While maintaining state is recognized to potentially reduce the robustness of competent reactive control architecture, sequences of intended actions may require the maintenance of some state. As discussed herein, if sequenced reactive behaviors are controlled to execute using request states which may be robustly reset or erased without primary function failure, the reduction in robustness can be reduced.

One exemplary sequenced reactive behavior set is employed by the robot 302 to transition between rooms or navigate to a distal room. As depicted in FIG. 24B, a homing beam align behavior 294a includes an enabling condition that an align start (e.g., a homing request) enabling condition be activated, and that the beam to be homed upon is detected by a multi-directional sensor. As will be discussed below, the homing request enabling condition can be set and maintained in different ways. A homing beam homing behavior 294b is to execute once alignment is successful. However, because alignment may happen serendipitously (the robot may already be aligned when the homing request is activated), the homing beam homing condition also has as an enabling condition the homing request (flag or state), as well as a detection using a directional sensor (binoculars) that substantially necessarily directed at the beam identified as one to be homed upon (or, e.g., filtered to be equivalent to such a detection). Accordingly, two sequenced reactive behaviors are each separate entry points to the sequence, and share a common reactive sequence request enabling condition. When a sensor-based enabling condition fails, these behaviors are aborted (internally or by the planner 253) and the sequence request remains active (or may be reset). In this case, the sequence may be restarted the next time either sensor-based enabling condition occurs. Optionally, a random component (such as a random distance or time return to random coverage, while disabling the sequence request or homing request enabling condition) is permitted to occur following an abort of a sequential reactive behavior in order to decrease the likelihood of systematic failure or looping.

After the homing beam homing behavior 294b has completed, the sequence is in a state where an assumption is made regarding the state that the robot is located appropriately to align with the field to permit begin field following about a beacon to transition to a new chamber. A (new) align start enabling condition (e.g., field align state or request) may be set by the completing sequenced reactive behavior or by the planner, via condition flag or state machine. In order to accommodate the possibility that the field may be the first detectable signal encountered upon initiation of the homing request, the detection of the proximity field by the multi-directional receiver is an equivalent (OR) condition to the field align request, if the homing request is active when the field is encountered, this combination also should initiate field align behavior 294c. If there are no abort conditions, the field align behavior 294c executes. After the field align behavior 294c has completed, the sequence (of sequenced reactive behaviors) is in a state where a next assumption is made regarding the state—that the robot is oriented appropriately to begin field following. A (new) follow start enabling condition (e.g., field follow state or request) may be set by the completing sequenced reactive behavior or by the planner, via condition flag or state machine. Similarly, the launch behavior 294e may have as a primary enabling condition a state-based request rather than a sensor detection. Each of these behaviors 294a, 294b, 294c, 294d, 294e is detailed herein below.

In two of these cases, optionally, a state to enter the entire sequence (homing request) is maintained and an additional state to begin a next part of the sequence (field follow request; launch request) is set and both conditions are necessary to start the next sequenced reactive behavior. This would permit restarting the sequence immediately after an abort (by maintaining the entire sequence request state). Alternatively, the entire sequence entry request is reset and the only the next sequenced reactive behavior entry condition is set (field align request or field follow request). This would cause the entire sequence to be otherwise restarted (e.g., by a new or continued occurrence of conditions that would cause the planner to set the sequence request) after an abort, which could improve general robustness (although not necessarily goal-specific robustness) by erasing essentially all states.

In two cases, no sensor-based condition is an enabling condition for the next sequenced reactive behavior in the sequence, but an enabling condition is a sequence-based or a state-based request—e.g., field follow request, launch request. Accordingly, a sequence may include sequenced reactive behaviors that include only sequence states or progress as enabling conditions for the next sequenced reactive behavior (such as the field follow behavior, or launch behavior), as well as sequenced reactive behaviors that include both sensor-based conditions and sequence states, progress or requests as enabling conditions (such as the beam align or tractor homing behaviors).

In one case, a state to enter the entire sequence (homing request) is maintained and either a sensor-based condition or a sequence-based request is an enabling condition for a next sequenced reactive behavior (field align) in the sequence—e.g., a homing request AND (field align request OR field detection) is interpreted by the arbiter to permit field aligning if no reactive behaviors have higher priority. Accordingly, a sequence may include sequenced reactive behaviors that include either a combination of sequence state/requests, or both sensor-based conditions and sequence request/states, as enabling conditions for a next sequenced reactive behavior.

It should be noted that entry and mid-sequence branching is possible by enabling different behaviors depending on different combinations of sensor-based conditions and sequence states. For example, just as two possible entry points into the sequence are permitted by detecting different sensor events (multi-directional or directional) at the same time as a common entry point enabling condition (homing request), branches in the sequence to different next sequenced reactive behaviors are permitted by detecting different sensor events at the same time as a common mid-sequence enabling condition (e.g., candidate behaviors each enabled by a unique combination of sensor event and sequence state). Optionally, if different sequences each are maintained with different states, different mid-sequence state combinations permit nesting of sequences (candidate behaviors each enabled by a unique combination).

Sequence planner 253 optionally maintains a navigation mode state switch or finite state machine 243a, and/or such states or requests are maintained separately (e.g., follow start, follow done).

As shown in FIG. 24B, the planner 253 may control different goal-oriented sequences 1-N, each having more than one sequenced reactive behavior therein. The behaviors therein can have as initial conditions a goal state, entry request, or other state, that the arbiter 252 identifies as requiring rendering a candidate behavior available for execution. Initial behaviors of a sequence may require a sequence request; subsequent behaviors may require either a next sequenced reactive behavior request (or, in addition, the sequence request as well).

The sequenced behaviors are "reactive" despite being dependent upon sequence state at least because they may be subject to the same arbiter 252 as the reactive behaviors, and/or react to sequence states as enabling conditions in the same manner as reactive behaviors react to real-time sensor events, and/or are prioritized lower than at least escape and avoidance behaviors. In addition, the states may be wholly reset to restart a reactive process. Even when a sequence or next sequenced reactive behavior's enabling conditions are satisfied, a reactive behavior that also has enabling conditions satisfied and preserves continuous autonomous operation will be executed instead. Reactive docking behaviors, which generally permit the robot to return and recharge for continued autonomous operation, may be prioritized higher than, in particular, navigation-related sequenced reactive behaviors. Reactive coverage behaviors may be prioritized below navigation sequenced reactive behaviors, in particular. Some portions of the docking behaviors noted herein are alternatively arranged as sequenced reactive behaviors; or other sequences are possible. Beacon-based navigation as discussed herein is an example of one implementation of combining sequenced reactive behaviors with non-sequenced reactive behaviors.

As shown in FIG. 24B, a second arbiter 252a may supervise a sequence of sequenced reactive behaviors (e.g., in combination with the sequence planner 253); or a master arbiter (not shown) may supervise a first arbiter (e.g., 252) of reactive behaviors and a subsequent arbiters (e.g., 252a) of different sequenced reactive behaviors.

As shown in FIG. 24B, for a navigation application in particular, the sequence planner 253 may include, monitor, or maintain location state in the form of a topological state map or its equivalent with respect to the environment in which the robot operates. Using beacons, this may be a topological map having nodes and links, in which the nodes may be rooms (links thereby being gateways or beacons) or gateways (links thereby being sides of the gateway). A primary use of the location state is to provide a homing beam or homing fiducial identity to the arbiter or to the sequenced reactive behaviors. If provided to the arbiter, the arbiter may recognize a sensor-based enabling condition (e.g., beam detection) for a behavior only when the beam has the correct identity (encoding) for the location state. Alternatively, the behavior itself examines the identity or encoding of a received enabling condition (e.g., beam detection). An abort condition can result if beacons have been rearranged or the like, and this abort condition can cause blacklisting of a beacon or fiducial or a reset of the map (new mapping needed). In either case, the robot 302 continues to provide coverage and all other remaining reactive behaviors in the local area. The location state is used by the planner 253 to successively execute sequences of sequenced reactive behaviors in order to traverse a distance to or from a remote or distal room (for returning from the dock for charging; for directly proceeding to a remote or distal chamber from the dock); and permits the same sequenced reactive behaviors to be used for navigation in different directions (so long as the location state is maintained) by providing the identities of the guiding fiducials or beams in the correct order for a navigation direction, depending on the direction to be traveled on the topological map.

One candidate routine maintained/executed by the planner 253 is shown in FIG. 25A. The elements of this routine are not necessarily in order (e.g., different states may be checked out of the depicted order). The planner routine monitors (502) a goal-oriented or sequence initiating condition. As discussed, this may be a variable that keeps track of a time, distance, cleanliness measure, history of obstacle interactions, or other criterion that, when satisfied, indicates that a planned sequence (such as navigation from room to room) is to be carried out. The condition may be a state, flag or state of a finite state machine. If such a condition exists (504), the planner checks (506) the state of the robot along the called for sequence, if the planner maintains such a sequence state. For example, the planner 253 may maintain or monitor the current state of a state map or finite state machine defining states of the beacon crossing sequence, as shown in FIG. 25B (in which "aligning to launch", "homing", "aligning after homing", and "following field" states are available); alternatively a state map or finite state machine may be instantiated. The planner 253 may additionally or in the alternative set (508) behavior enabling conditions for entry into a sequence, such as a homing request as discussed herein, or an entire sequence entry behavior enabling condition and/or next sequenced reactive behavior enabling condition. The planner 253 may additionally set (510) guiding variables for the behavior or arbiter to recognize (e.g., such as the identity of a beam to be followed or fiducial to be homed upon or bearing to proceed in), according to, e.g., the state of a map identifying such (e.g., as shown in FIG. 25C, according to the state of a map defining which beam A or B—"green" or "red"—of lighthouses/beacons X, Y, Z connects to which rooms 1, 2, 3 and a dock, and according to the next goal room defined by the planner 253). The planner 253 may additionally monitor abort conditions (512, e.g., time out, interruption by a reactive avoidance or escape behavior) of sequenced reactive behaviors in progress, and set or reset the state of a sequence and/or the state of a map upon such an abort (although behaviors may also set or reset these internally before aborting).

After the robot 302 has detected a specified cleaning period has elapsed or the robot 302 has detected a specified number of bumps or the robot has detected a specified condition requiring a set of sequenced behaviors, the sequence planner 253 executing on the controller 250 will decide to exit the cleaning mode and enter the migration mode. The robot may also enter the migration mode right from the dock, in order to proceed to a distal or remote room in order to begin cleaning there. The migration mode executes the task of moving from one room to an adjacent room. As discussed above, the migration mode is advantageously not a monolithic process, but is a succession of sequenced reactive behaviors started by an initial behavior—that has an enabling condition of a migration mode request (also discussed herein as a "homing request"). The planner 253 will raise a "new room"/homing request enabling condition, state, or flag. The remaining enabling condition is a sensor detection of a guiding tractor beam (optionally, limited to one beam identified according to the location state 253b as originating with the lighthouse/beacon to be homed upon), which, when the beam is detected (substantially immediately if the robot is in the beam, or after the robot encounters the beam as it continues the coverage behaviors having satisfied enabling conditions), triggers the homing beam-align behavior 294a to be selected by the arbiter 252 for execution. The robot 302 performs the task of migrating from one bounded area to an adjacent bounded area by executing the homing beam-align behavior 294a while at the same time possibly executing the cliff avoiding 256 (on any occasion when any cliff detector fails to see the floor—i.e., the enabling condition of the higher priority & reactive avoidance behavior is also satisfied) and drive 266 behaviors (e.g., if an abort condition resets the sequence). When multiple behaviors are trigged by sensor inputs or the planner 253, the arbiter 252 will arbitrate the behaviors in order of priority. That is, the arbiter may also arbitrate among different sequences of reactive behaviors, or the planner may only start one sequence. The beacon crossing sequence 262 has five sequenced reactive behaviors, beginning with the homing beam-align behavior 294a, which are executed or sequentially based on controller inputs as discussed herein. If the robot 302 experiences a signal input (such as a bump sensor input) that requires execution of a behavior having a higher priority, the robot 302 will execute the behavior of higher priority and afterwards, upon the presence of the necessary enabling conditions, may reinitiate a previous sequence of reactive sequenced behaviors.

FIGS. 31A-G are overhead views showing a behavior based autonomous coverage robot 302 as it uses a navigation beacon 304 to migrate from one area to another. FIGS. 26-30 are diagrams illustrating the beacon crossing sequenced reactive behaviors 262, including beam aligning 294a, beam homing 294b, field following 294c, field aligning 294d, and leaving beacon 294e behaviors.

The beacon crossing sequence 262 commences by entering the beam homing 294b or beam aligning behaviors 294a, depending on a robot position within the first bounded area in relation to the beacon 304. Generally, the robot 302 will initiate a maneuver to detect with its omni-directional receiver 104 the first directed beam 306 from the navigational beacon 304 into a first area (e.g. turning 360 degrees or driving in a circle).

Figure 26:
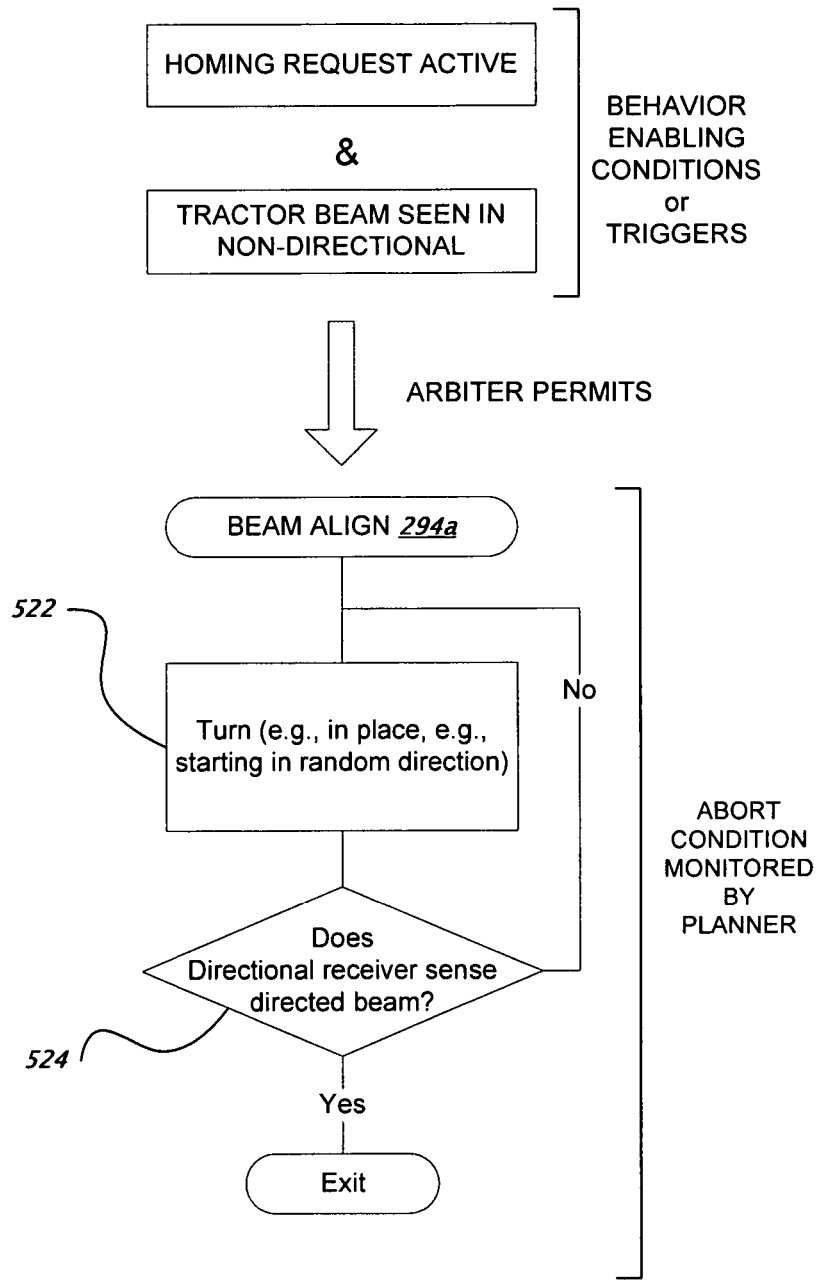
FIG. 26 shows a schematic view of a beam align behavior of a robot.

FIG. 26 depicts the beam align behavior 294a. As shown, the arbiter 252 will not permit the beam align behavior 294a as a candidate (i.e., to be prioritized with other behaviors with satisfied enabling conditions) at least until a homing request state or request is present, as well as the directional or tractor beam 306 is received by the multi or omni-directional sensor 322 of the robot 302, as behavior enabling conditions or triggers. To permit execution, no higher priority behaviors (e.g., reactive behaviors) have satisfied enabling conditions. This tractor or directed beam 306 may be limited to one expected at the present location of the robot 302 on the state map (e.g., by responding only to a beam having an identity or encoding corresponding to the current map state). Once these are satisfied, the arbiter 252 permits the beam align behavior 294a to execute. If either condition is no longer satisfied, the behavior may abort. As noted in FIG. 26, abort conditions (e.g., including missing behavior enabling conditions; timeout; or displacement by a higher priority behavior) may be monitored by the planner 253, which may also keep states reflecting the progress of the sequence as well as the location of the robot 302. The beam align behavior 294a turns or pivots the robot 302 essentially in place (522), starting in a random direction. A likely beam direction may also be maintained as a state, e.g., based on past beam detections monitored by, e.g., a concurrent process, and if so, the turning direction may be the one expected to be shorter. Once the directional receiver 318 senses the directed beam 306 (524), the behavior ends. There is no need to set a state as a request for the beam homing behavior 294b likely to follow, as the robot 302 will, so long as the homing request is active, continue to attempt to align and home when the correct beam is encountered and either is a valid entry point for the sequence. Later stages of the sequence are mid-sequence, and may use such states. Accordingly, the beam align behavior 294a is an example of choosing not to set a state in order to maintain a higher level of reactive control and likely robustness.

Figure 31A:
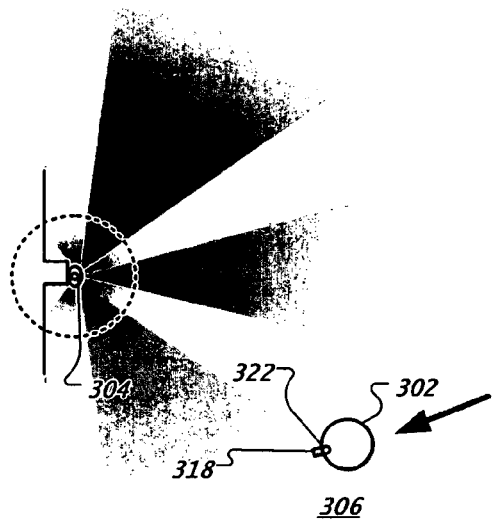
FIGS. 31A-H show schematic views of a robot moving from one area to another using a navigation beacon.
Figure 31B:
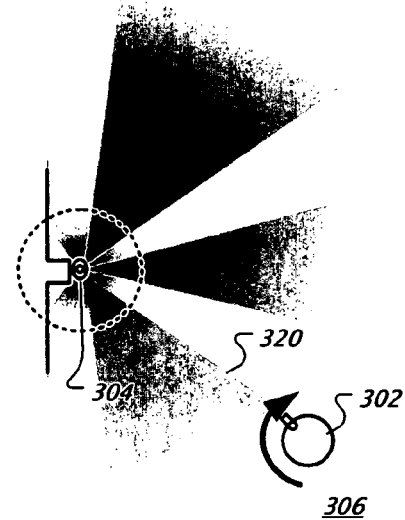

FIG. 31A shows the robot 302 during readiness for and execution of the beam align behavior 294a, as it encounters a first directed beam 306 emitted by a navigation beacon 304, when a homing request from the planner 293 is active. Upon detecting the first directed beam 306, the robot 302 commences the beam aligning behavior 294a. During beam aligning 294a, the drive system 130 maneuvers (e.g., by turning in place, e.g., starting in a random direction) the robot 302 to detect the first directed beam emission 306 with the directional receiver 318, which is to be aligned with a robot drive direction. By using the signals from the two component receivers 114, 116 of the directional receiver 318, the robot 302 aligns the drive direction with the directed emission 306 of the beacon 304. FIG. 31B shows the robot 302 as it detects beam 306 with the omni-directional receiver 322 and turns to face beacon 304.

After the robot 302 has aligned the drive direction with the directed emission 306 of the beacon 304 by using the directional receiver 106, the robot may commence the beam homing behavior 294b.

Figure 27:
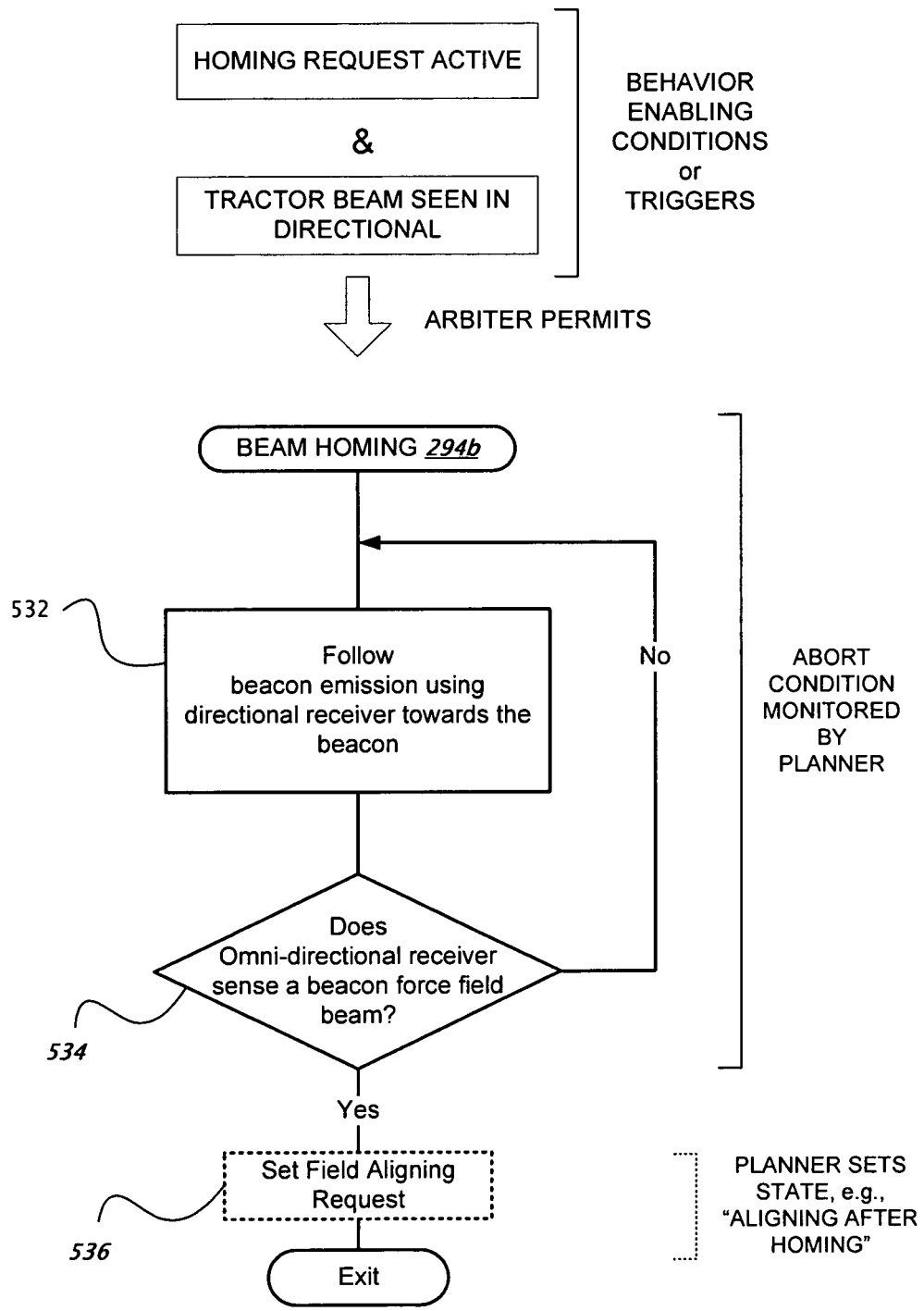
FIG. 27 shows a schematic view of a directed beam homing behavior of a robot.

FIG. 27 depicts the tractor or directed beam homing behavior 294b. As shown, the arbiter 252 will not permit execution (of the highest priority candidate) until at least a homing request state or request is active, and the directional or tractor beam 306 is received by the directional sensor 318 of the robot 322 as behavior enabling conditions or triggers. This tractor or directed beam 306 may again be limited to one expected at the present location of the robot 302 on the state map. Once these are satisfied, the arbiter 252 may permit the beam homing behavior 294b to execute. If either condition is no longer satisfied, the behavior 294b may abort. As noted in FIG. 27, abort conditions and resulting states may be supervised by the planner 253. The tractor or directed beam homing behavior 294b follows the directed beam emission (532). One exemplary way of following is using alternating curves. Each parallel sensor 114 and 116 of the directional binocular sensor 318 is conditioned to return a one bit true-false value reflecting beam presence, based on signal strength (e.g., independently thresholded, or thresholded with respect to one another). As the robot 302 turns toward and away from the beam 306, beam detections of true-false, true-true, and false-true are possible (conditioning may also limit the possibilities to true-false and false-true). A "bang-bang" servoing may be used to change turning direction as the robot 302 moves forward. Each turn is an arc with decreasing radius, i.e., part of an inward spiral. Alternatively, analog values may be maintained and more complex feedback control employed. The following (532) may alternatively employ the frequency and variance tracking discussed herein with respect to docking to determine that the robot is proceeding in the correct direction and move forward in a straight line. Once the non-directional/omni-directional receiver 322 senses the directed beam 306 (534), the behavior is ready to end. A state is to be set to continue the sequence of sequenced reactive behaviors—i.e., a field aligning request. The behavior 294b may set this state itself (536), e.g., as a flag in memory; or the planner 253 may monitor that the behavior 294a is complete and set such a flag or state in a finite state map or machine.

Figure 31C:
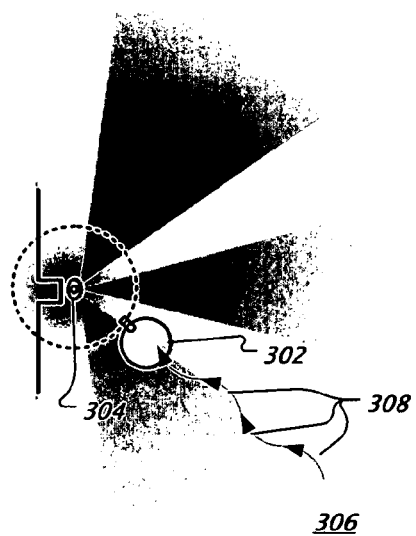

The behavioral sequence, as discussed, permits the robot 302, after initiating the beacon crossing sequence 262, to skip the beam aligning behavior 294a if the directional receiver 318 already detects the directed beam emission 306 and is already aligned with the directed beam emission 306. Abort conditions may prevent these and permit later restarts. As discussed herein, a combination of reactive behavior based control and sequenced reactive behavior control is advantageous. However, some embodiments discussed herein do not necessarily exclude other reactive or non reactive techniques. While executing the beam homing behavior 294b, the robot 302 moves towards the navigational beacon 304 while maintaining its alignment with (e.g., servoing upon) the directed beam 306 in response to the signals of the directional receiver 318. FIG. 31C shows the robot 302 approaching the navigation beacon 304. As the robot 302 follows the edge 320 of the beam 306, the robot 302 adjusts its course as shown by arrows 308. As shown in FIG. 31C, the robot 302 stops moving towards the beacon 304 when it encounters a proximity field emission (or "force field") 310 projected laterally from beacon 304 in all directions.

As an alternative behavior that would be suitable as part of the sequenced reactive behaviors, if the directional receiver 318 is selected to be more sensitive (e.g., by collimation and confinement) at remote distances than the omni-directional receiver 322, the directional receiver 318 may receive the force field emission 310 even though the omni-directional sensor 322 does not. In this case, the directional sensor 318 may be used to alternatively home on the force field emission 310. In this case, an alternative behavior is provided in the sequence, identical to the tractor homing behavior 294b except that the sensor-based enabling condition is that the force field 310 is seen in the directional sensor 318; and the homing is on this emission 310. As an example of behavioral robustness, this behavior may be arbitrarily added to the sequence of reactive behaviors without changing any other behavior or disrupting any other process, with a priority above or below the existing tractor homing behavior 294a depending on empirical evidence that one or the other tended to be more reliable.

Figure 28:
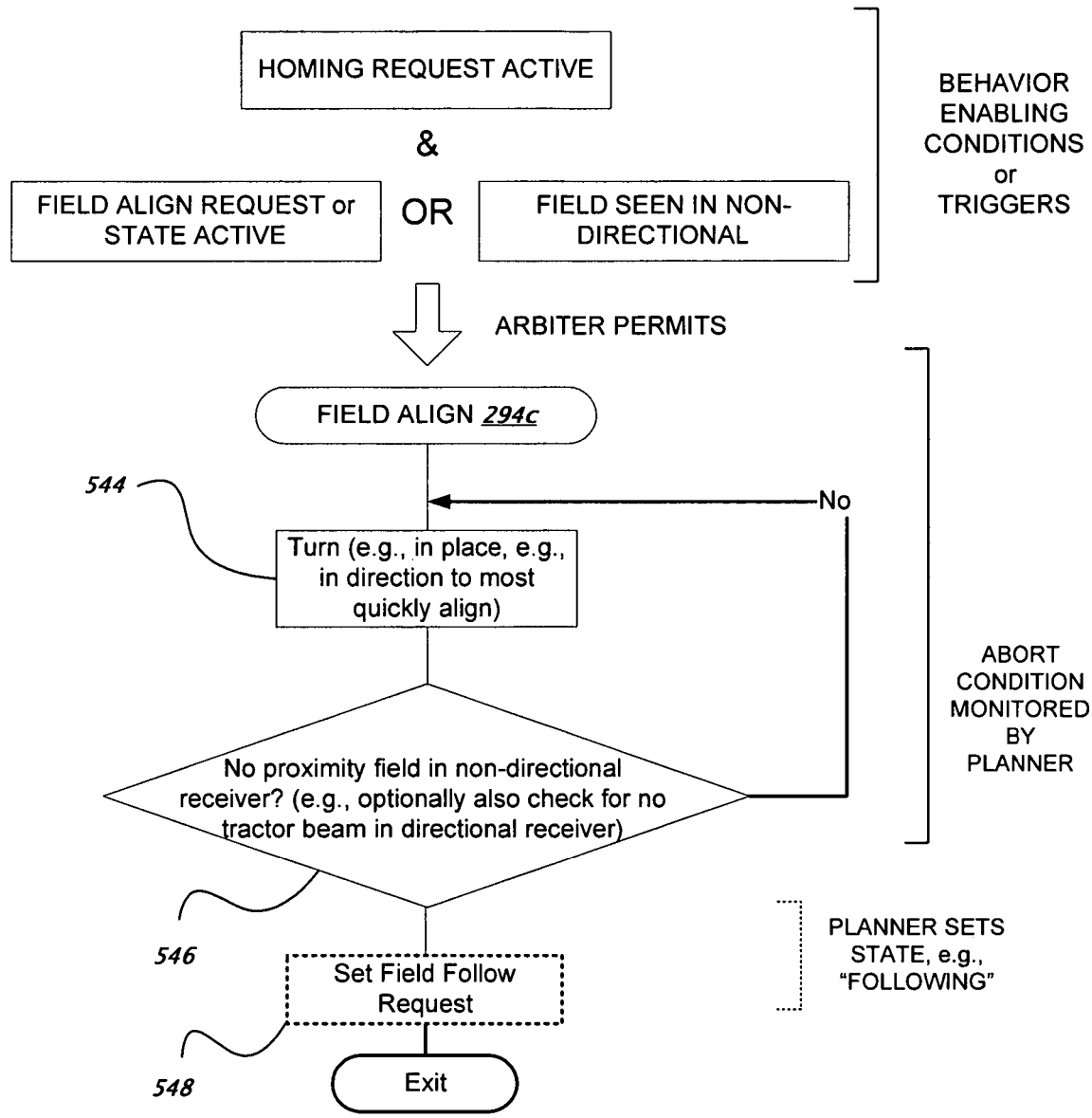
FIG. 28 shows a schematic view of a field align behavior of a robot.

Upon detecting the proximity field 310, the robot 302 executes the field aligning behavior 294c. FIG. 28 depicts the field align behavior 294c. As shown, the arbiter 252 will not permit execution (of the highest priority candidate) until at least a homing request state or request is active, and either a field align request is active, or the proximity field 310 is seen in the non-directional sensor 322 (this latter permitting the behavior sequence to advance to field aligning 294c when the robot 302 fortuitously "stumbles" into the proximity field 310 before encountering the directed beam 306). The field may again be limited to one expected at the present location of the robot 302 on the state map. Once these are satisfied, the arbiter 252 may permit the field align behavior 294c to execute, abort conditions supervised as previously noted by the planner 253. The field align behavior 294c turns or pivots the robot essentially in place (544). A likely beam direction may be determined according to the beam identity (e.g., facing the dock 340, following a left beam 350 to the dock 340 likely means the robot 302 should turn clockwise, following a right beam 360 counterclockwise) or other state or information. The robot 302 may turn in the direction expected to be shorter or randomly. Once the omni or non-directional receiver 322 senses the directed beam 306 (546), the behavior 294c ends. Optionally, the behavior 294c does not end until an additional condition is satisfied—that the directional beam 306 is not present in the directional receiver 318 (which increases the likelihood that the robot 302 is rotated transversely to the dock 340). A field follow request is to be set to continue the sequence of sequenced reactive behaviors, as discussed, by the behavior itself (548), by the planner 253, or otherwise.

Figure 31D:
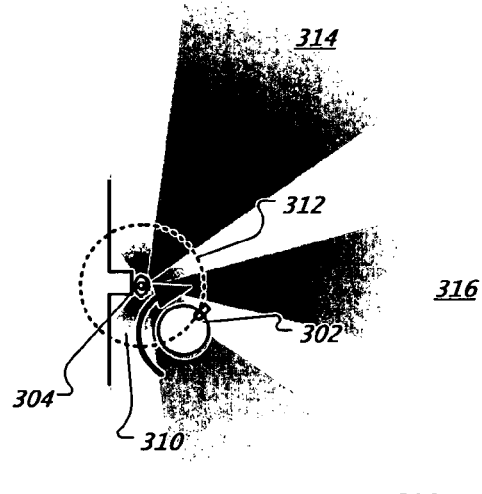

Accordingly, as shown in FIG. 31D, the robot 302 can detect the proximity field 310 with the directional receiver 318, as when the robot 302 is facing the beacon 304, the robot 302 will initiate a pivot maneuver (e.g., turn in place for differential drive robots having drive wheels on the center diameter or holonomic drives or highly steerable robots, turn substantially in place for other configurations) altering the robot drive direction to the right or left toward the other directed beam 314, based on the beam encoding of the first directed beam 306. The robot 302 stops the pivot maneuver when it no longer detects the proximity beam 310 with the directional receiver 106.

The robot 302 may encounter the proximity field 310 before encountering the directed beam 306. In this case, the robot 302 does not execute the beam aligning or beam homing behavior, 294a and 294b, respectively. Instead, the robot 302 recognizes the encoding of the proximity field 310 and executes the field aligning behavior 294d.

When the robot 302 no longer detects the proximity field beam 310 with the directional receiver 218, the robot 302 executes the field following behavior 294c.

Figure 29:
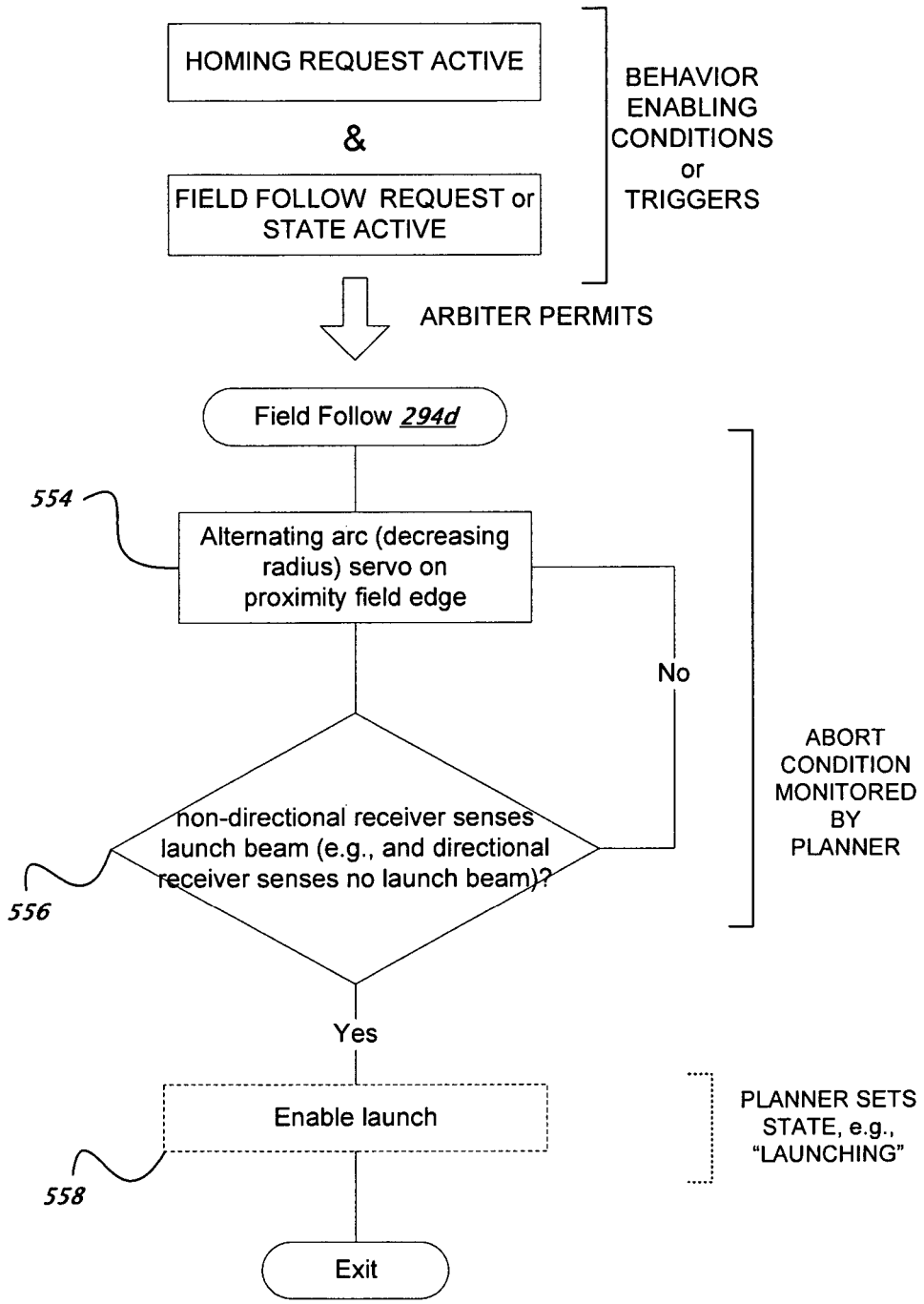
FIG. 29 shows a schematic view of a field following behavior of a robot.

FIG. 29 depicts the field following behavior 294d. As shown, the arbiter 252 will not permit execution (of the highest priority candidate) until at least a homing request state or request is active, and a field follow request is active. As noted, this may be limited to simply the field follow request if the sequence is to be more readily abandoned to preserve robustness. The field is optionally limited to an expected one. Once these are satisfied, the arbiter 252 may permit the field follow behavior 294d to execute subject to abort conditions. The field follow behavior 294c follows the edge 312 of the proximity field emission 310 (554) using alternating, decreasing radius curves as previously discussed. The non-directional sensor 322 may be conditioned to return a one bit true-false value reflecting beam presence, based on signal strength. Once the non-directional/omni-directional receiver 322 senses the next directed beam 314 (534), i.e., the launch beam (this detection limited to the expected beam of the beacon 304 followed and/or according to the location state of the robot 304), the behavior is ready to end. Optionally, the behavior 294d further checks and proceeds until the directional receiver 318 does not sense the launch beam 314 (which tends to exclude those cases in which the omni-directional detector 322 detects a launch beam 314 too early via a reflection from a highly reflective surface, such as a nearby white door or wall corner). A state is to be set to continue the sequence of sequenced reactive behaviors—i.e., a launch request. The behavior 294c may set this state itself (558), or the planner 253 may control this.

Figure 31E:
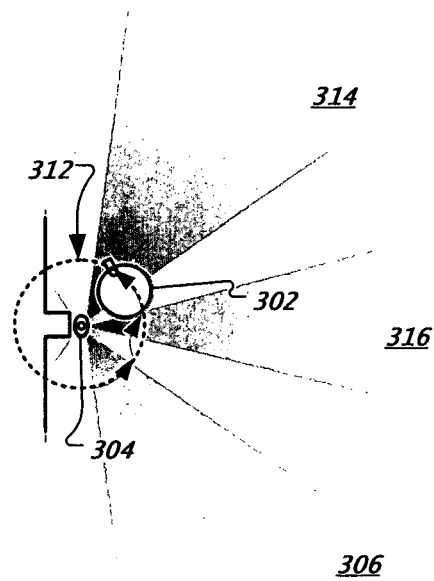

As shown in FIG. 31E, during the field following behavior 294d, the robot 302 maneuvers in an resultant arc around the beacon 304 while following an edge 312 of the proximity beam 310 via omni-directional receiver 322. The robot 302 follows the edge 312 of the force field 310 by monitoring the received signal strength of the force field emission 310 on the robot's emission sensors 318 and 322. One example of the arc maneuver entails the robot 302 "zigzagging" back and forth (e.g., "bang-bang" servoing or following using a one-bit true-false detection and forward motion in initially arced, steadily decreasing turn radius, e.g., spiraling in) along the edge 312 of the proximity beam 310, where the robot 302 detects entering and exiting the field of emission of the proximity beam 310 with the omni-directional receiver 322. In another example, the robot 302 follows the edge 312 of the force field by using a PID control system based on the time in the force field 310 or the time out of the force field 310. The PID control system controls the arc of the robot 302. The robot 302 executes the maneuver at a reduced speed (e.g., less than 50% of coverage speed) for both drive wheels 132 and 134, so that both drive wheels 132 and 134 are being driven in a forward direction. This facilitates easier traversing of transitions and thresholds. The robot 302 passes through the area normally covered by a gateway beam 316. The robot 302 continues to follow the edge 312 of the proximity beam 310 until the omni-directional receiver 322 detects that the robot 302 has entered the second directional beam 314 and the directional receiver 318 no longer detects the second directed beam 314, as shown in FIG. 31E. As noted, satisfying both criteria helps prevent the robot 302 from detecting reflected beam emissions off of adjacent objects, such as a white door.

FIG. 29 depicts the launch behavior 294e. As shown, the arbiter 252 will not permit execution (of the highest priority candidate) until the launch request is active, and may also require the homing request. The launch behavior 294e assumes a last position with the omni-directional detector 322 in the launch beam 314 and a bearing substantially transverse to the launch beam 314, and curves away from the field 314/beacon 304 in the approximate direction of the launch beam 314 (e.g., facing the dock 340, if the robot 302 has traversed left to right, curving clockwise, and if the robot 202 has traversed the opposite direction, curving counterclockwise). Optionally, the robot 302 may try to stay within the launch beam 314 by servoing to return to the launch beam 314 when the launch beam 314 is not detected in the omni-directional sensor 322. After a predetermined time (e.g., 5 s) or distance (e.g., 1 m) or obstacle encounter, the behavior is ready to end. At this point, the planner 253 may terminate the homing request (and, e.g., updating the location state of the topological map as well as clearing or resetting a navigation mode state if one is kept), and the reactive behaviors will begin the robot's coverage work in the subsequent chamber (or, if the battery is to be charged, this may initiate another homing request in the direction of the dock according to the location state of the map). The planner 253 may also immediately initiate another homing request; or reset variables of the current homing request according to the location state of the map such that the robot 302 will proceed from room to room to room, e.g., moving directly to or from a distal or remote room.

Figure 30:
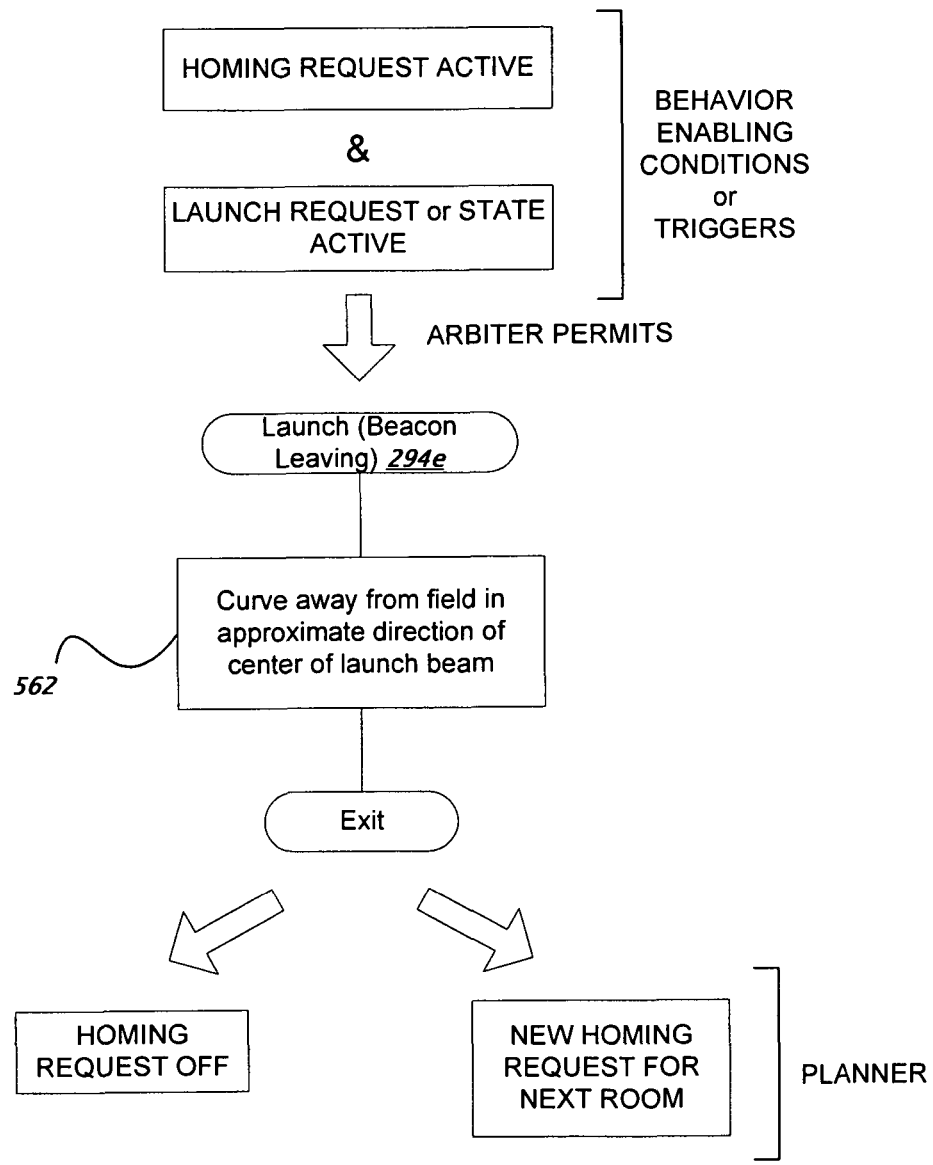
FIG. 30 shows a schematic view of a leaving beacon behavior of a robot.
Figure 31F:
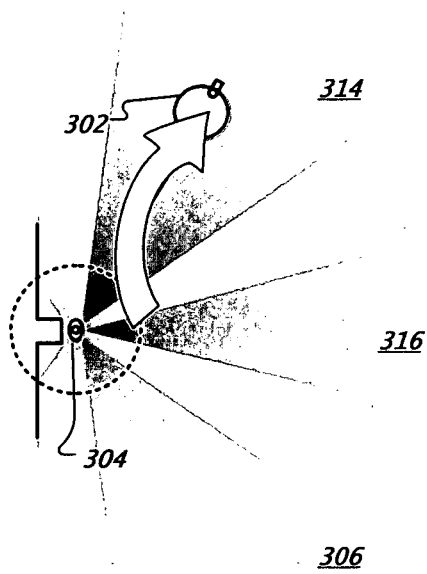
Figure 31G:
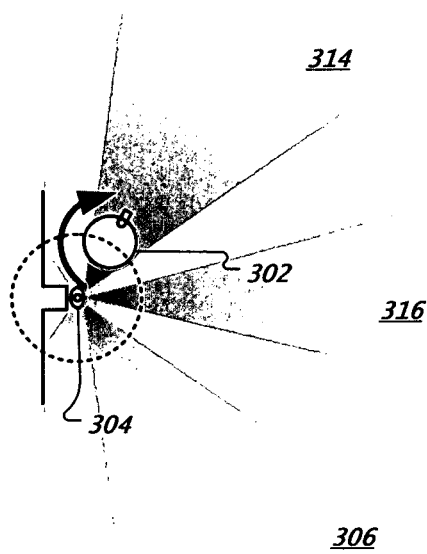
Figure 31H:
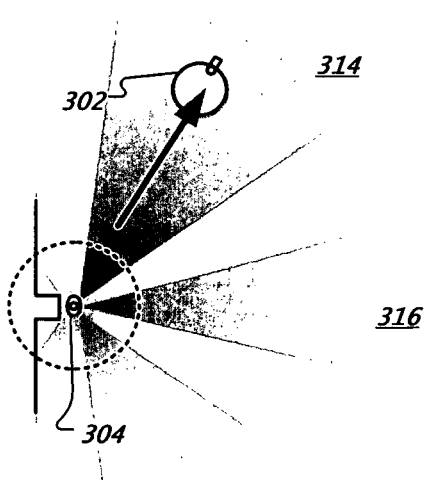

That is, as shown in FIG. 31F, upon completing the field following behavior 294c, the robot 302 may execute the leaving beacon behavior 294e, as shown in FIG. 30, which entails the robot 302 moving away from the beacon 304. Alternatively, this can be performed as a pivot and launch, and/or guided by the launch beam 314 and omni-directional receiver 322, e.g., FIG. 31G shows the robot 302 turning away from navigation beacon 304 to face a second area as the robot 302 passes the edge of directed beam 314. If the robot 302 detects the second directed beam emission 314 with the omni-directional receiver 322, the robot 302 maneuvers away from the beacon 304. If the robot 302 does not detect the second directed beam emission 314 with the omni-directional receiver 322, the robot 302 moves in a forward direction as shown in FIG. 31H without turning in order to avoid arcing back into the gateway. Another example of the leave beacon behavior 294e includes the robot 302 aligning itself in a particular direction using odometry (or a next beacon in a sequence, e.g., when the planner 253 includes a distal or remote room traversal sequence that restarts the sequence of behaviors at beam align with a next beacon's beam or field according to the map) and moving in that direction without guidance from any of the beams emitted from the current beacon 304. FIG. 31G shows the robot 302 moving away from navigation beacon 304 as it finishes migrating.

While migrating, the robot 302 stores in memory the beam encodings of the first and second directed beams 306 and 314, respectively, at each navigational beacon 304 encountered while away from a base station 340. To return to the base station 340, the robot 302 conducts coverage behaviors while the homing request is on, resulting in discovering the appropriate directed beams 306 and 314, respectively, and corresponding encodings, to follow a sequence of encountered beams back to the base station 340. In one example, the robot 302 can wirelessly communicate (e.g. radiofrequency) with the navigational beacons 304 to independently activate each previously encountered beam 306, 314, and 316 one at a time to find (traversing a room using random bounce and/or obstacle following to place itself in a beam path) and follow each beam back to the base station 340.

In another example (not shown), navigation beacons may emit at least one, two, or three beam signals: fence/gate beam (referred to herein as "yellow", but in reality having a first modulation of a first frequency in the IR band), right-hand navigation beam (referred to as "red", but in reality having either or both of different modulation or a different frequency in the IR band from the "yellow" beam), and left-hand navigation beam (referred to as "green", but in reality having either or both of a different modulation or a different frequency in the IR band from the "yellow" and "red" beams).

If multiple navigation beacons are provided, each would have different modulation of its beams, but the emitters of the fence/gate beam, right hand beam, or left hand beam would preferably be consistent among the navigation beacons.

Regardless of its assignment as fence, gate, or trail marker, as one example, a navigation beacon also may emit a geometrically determined force field ("blue", again in actuality either or both of a different modulation or frequency in the IR band, although a force field could also be radio frequency RF rather than visible or IR light) in a circular region around their base. This may identify its presence to a robot, and allow a robot to follow a path around the Navigation beacon (through a gate or past a trail marker), for example.

An IR-based beacon system can be designed to use a geometric solution, similar in certain respects to a non-limiting example such as a shaded floor lamp which lights up only a small area around itself, in order to provide a well-defined force field via IR, for example.

A fence navigation beacon may emit a yellow beam directly out the front of the navigation beacon (0 degrees) and a single navigation beam (red or green) at about a 60-degree angle to the right or left of the yellow beam, for example. A gate navigation beacon may emit a yellow beam to the front, a red beam at −60 degrees, and a green beam at about +60 degrees, as another non-limiting example; also, for example, a trail marker Navigation beacon may emit a red beam at about −60 degrees and a green beam at about +60 degrees.

Navigation beacon "beams" in some non-limiting examples may not be narrowly focused (thus not requiring a special lens); they may fan out to light as much of the room as may be practicable without mutual interference. As an alternative, for example, a standard home base LED not requiring other optics may also be used.

Referring to FIGS. 24A-B and 32A-E, the docking behavior priorities (from highest to lowest) include docking retry docking bump follow 264c, docking bounce 264d, docking quick turn 296c, docking distant homing 296b, docking lobe following 296a, and docking field following 296d. The robot 302 must generally approach the dock 340 from a forward direction with less than 4 degrees of skew in order to dock properly.

Figure 32A:
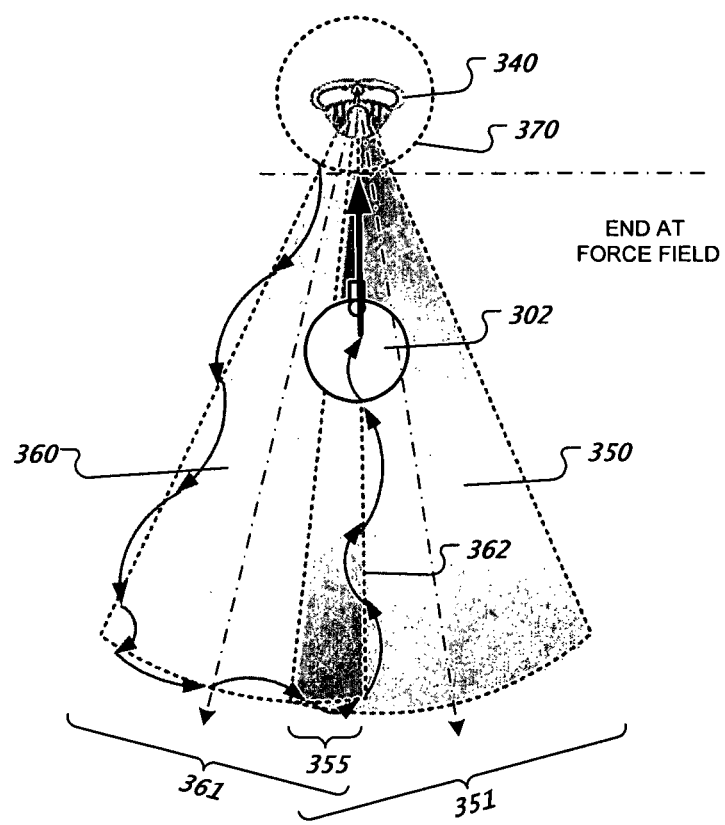
FIGS. 32A-E show schematic views of a robot docking with a base station.

The default docking behavior, docking lobe following 296a, as shown in FIG. 32A, is executed when no other docking behavior has a higher priority. When the robot 302 detects the left (red) beam 350 only, it follows the edge of the red beam 350 in a clockwise direction. When the robot 302 detects the right (green) beam 360 or the overlap area of the red and green beams 350 and 360, respectively, it follows the edge of the green beam 360 in a counterclockwise direction. This results in the robot 302 appearing to follow the outside of the nearest docking beam 350 or 360 around to the front of the dock 340 at zero degrees and then following a normal (zero degree) edge 362 right onto the docking contacts. When the robot 302 detects the force field 370 during this behavior it slows down in order to follow more accurately.

The robot 302 keeps track of the signals detected by the omni-directional receiver 322 over a window of 30 seconds. When the robot 302 detects that the frequency and variance of line crossing events (crossing the normal (zero degree) edge 362) is above about 1 Hz and below a variance of about 2.5 seconds it determines that the robot 302 is following the normal (zero degree) edge 362 and will simply drive straight by executing a smooth homing behavior, instead of continuing to follow the edge 362 (with the inevitable right-left oscillation) under the lobe following behavior 296a.

Figure 32B:
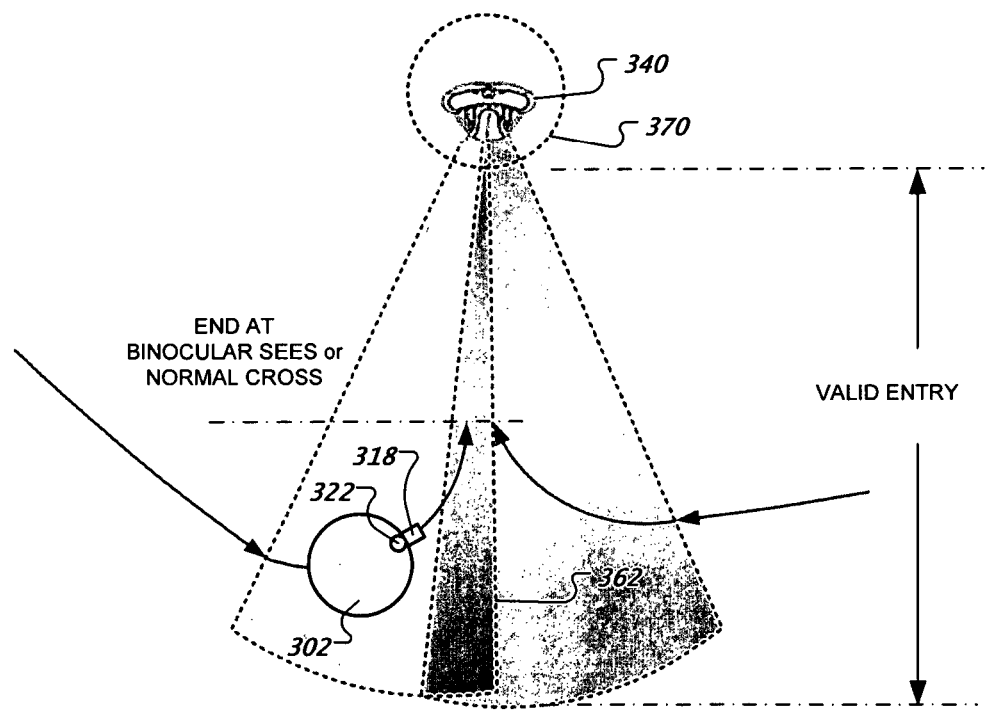

Referring to FIG. 32B, the quick turn behavior 296c is activated when the robot 302 has encountered a docking beam 350 or 360 while driving straight, spiraling, bump following, or wall following, is not in the force field 370, and has not detected the dock 340 with its directional receivers 318 in the last several seconds. When the robot 302 detects the red beam 350, it arcs clockwise toward the dock 340. When the robot 302 detects the green beam 360 or the overlap area of the red and green beams 350 and 360, it arcs counterclockwise toward the dock 340. When the robot 302 detects the other beam 350 or 360, detects the dock 340 with its directional receivers 318, or has arced more than 360 degrees, this behavior 296c aborts. Typically it is then followed by the lobe following behavior 296a.

Figure 32C:
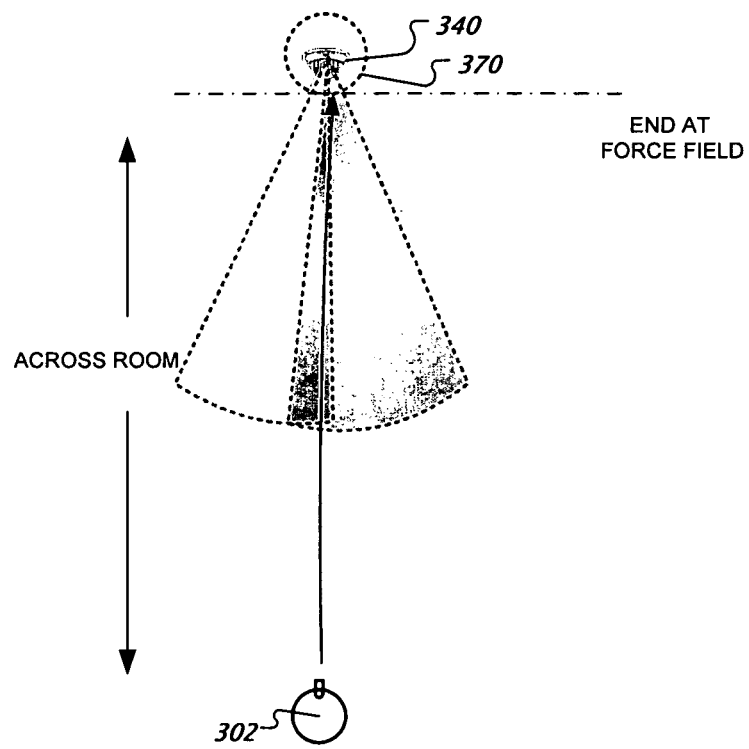

Referring to FIG. 32C, the distant homing behavior 296b is activated when the robot 302 has not detected the force field 370 in its omni-directional receiver 322 in the last several seconds, and detects the dock 340 with the directional receiver 318. If the robot 340 detects the red or green beams 350 and 360, respectively, it will drive toward them. If the robot 340 only detects the force field 370 it will drive toward the force field 370. This allows the robot 302 to approach the dock 340 from a distance at any angle. When the robot 302 detects the force field 370 with its omni-directional receiver 322 this behavior 296b aborts. During a front approach this is typically followed by the lobe following behavior 296a. During a side approach this is typically followed by the field following behavior 296d.

Figure 32D:
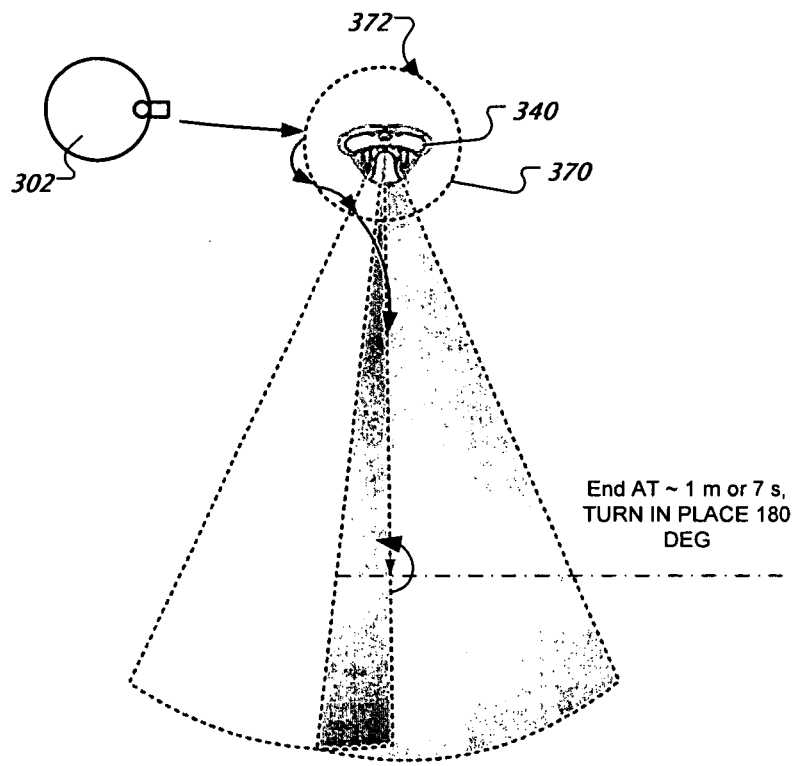

Referring to FIG. 32D, the field following behavior 296b activates when the robot 302 detects the force field 370 with its omni-directional receiver 322, has not detected the red or green beam, 350 and 360 respectively, with its omni-directional receiver 322 in the last second, and does not see the red or green beam 350 and 360, respectively, with its directional receivers 318. The robot 302 follows the edge 372 of the force field 370 with its omni-directional receiver 322 in a random direction (cw or ccw) until it detects the red or green beam, 350 and 360 respectively, a bump, a cliff, or has traveled more than 1 meter. When the robot 302 detects the red or green beam, 350 and 360 respectively, it engages in reverse lobe following 296a for a distance of about 1 meter or until a bump is detected in order to travel away from the dock 340 along the normal (zero degree) edge 362 and straighten out. Then the robot 302 turns 180 degrees or until it faces the dock 340. Then the behavior 296b aborts. Typically the lobe following behavior 296a activates next to finish docking.

Figure 32E:
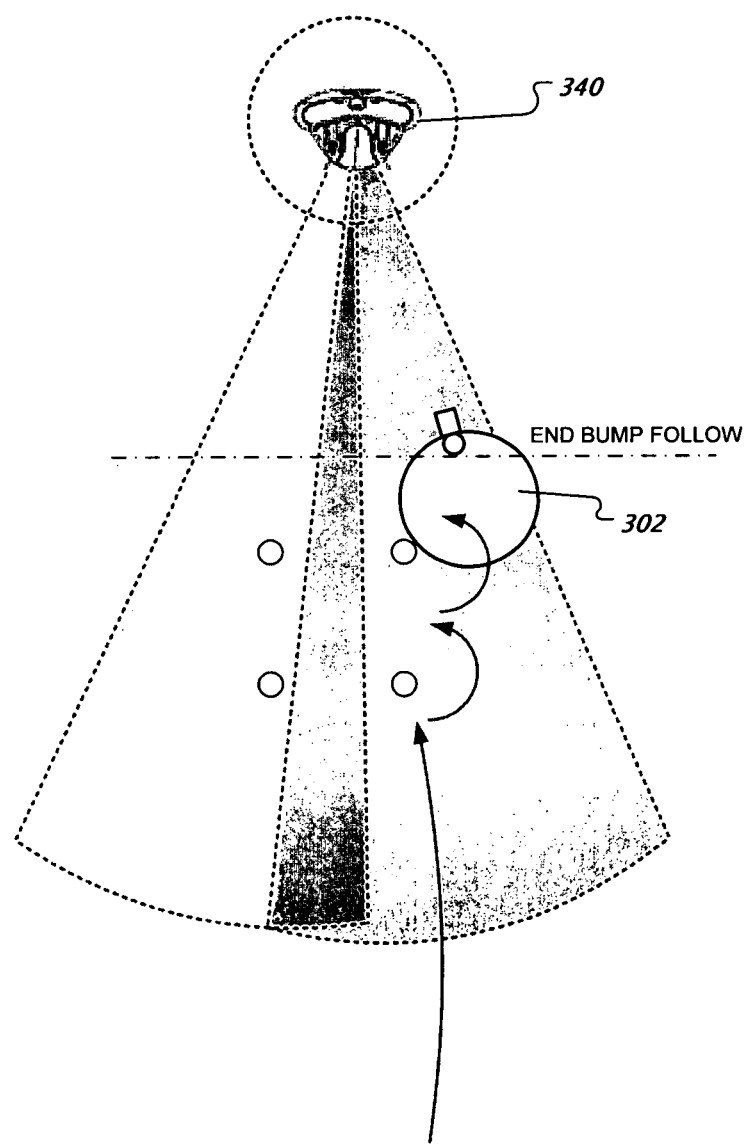

Referring to FIG. 32E, the robot 302 can dock successfully even when there are obstacles completely or partially occluding the docking beams 350 and 360 or the robot's physical access to the dock 340 from some, but not all, approach angles by executing an obstacle dock behavior 296e. When the robot 302 is seeking the dock 340 and has detected a docking beam 350 or 360 in its omni-directional receiver 322 in the last several seconds, and then also detects a bump, it activates the docking bounce behavior 264c. With about a 66% probability, the obstacle dock behavior 296e initiates a bump follow behavior 264c and with about a 33% probability, the docking bounce behavior 264d which has the robot 302 simply back up, turn a random angle between 10 and 170 degrees for side impacts or 75 and 255 degrees for front impacts, and then aborts the behavior 264d. The bump follow behavior 264c follows an edge of the obstacle with the robot's bumper until one of the following conditions occurs: a) the robot 302 detects the dock 340 with the directional receiver 318 and does not detect it with is omni-directional receiver 322, with about a 66% probability; b) the robot 302 detects a crossing of the normal (zero degree) edge 362 from right to left and is bump following 264c in a clockwise direction, or the robot 302 detects a crossing of the normal (zero degree) edge 362 from left to right and is bump following 264c in a counter-clockwise direction, with about a 66% probability; c) the robot 362 detects the force field 370 with its omni-directional receiver 322; d) 30 seconds has passed since the onset of the bump follow behavior 264c; or e) no docking beam 350 or 360 has been detected by the omni-directional receiver 322 for more than about 5 seconds.

Another possible implementation of bump follow 264c includes the robot 302 keeping track of the projected location of the dock 340 and turning preferentially toward the estimated dock location during bump follow 264c. Each time the robot 302 crosses the normal (zero degree) edge 362 while facing the dock 340 and detecting the dock 340 by its directional receiver 318, the robot 302 uses odometry to project the location of the dock 340 about 5 feet out along a direction of travel. The robot 302 can use odometry throughout the docking maneuver to estimate the orientation of itself to the projected location of the dock 340.

The combination of short bouts of bump following and normal docking methods allow the robot 302 to dock in the face of a large variety of obstacles including but not limited to walls, chairs, and boxes, as well as reflections of the IR docking beams.

"ROBOT OBSTACLE DETECTION SYSTEM", U.S. Pat. No. 6,594,844, disclosing proximity sensors such as cliff sensors and wall following sensors; "AUTONOMOUS FLOOR-CLEANING ROBOT", U.S. Pat. No. 6,883,201, disclosing a general structure of an iRobot Roomba coverage/cleaning robot and main and edge cleaning heads in detail; "METHOD AND SYSTEM FOR MULTI-MODE COVERAGE FOR AN AUTONOMOUS ROBOT", U.S. Pat. No. 6,809,490, disclosing motion control and coverage behaviors, including escape behaviors, selected by an arbiter according to the principles of behavior based robotics; and "METHOD AND SYSTEM FOR ROBOT LOCALIZATION AND CONFINEMENT", U.S. Pat. No. 6,781,338, disclosing virtual walls, i.e., robot confinement using wall-simulating directed beams, are each incorporated by reference herein in their entireties.

Other robot details and features combinable with those described herein may be found in the following U.S. patent applications filed concurrently herewith, entitled "COVERAGE ROBOT MOBILITY" having assigned Ser. No. 11/633, 885; "MODULAR ROBOT" having assigned Ser. No. 11/633 886; and "ROBOT SYSTEM" having assigned Ser. No. 11/633 883, the entire contents of the aforementioned applications are hereby incorporated by reference.

A number of implementations have been described. Nevertheless, it will be understood that various modifications may be made without departing from the spirit and scope of the following claims. Accordingly, other implementations are within the scope of the following claims.

What is claimed is:

1. An autonomous mobile robot system for bounded areas, the system comprising:
    a navigation beacon with a gateway beacon emitter arranged to emit a gateway beam across a gateway between a first bounded area and an adjacent second bounded area with the beacon placed in the gateway on a floor surface, wherein the navigation beacon is configured to emit a marker indicating a proximity zone about the beacon that extends into the bounded areas, and wherein the navigation beacon further comprises a beacon emitter arranged to transmit an emission into the first bounded area indicating the direction of the beacon, with the beacon disposed within the gateway;
    an autonomous coverage robot comprising:
        a beacon emission sensor responsive to the gateway beam, the emission indicating the direction of the beacon, and the marker indicating the proximity zone, and configured to detect an encoded signal included in at least one of the gateway beam and the marker indicating the proximity zone, the encoded signal comprising a unique identifier associating the beacon with the first bounded area;
        a drive system configured to maneuver the robot about the first bounded area in:
            a cleaning mode, in which the robot is redirected back into the first bounded area in response to detecting any one of the marker indicating the proximity zone and the gateway beam, and
            a migration mode, in which the robot is configured to maneuver toward the beacon upon encountering the emission indicating the direction of the beacon and through the gateway into the second bounded area while avoiding collision with the beacon by detection of the marker indicating the proximity zone; and
    a base station located in one of the bounded areas, the base station comprising:
        a base defining a docking direction from which the robot may properly dock; and
        a robot charger housed in the base.

2. The system of claim 1 wherein the robot remains in the first bounded area upon the robot redirection in response to detecting the gateway beam in the cleaning mode.

3. The system of claim 1 wherein the drive system is configured to maneuver the robot about the first bounded area in the cleaning mode for a preset time interval, and to automatically initiate the migration mode at expiration of the time interval.

4. The system of claim 3 wherein the drive system is configured to maneuver the robot across the gateway beam in the migration mode.

5. The system of claim 1 wherein the drive system is configured to maneuver the robot about the first bounded area in the cleaning mode until a preset number of encounters of the gateway beam have been detected, and then to automatically initiate the migration mode.

6. The system of claim 1 wherein the robot further comprises a transmitter that signals the beacon to disrupt signaling of the gateway beam in the migration mode.

7. The system of claim 1
    wherein the robot in the migration mode discerns a position of the navigation beacon in response to detection of the emission indicating the direction of the beacon and aligns a drive direction defined by the robot in relation to an emission path defined by the emission indicating the direction of the beacon.

8. The system of claim 7 wherein the robot advances along the emission path to reach and traverse the gateway.

9. The system of claim 1 wherein the robot wirelessly communicates with the navigation beacon to deactivate the emission indicating the direction of the beacon while in the cleaning mode and activate the emission indicating the direction of the beacon while in the migration mode.

10. The system of claim 9 wherein the navigation beacon is configured to communicate schedule information with the robot.

11. The system of claim 1 wherein the navigation beacon transmits the emission indicating the direction of the beacon at an angle of between about 45-90 degrees to the cross-gateway direction.

12. The system of claim 1 wherein the robot remotely activates the emission indicating the direction of the beacon of the navigation beacon and deactivates the gateway beam upon initiating the migration mode, and the robot remotely deactivates the emission indicating the direction of the beacon of the navigation beacon and activates the gateway beam upon terminating the migration mode.

13. The system of claim 1 wherein the navigation beacon transmits a proximity emission laterally about the beacon, wherein the robot avoids cleaning and migration within the proximity emission.

14. The system of claim 1 wherein the base station further comprises:
    an omni-directional beam emitter mounted on the base and configured to project a proximity beam laterally around the base station; and
    two navigational field emitters housed in the base and arranged to emit respective, laterally bounded and overlapping fields of emissions of signal beams, respectively;
    wherein one of the emitted fields defines a lateral field edge aligned with the docking direction and overlapped by the other of the fields.

15. The system of claim 1 wherein the two navigational field emitters of the base station are positioned to form an angle of overlap of about 6 degrees and each emitter's aperture angle is between about 20 and 30 degrees.

16. The system of claim 1 wherein the robot includes a floor cleaning system that removes debris from the floor as the robot is maneuvered.

17. The system of claim 1 wherein the gateway beam comprises a line-of-sight direction to a distant observed object.

18. The system of claim 1 wherein the navigation beacon comprises an adjustable switch, and wherein the switch controls the system such that the robot enters any one of a cleaning mode, a migration mode, and an off mode when the switch is actuated.

19. An autonomous mobile robot system for bounded areas, the system comprising:
 a navigation beacon with a gateway beacon emitter arranged to emit a gateway beam across a gateway between a first bounded area and an adjacent second bounded area with the beacon placed in the gateway on a floor surface, wherein the navigation beacon is configured to emit a marker indicating a proximity zone about the beacon that extends into the bounded areas;
 an autonomous coverage robot comprising:
  a beacon emission sensor responsive to the gateway beam and the marker indicating the proximity zone, and configured to detect an encoded signal included in at least one of the gateway beam and the marker indicating the proximity zone, the encoded signal associating the beacon with the first bounded area;
  a drive system configured to maneuver the robot about the first bounded area in:
   a cleaning mode, in which the robot is redirected back into the first bounded area in response to detecting any one of the marker indicating the proximity zone and the gateway beam, and
   a migration mode, in which the robot is configured to maneuver toward the beacon and through the gateway into the second bounded area while avoiding collision with the beacon by detection of the marker indicating the proximity zone;
 wherein the drive system comprises an internal map and the drive system is configured to navigate from a first bounded area to second bounded area using the internal map.

20. The system of claim 19 wherein the drive system is configured to cross the gateway beam from a first bounded area to a second bounded area in the migration mode.

21. The system of claim 19 wherein the drive system is configured to generate the internal map based at least in part on the encoded signal associating the beacon with the first bounded area.

22. An autonomous mobile robot system for bounded areas, the system comprising:
 a navigation beacon with a gateway beacon emitter arranged to emit a gateway beam across a gateway between a first bounded area and an adjacent second bounded area with the beacon placed in the gateway on a floor surface, wherein the navigation beacon is configured to emit a marker indicating a proximity zone about the beacon that extends into the bounded areas;
 an autonomous coverage robot comprising:
  a beacon emission sensor responsive to the gateway beam and the marker indicating the proximity zone, and configured to detect an encoded signal included in at least one of the gateway beam and the marker indicating the proximity zone, the encoded signal associating the beacon with the first bounded area;
  a drive system configured to maneuver the robot about the first bounded area in:
   a cleaning mode, in which the robot is redirected back into the first bounded area in response to detecting any one of the marker indicating the proximity zone and the gateway beam, and
   a migration mode, in which the robot is configured to maneuver toward the beacon and through the gateway into the second bounded area while avoiding collision with the beacon by detection of the marker indicating the proximity zone;
 wherein the drive system is configured to maneuver the robot in a confined boustrophedon pattern.

23. The system of claim 22 wherein the drive system is further configured to maneuver the robot in a cliff avoiding behavior and to give precedence to the cliff avoiding behavior over the migration mode.

24. The system of claim 22 wherein the gateway beam comprises a directed vector.

25. An autonomous mobile robot system for bounded areas, the system comprising:
 a navigation beacon with a gateway beacon emitter arranged to emit a gateway beam across a gateway between a first bounded area and an adjacent second bounded area with the beacon placed in the gateway, wherein the navigation beacon is configured to emit a marker indicating a proximity zone about the beacon that extends into the bounded areas, and wherein the navigation beacon further comprises a vectoring beacon emitter arranged to transmit a directed vectoring emission into the first bounded area with the beacon disposed within the gateway; and
 an autonomous coverage robot comprising:
  a beacon emission sensor responsive to the gateway beam, the vectoring emission and the marker indicating the proximity zone; and
  a drive system configured to maneuver the robot about the first bounded area in:
   a cleaning mode, in which the robot is redirected back into the first bounded area in response to detecting any one of the marker indicating the proximity zone and the gateway beam, and
   a migration mode, in which the robot is configured to maneuver toward the beacon upon encountering the vectoring emission and through the gateway into the second bounded area while avoiding collision with the beacon by detection of the marker indicating the proximity zone;
 wherein the robot is configured to remotely activate the directed vectoring emission of the navigation beacon and deactivate the gateway beam upon initiating the migration mode, and to remotely deactivate the directed vectoring emission of the navigation beacon and activate the gateway beam upon terminating the migration mode.

26. The system of claim 25 wherein the navigation beacon is further configured to emit an area identifier signal uniquely marking the first bounded area, the identifier signal being confined to the first bounded area.

27. The system of claim 26 wherein the gateway beam comprises the area identifier signal.

28. The system of claim 26 wherein the beacon emission sensor is responsive to the identifier signal, and wherein the autonomous coverage robot is configured to identify the first bounded area based on the area identifier signal.

* * * * *